US009333421B2

(12) United States Patent
Walls

(10) Patent No.: US 9,333,421 B2
(45) Date of Patent: May 10, 2016

(54) SYSTEMS AND METHODS FOR A TOKEN MATCH GAME

(71) Applicant: David Walls, Boxford, MA (US)

(72) Inventor: David Walls, Boxford, MA (US)

(73) Assignee: Funkitron, Inc., Boxford, MA (US)

( * ) Notice: Subject to any disclaimer, the term of this patent is extended or adjusted under 35 U.S.C. 154(b) by 91 days.

(21) Appl. No.: 14/182,026

(22) Filed: Feb. 17, 2014

(65) Prior Publication Data

US 2014/0235306 A1 Aug. 21, 2014

Related U.S. Application Data

(60) Provisional application No. 61/766,283, filed on Feb. 19, 2013.

(51) Int. Cl.
*A63F 13/00* (2014.01)
*A63F 13/40* (2014.01)

(52) U.S. Cl.
CPC ............... *A63F 13/005* (2013.01); *A63F 13/10* (2013.01); *A63F 2300/308* (2013.01); *A63F 2300/6036* (2013.01); *A63F 2300/61* (2013.01)

(58) Field of Classification Search
USPC ................................................ 463/7, 8, 9, 10
See application file for complete search history.

(56) References Cited

U.S. PATENT DOCUMENTS

2005/0215311 A1* 9/2005 Hornik et al. .................... 463/20
2005/0288094 A1* 12/2005 Marks et al. .................... 463/20
2007/0205556 A1* 9/2007 Roemer et al. ................. 273/273
2010/0259006 A1 10/2010 Factor
2013/0331162 A1 12/2013 Krivicich et al.
2014/0370950 A1* 12/2014 Hansson ............. A63F 13/2145
463/9

OTHER PUBLICATIONS

International Search Report and Written Opinion for PCT/US2014/016708 dated Jun. 11, 2014 (14 pages).
Kellie Cardwell-Winters: "Gems With Friends Walkthrough Cheats and Strategy Guide; Gamezebo", Sep. 10, 2010, XP055120149, Retrieved from the Internet: URL:http://www.gamezebo.com/games/gems-friends/walkthrough-cheats-strategy-guide [retrieved on May 26, 2014].
Wikipedia: "Qwirkle—Wikipedia, the free encyclopedia", Dec. 30, 2010, XP055120152, Retrieved from the internet: URL:https://web.archive.org/web/20101230204819/http://en.wikipedia.org/wiki/Qwirkle [retrieved on May 26, 2014].
Wikipedia: "SameGame—Wikipedia, the free encyclopedia", Sep. 16, 2012, XP055120482, Retrieved from the Internet: URL:http//en.wikipedia.org/w/index.php?title=SameGame&oldid=512982586 [retrieved on May 27, 2014].

* cited by examiner

*Primary Examiner* — Paul A D'Agostino
*Assistant Examiner* — Brandon Gray
(74) *Attorney, Agent, or Firm* — Daniel Rose; Christopher J. McKenna; Foley & Lardner LLP

(57) ABSTRACT

An m×l array of randomly selected tokens may be provided as a playing field, and a second n×l array of randomly selected tokens may be provided as a hand. The player may select a cell within the m×l array to replace the token in said cell with a token in a corresponding cell of the n×l array. If the replacement results in a region of adjacent identical tokens in the m×l array, the tokens may be removed and the player's score incremented. If no plays are possible from the player's hand, the player may draw a new hand of randomly selected tokens to replace the tokens and/or blank spaces in the n×l array. Play continues until the player has exhausted a predetermined number of opportunities to draw a new hand.

20 Claims, 58 Drawing Sheets

1400  1402  1404  1406  1408

1410  1412  1414

1416  1418  1420  1422  1424

SYSTEMS AND METHODS FOR A TOKEN MATCH GAME

RELATED APPLICATIONS

This application claims priority to and the benefit of U.S. Provisional Application No. 61/766,283, entitled "Systems and Methods for a Token Match Game," filed Feb. 19, 2013, the entirety of which is hereby incorporated by reference.

FIELD OF THE DISCLOSURE

The present disclosure relates to systems and methods for a computer video game. In particular, the present disclosure relates to a token match game utilizing a first random array to match against a second random array.

BACKGROUND OF THE DISCLOSURE

Many users of portable computing devices, such as tablet computers and smart phones, play short video games, frequently referred to as "casual" games. As opposed to many computer games on desktop computers or console computing devices which may require many hours to play through a single game to completion, casual games typically require less time to play and may be used for brief periods of entertainment throughout the day.

Casual games exist in every genre, including action games, sports games, card games, and puzzle games. One subset of the puzzle game genre is the "match-3 game," in which a field or array of icons or tokens are provided to the player. In one common implementation, the player may select a token to swap with an adjacent token in the array. If, after swapping, three or more identical tokens are adjacent in the array, the identical tokens are removed, a player score is incremented, and the resulting empty spots in the array are filled.

Once the initial board or field is filled, typical match-3 games only introduce any randomness when empty spots in the array are filled. In fact, one subset of these games does not introduce any further randomness, and instead have emptying the field through matches to leave the fewest number of remaining tokens as the object of the game. Accordingly, these games may rely more on strategy and long-term planning than luck, which is not preferred by all players.

BRIEF SUMMARY OF THE DISCLOSURE

To provide additional randomness and luck into game play while still allowing for strategy and planning, the systems and methods discussed herein provide an improved match game with a first array of tokens that may be used to replace corresponding tokens in a second array to create a region of adjacent identical tokens for scoring purposes. An m×l array of randomly selected tokens may be provided as a playing field, and a second n×l array of randomly selected tokens may be provided as a hand. The player may select a cell within the m×l array to replace the token in said cell with a token in a corresponding cell of the n×l array. If the replacement results in a region of adjacent identical tokens in the m×l array, the tokens may be removed and the player's score incremented. If no plays are possible from the player's hand, the player may draw a new hand of randomly selected tokens to replace the tokens and/or blank spaces in the n×l array. Play continues until the player has exhausted a predetermined number of opportunities to draw a new hand.

In one aspect, the present disclosure is directed to a method for a token match game. The method includes providing, by a token generator executed by a processor of a computing device, an m×l array of randomly selected tokens. The method also includes providing, by the token generator, an n×l array of randomly selected tokens. The method further includes receiving, by a rules engine executed by the processor, a selection of a cell within the m×l array. The method further includes determining, by the rules engine, that replacement of a first token in the selected cell within the m×l array with a second token from a corresponding cell of the n×l array results in a region of adjacent identical tokens within the m×l array. The method also includes removing, by the rules engine, the tokens of the region of adjacent identical tokens within the m×l array, responsive to the determination.

In one embodiment, the method includes incrementing a score for a user, by the rules engine, responsive to removal of the tokens of the region of adjacent identical tokens within the m×l array. In another embodiment, the method includes comprising providing, by the token generator, a number of additional tokens corresponding to the number of removed tokens of the region of adjacent identical tokens within the m×l array. In still another embodiment, the method includes iteratively shifting a token in the m×l array into an adjacent cell not including a token until at least one cell at the edge of the m×l array does not include a token; and providing, by the token generator, at least one new token for the corresponding at least one cell.

In some embodiments, the method includes identifying, by the rules engine, that a token adjacent to the region of adjacent identical tokens within the m×l array is a wild token; and removing, by the rules engine, the wild token and at least one additional token from the m×l array identical to the first token, but not adjacent to the region of adjacent identical tokens. In another embodiment, the method includes identifying, by the rules engine, that no replacement of a third token in a cell within the m×l array with a fourth token from a corresponding cell of the n×l array results in a region of adjacent identical tokens within the m×l array; and providing, by the token generator, a second n×l array of randomly selected tokens, responsive to the identification. In a further embodiment, the method includes providing an interface element to a user; receiving a selection of the interface element by the user; and providing the third n×l array of randomly selected tokens, responsive to the selection of the interface element by the user. In a still further embodiment, the interface element is a lever. In another further embodiment, the method includes providing the second n×l array of randomly selected tokens further comprises replacing a previous n×l array. In yet another further embodiment, the method includes decrementing a hand counter.

In another aspect, the present disclosure is directed to a system for a token match game. The system includes a computing device comprising a processor executing a token generator and a rules engine. The token generator is configured for: providing an m×l array of randomly selected tokens, and providing an n×l array of randomly selected tokens. The rules engine is configured for receiving a selection of a cell within the m×l array; determining that replacement of a first token in the selected cell within the m×l array with a second token from a corresponding cell of the n×l array results in a region of adjacent identical tokens within the m x/array; and removing the tokens of the region of adjacent identical tokens within the m×l array, responsive to the determination.

In one embodiment of the system, the rules engine is further configured for incrementing a score for a user, responsive to removal of the tokens of the region of adjacent identical tokens within the m×l array. In another embodiment of the system, the token generator is further configured for providing a number of additional tokens corresponding to the number of removed tokens of the region of adjacent identical tokens within the m×l array.

In some embodiments of the system, the rules engine is further configured for iteratively shifting a token in the m×l array into an adjacent cell not including a token until at least one cell at the edge of the m×l array does not include a token. The token generator is further configured for providing at least one new token for the corresponding at least one cell.

In other embodiments of the system, the rules engine is further configured for identifying that a token adjacent to the region of adjacent identical tokens within the m×l array is a wild token; and removing the wild token and at least one additional token from the m×l array identical to the first token, but not adjacent to the region of adjacent identical tokens.

In some embodiments of the system, the rules engine is further configured for identifying that no replacement of a third token in a cell within the m×l array with a fourth token from a corresponding cell of the n×l array results in a region of adjacent identical tokens within the m x/array; and the token generator is further configured for providing a second n×l array of randomly selected tokens, responsive to the identification. In a further embodiment, the rules engine is further configured for providing an interface element to a user, and receiving a selection of the interface element by the user; and the token generator is further configured for providing the third n×l array of randomly selected tokens, responsive to the selection of the interface element by the user. In a still further embodiment, the interface element is a lever. In another further embodiment, the token generator is further configured for providing the second n×l array of randomly selected tokens by replacing a previous n×l array. In yet another further embodiment, the rules engine is further configured for decrementing a hand counter, responsive to the token generator providing the second n×l array of randomly selected tokens.

BRIEF DESCRIPTION OF THE DRAWINGS

The patent or application file contains at least one drawing executed in color. Copies of this patent or patent application publication with color drawings will be provided by the Office upon request and payment of the necessary fee.

The foregoing and other objects, aspects, features, and advantages of the disclosure will become more apparent and better understood by referring to the following description taken in conjunction with the accompanying drawings, in which.

DETAILED DESCRIPTION

Figure 1A:
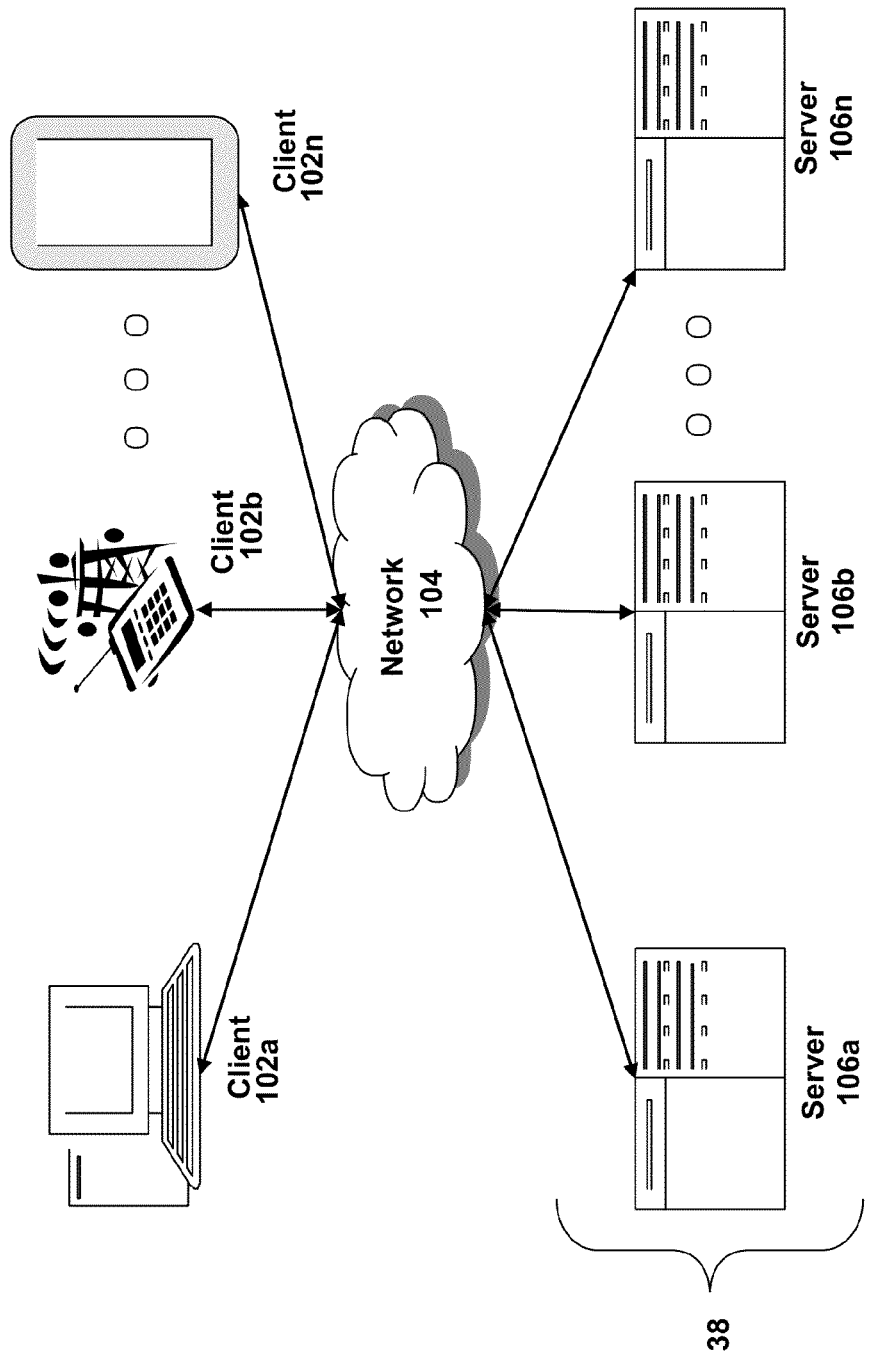
FIG. 1A is a block diagram depicting an embodiment of a network environment comprising client devices in communication with server devices.

Prior to discussing specific embodiments of the present solution, it may be helpful to describe aspects of the operating environment as well as associated system components (e.g., hardware elements) in connection with the methods and systems described herein. For example, these system components may be used to provide a token match game to a client device for execution; may be used to communicate information regarding high scores or daily challenges; or for other social networking functions discussed in more detail below. Referring to FIG. 1A, an embodiment of a network environment is depicted. In brief overview, the network environment includes one or more clients 102a-102n (also generally referred to as local machine(s) 102, client(s) 102, client node(s) 102, client machine(s) 102, client computer(s) 102, client device(s) 102, endpoint(s) 102, or endpoint node(s) 102) in communication with one or more servers 106a-106n (also generally referred to as server(s) 106, node 106, or remote machine(s) 106) via one or more networks 104. In some embodiments, a client 102 has the capacity to function as both a client node seeking access to resources provided by a server and as a server providing access to hosted resources for other clients 102a-102n.

Although FIG. 1A shows a network 104 between the clients 102 and the servers 106, the clients 102 and the servers 106 may be on the same network 104. In some embodiments, there are multiple networks 104 between the clients 102 and the servers 106. In one of these embodiments, a network 104' (not shown) may be a private network and a network 104 may be a public network. In another of these embodiments, a network 104 may be a private network and a network 104' a public network. In still another of these embodiments, networks 104 and 104' may both be private networks.

The network 104 may be connected via wired or wireless links. Wired links may include Digital Subscriber Line (DSL), coaxial cable lines, or optical fiber lines. The wireless links may include BLUETOOTH, Wi-Fi, Worldwide Interoperability for Microwave Access (WiMAX), an infrared channel or satellite band. The wireless links may also include any cellular network standards used to communicate among mobile devices, including standards that qualify as 1G, 2G, 3G, or 4G. The network standards may qualify as one or more generation of mobile telecommunication standards by fulfilling a specification or standards such as the specifications maintained by International Telecommunication Union. The 3G standards, for example, may correspond to the International Mobile Telecommunications-2000 (IMT-2000) specification, and the 4G standards may correspond to the International Mobile Telecommunications Advanced (IMT-Advanced) specification. Examples of cellular network standards include AMPS, GSM, GPRS, UMTS, LTE, LTE Advanced, Mobile WiMAX, and WiMAX-Advanced. Cellular network standards may use various channel access methods e.g. FDMA, TDMA, CDMA, or SDMA. In some embodiments, different types of data may be transmitted via different links and standards. In other embodiments, the same types of data may be transmitted via different links and standards.

The network 104 may be any type and/or form of network. The geographical scope of the network 104 may vary widely and the network 104 can be a body area network (BAN), a personal area network (PAN), a local-area network (LAN), e.g. Intranet, a metropolitan area network (MAN), a wide area network (WAN), or the Internet. The topology of the network 104 may be of any form and may include, e.g., any of the following: point-to-point, bus, star, ring, mesh, or tree. The network 104 may be an overlay network which is virtual and sits on top of one or more layers of other networks 104'. The network 104 may be of any such network topology as known to those ordinarily skilled in the art capable of supporting the operations described herein. The network 104 may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite may include application layer, transport layer, internet layer (including, e.g., IPv6), or the link layer. The network 104 may be a type of a broadcast network, a telecommunications network, a data communication network, or a computer network.

In some embodiments, the system may include multiple, logically-grouped servers 106. In one of these embodiments, the logical group of servers may be referred to as a server farm 38 or a machine farm 38. In another of these embodiments, the servers 106 may be geographically dispersed. In other embodiments, a machine farm 38 may be administered as a single entity. In still other embodiments, the machine farm 38 includes a plurality of machine farms 38. The servers 106 within each machine farm 38 can be heterogeneous—one or more of the servers 106 or machines 106 can operate according to one type of operating system platform (e.g., WINDOWS NT, manufactured by Microsoft Corp. of Redmond, Wash.), while one or more of the other servers 106 can operate on according to another type of operating system platform (e.g., Unix, Linux, or Mac OS X).

In one embodiment, servers 106 in the machine farm 38 may be stored in high-density rack systems, along with associated storage systems, and located in an enterprise data center. In this embodiment, consolidating the servers 106 in this way may improve system manageability, data security, the physical security of the system, and system performance by locating servers 106 and high performance storage systems on localized high performance networks. Centralizing the servers 106 and storage systems and coupling them with advanced system management tools allows more efficient use of server resources.

The servers 106 of each machine farm 38 do not need to be physically proximate to another server 106 in the same machine farm 38. Thus, the group of servers 106 logically grouped as a machine farm 38 may be interconnected using a wide-area network (WAN) connection or a metropolitan-area network (MAN) connection. For example, a machine farm 38 may include servers 106 physically located in different continents or different regions of a continent, country, state, city, campus, or room. Data transmission speeds between servers 106 in the machine farm 38 can be increased if the servers 106 are connected using a local-area network (LAN) connection or some form of direct connection. Additionally, a heterogeneous machine farm 38 may include one or more servers 106 operating according to a type of operating system, while one or more other servers 106 execute one or more types of hypervisors rather than operating systems. In these embodiments, hypervisors may be used to emulate virtual hardware, partition physical hardware, virtualize physical hardware, and execute virtual machines that provide access to computing environments, allowing multiple operating systems to run concurrently on a host computer. Native hypervisors may run directly on the host computer. Hypervisors may include VMware ESX/ESXi, manufactured by VMWare, Inc., of Palo Alto, Calif.; the Xen hypervisor, an open source product whose development is overseen by Citrix Systems, Inc.; the HYPER-V hypervisors provided by Microsoft or others. Hosted hypervisors may run within an operating system on a second software level. Examples of hosted hypervisors may include VMware Workstation and VIRTUALBOX.

Management of the machine farm 38 may be de-centralized. For example, one or more servers 106 may comprise components, subsystems and modules to support one or more management services for the machine farm 38. In one of these embodiments, one or more servers 106 provide functionality for management of dynamic data, including techniques for handling failover, data replication, and increasing the robustness of the machine farm 38. Each server 106 may communicate with a persistent store and, in some embodiments, with a dynamic store.

Server 106 may be a file server, application server, web server, proxy server, appliance, network appliance, gateway, gateway server, virtualization server, deployment server, SSL VPN server, or firewall. In one embodiment, the server 106 may be referred to as a remote machine or a node. In another embodiment, a plurality of nodes 290 may be in the path between any two communicating servers.

Figure 1B:
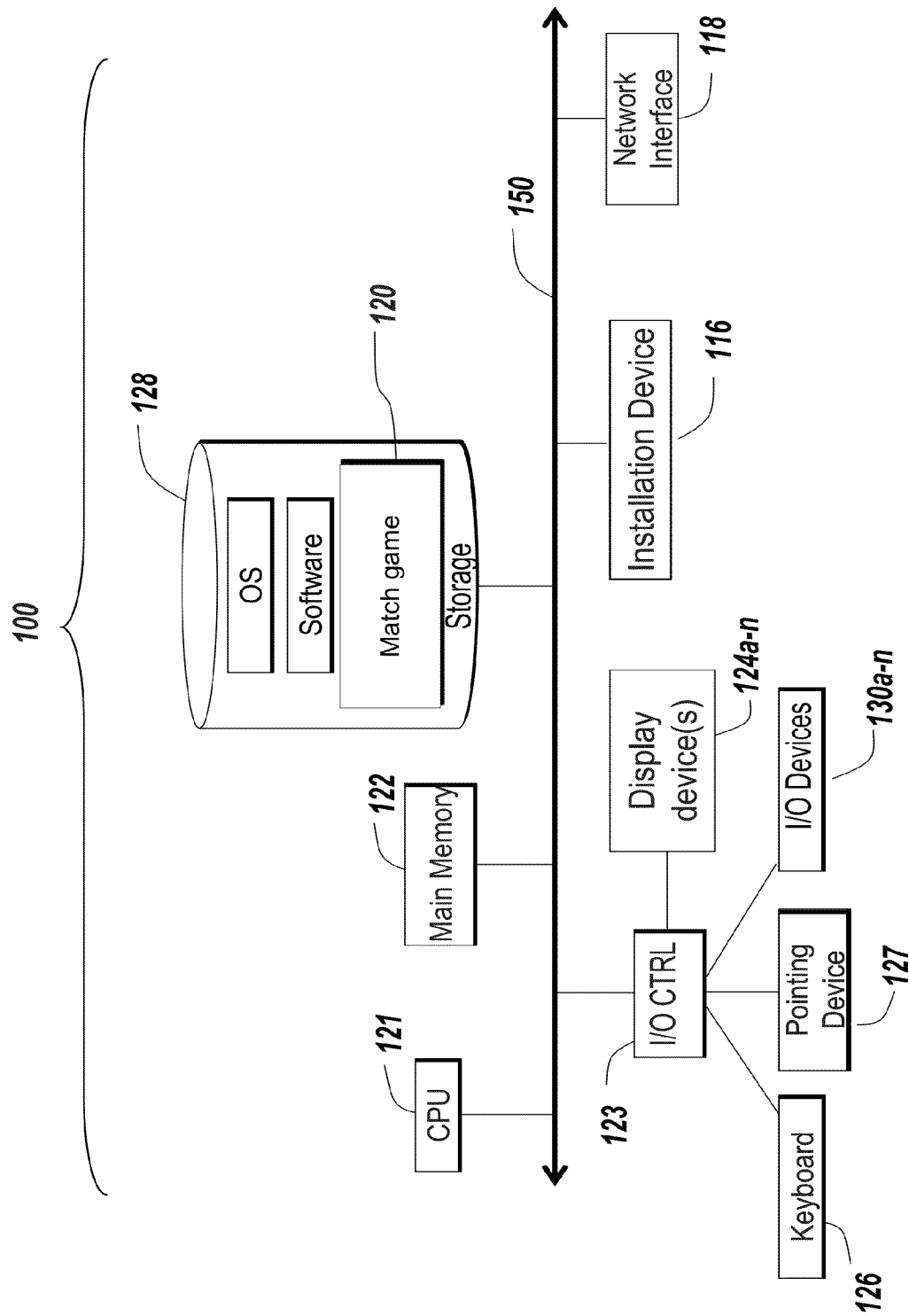
FIGS. 1B and 1C are block diagrams depicting embodiments of computing devices useful in connection with the methods and systems described herein.
Figure 1C:
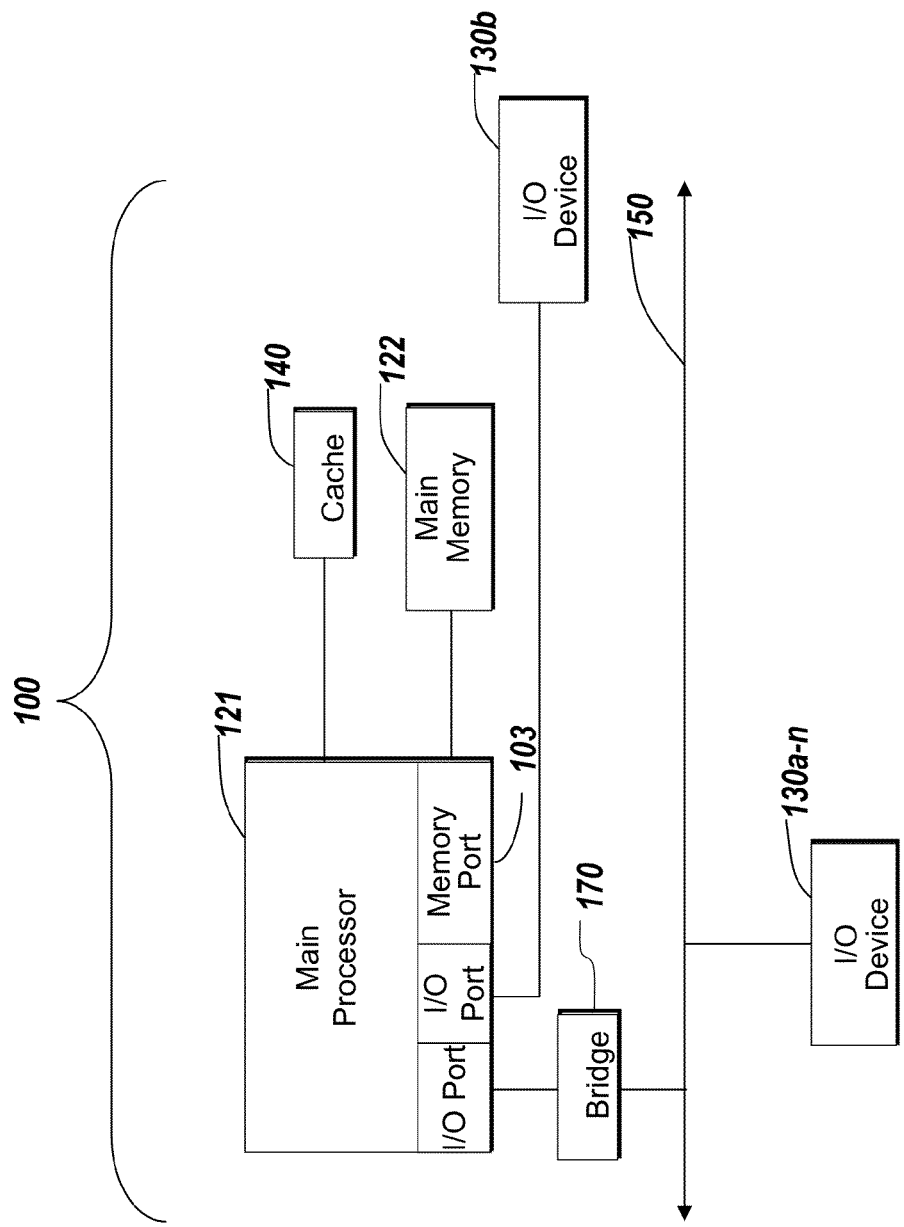

The client 102 and server 106 may be deployed as and/or executed on any type and form of computing device, e.g. a computer, network device or appliance capable of communicating on any type and form of network and performing the operations described herein. In many embodiments, the client 102 may comprise an Apple IPHONE smart phone, an Apple IPAD tablet computer, an Android operating system-based smart phone or tablet such as a Samsung Galaxy Tab, or any other such device including desktop computers, laptop computers, tablet computers, smart phones, or other devices. FIGS. 1B and 1C depict block diagrams of a computing device 100 useful for practicing an embodiment of the client 102 or a server 106. As shown in FIGS. 1B and 1C, each computing device 100 includes a central processing unit 121, and a main memory unit 122. As shown in FIG. 1B, a computing device 100 may include a storage device 128, an installation device 116, a network interface 118, an I/O controller 123, display devices 124a-124n, a keyboard 126 and a pointing device 127, e.g. a mouse. The storage device 128 may include, without limitation, an operating system, software, and a token match game or match game 120. As shown in FIG. 1C, each computing device 100 may also include additional optional elements, e.g. a memory port 103, a bridge 170, one or more input/output devices 130a-130n (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit 121 is provided by a microprocessor unit, e.g.: those manufactured by Intel Corporation of Mountain View, Calif.; those manufactured by Motorola Corporation of Schaumburg, Ill.; the ARM processor and TEGRA system on a chip (SoC) manufactured by Nvidia of Santa Clara, Calif.; the POWER7 processor, those manufactured by International Business Machines of White Plains, N.Y.; or those manufactured by Advanced Micro Devices of Sunnyvale, Calif. The computing device 100 may be based on any of these processors, or any other processor capable of operating as described herein. The central processing unit 121 may utilize instruction level parallelism, thread level parallelism, different levels of cache, and multi-core processors. A multi-core processor may include two or more processing units on a single computing component. Examples of a multi-core processors include the AMD PHENOM IIX2, INTEL CORE i5 and INTEL CORE i7.

Main memory unit 122 may include one or more memory chips capable of storing data and allowing any storage location to be directly accessed by the microprocessor 121. Main memory unit 122 may be volatile and faster than storage 128 memory. Main memory units 122 may be Dynamic random access memory (DRAM) or any variants, including static random access memory (SRAM), Burst SRAM or Synch-Burst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). In some embodiments, the main memory 122 or the storage 128 may be non-volatile; e.g., non-volatile read access memory (NVRAM), flash memory non-volatile static RAM (nvSRAM), Ferroelectric RAM (Fe-RAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Racetrack, Nano-RAM (NRAM), or Millipede memory. The main memory 122 may be based on any of the above described memory chips, or any other available memory chips capable of operating as described herein. In the embodiment shown in FIG. 1B, the processor 121 communicates with main memory 122 via a system bus 150 (described in more detail below). FIG. 1C depicts an embodiment of a computing device 100 in which the processor communicates directly with main memory 122 via a memory port 103. For example, in FIG. 1C the main memory 122 may be DRDRAM.

Figure 1D:
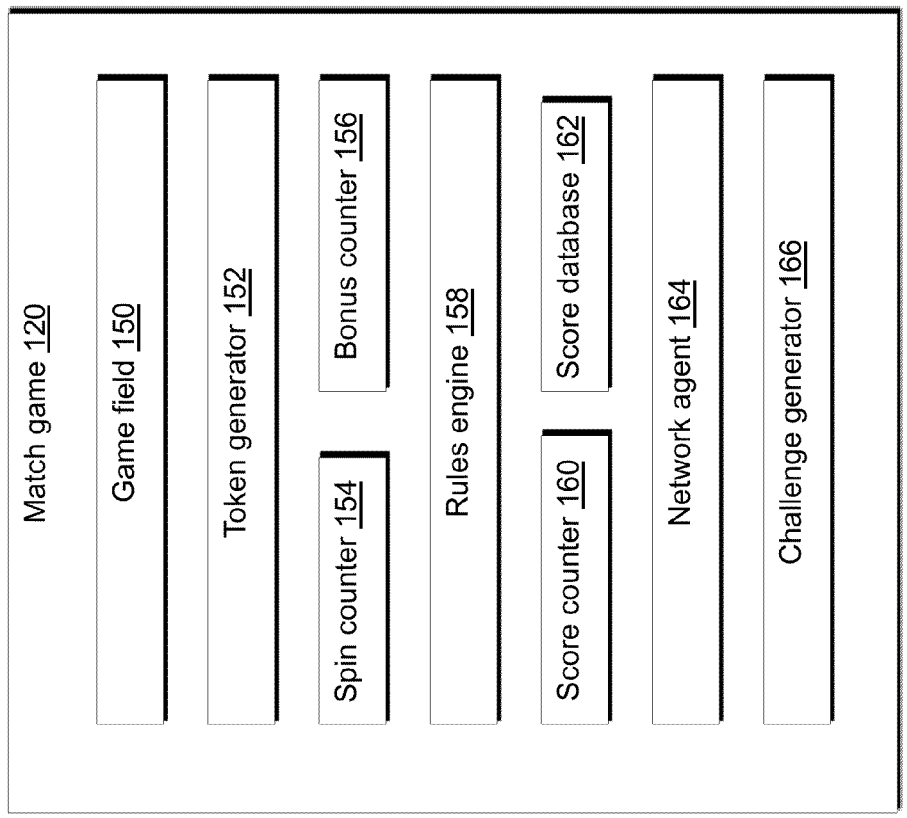
FIG. 1D is a block diagram of an embodiment of a token match game.

FIG. 1C depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is typically provided by SRAM, BSRAM, or EDRAM. In the embodiment shown in FIG. 1C, the processor 121 communicates with various I/O devices 130 via a local system bus 150. Various buses may be used to connect the central processing unit 121 to any of the I/O devices 130, including a PCI bus, a PCI-X bus, or a PCI-Express bus, or a NuBus. For embodiments in which the I/O device is a video display 124, the processor 121 may use an Advanced Graphics Port (AGP) to communicate with the display 124 or the I/O controller 123 for the display 124. FIG. 1D depicts an embodiment of a computer 100 in which the main processor 121 communicates directly with I/O device 130b or other processors 121' via HYPERTRANSPORT, RAPIDIO, or INFINIBAND communications technology. FIG. 1C also depicts an embodiment in which local busses and direct communication are mixed: the processor 121 communicates with I/O device 130a using a local interconnect bus while communicating with I/O device 130b directly.

A wide variety of I/O devices 130a-130n may be present in the computing device 100. Input devices may include keyboards, mice, trackpads, trackballs, touchpads, touch mice, multi-touch touchpads and touch mice, microphones, multi-array microphones, drawing tablets, cameras, single-lens reflex camera (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices may include video displays, graphical displays, speakers, headphones, inkjet printers, laser printers, and 3D printers.

Devices 130a-130n may include a combination of multiple input or output devices, including, e.g., Microsoft KINECT, Nintendo Wiimote for the WII, Nintendo WII U GAMEPAD, and may include discrete computing devices acting as an input or output devices, such as an Apple IPHONE. Some devices 130a-130n allow gesture recognition inputs through combining some of the inputs and outputs. Some devices 130a-130n provide for facial recognition which may be utilized as an input for different purposes including authentication and other commands. Some devices 130a-130n provide for voice recognition and inputs, including, e.g., Microsoft KINECT, SIRI for IPHONE by Apple, Google Now or Google Voice Search.

Additional devices 130a-130n have both input and output capabilities, including, e.g., haptic feedback devices, touchscreen displays, or multi-touch displays. Touchscreen, multi-touch displays, touchpads, touch mice, or other touch sensing devices may use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, e.g., pinch, spread, rotate, scroll, or other gestures. Some touchscreen devices, including, e.g., Microsoft PIXELSENSE or Multi-Touch Collaboration Wall, may have larger surfaces, such as on a table-top or on a wall, and may also interact with other electronic devices. Some I/O devices 130a-130n, display devices 124a-124n or group of devices may be augment reality devices. The I/O devices may be controlled by an I/O controller 123 as shown in FIG. 1B. The I/O controller may control one or more I/O devices, such as, e.g., a keyboard 126 and a pointing device 127, e.g., a mouse or optical pen.

Furthermore, an I/O device may also provide storage and/or an installation medium 116 for the computing device 100. In still other embodiments, the computing device 100 may provide USB connections (not shown) to receive handheld USB storage devices. In further embodiments, an I/O device 130 may be a bridge between the system bus 150 and an external communication bus, e.g. a USB bus, a SCSI bus, a FireWire bus, an Ethernet bus, a Gigabit Ethernet bus, a Fibre Channel bus, or a Thunderbolt bus.

In some embodiments, display devices 124a-124n may be connected to I/O controller 123. Display devices may include, e.g., liquid crystal displays (LCD), thin film transistor LCD (TFT-LCD), blue phase LCD, electronic papers (e-ink) displays, flexile displays, light emitting diode displays (LED), digital light processing (DLP) displays, liquid crystal on silicon (LCOS) displays, organic light-emitting diode (OLED) displays, active-matrix organic light-emitting diode (AMOLED) displays, liquid crystal laser displays, time-multiplexed optical shutter (TMOS) displays, or 3D displays. Examples of 3D displays may use, e.g. stereoscopy, polarization filters, active shutters, or autostereoscopy. Display devices 124a-124n may also be a head-mounted display (HMD). In some embodiments, display devices 124a-124n or the corresponding I/O controllers 123 may be controlled through or have hardware support for OPENGL or DIRECTX API or other graphics libraries.

In some embodiments, the computing device 100 may include or connect to multiple display devices 124a-124n, which each may be of the same or different type and/or form. As such, any of the I/O devices 130a-130n and/or the I/O controller 123 may include any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may include multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices 100a or 100b connected to the computing device 100, via the network 104. In some embodiments software may be designed and constructed to use another computer's display device as a second display device 124a for the computing device 100. For example, in one embodiment, an Apple iPad may connect to a computing device 100 and use the display of the device 100 as an additional display screen that may be used as an extended desktop. One ordinarily skilled in the art will recognize and appreciate the various ways and embodiments that a computing device 100 may be configured to have multiple display devices 124a-124n.

Referring again to FIG. 1B, the computing device 100 may comprise a storage device 128 (e.g. one or more hard disk drives or redundant arrays of independent disks) for storing an operating system or other related software, and for storing application software programs such as any program related to the token match game software 120. Examples of storage device 128 include, e.g., hard disk drive (HDD); optical drive including CD drive, DVD drive, or BLU-RAY drive; solid-state drive (SSD); USB flash drive; or any other device suitable for storing data. Some storage devices may include multiple volatile and non-volatile memories, including, e.g., solid state hybrid drives that combine hard disks with solid state cache. Some storage devices 128 may be non-volatile, mutable, or read-only. Some storage devices 128 may be internal and connect to the computing device 100 via a bus 150. Other storage devices 128 may be external and connect to the computing device 100 via a I/O device 130 that provides an external bus. Still other storage devices 128 may connect to the computing device 100 via the network interface 118 over a network 104, including, e.g., the Remote Disk for the MACBOOK AIR by Apple. Some client devices 100 may not require a non-volatile storage device 128 and may be thin clients or zero clients 102. Some storage devices 128 may also be used as a installation device 116, and may be suitable for installing software and programs. In some implementations, the operating system and the software can be run from a bootable medium, for example, a bootable CD, e.g. KNOPPIX, available as a GNU/Linux distribution from knoppix.net.

Client device 100 may also install software or application from an application distribution platform. Examples of application distribution platforms include the App Store for iOS provided by Apple, Inc., the Mac App Store provided by Apple, Inc., GOOGLE PLAY for Android OS provided by Google Inc., Chrome Webstore for CHROME OS provided by Google Inc., and Amazon Appstore for Android OS and KINDLE FIRE provided by Amazon.com, Inc. An application distribution platform may facilitate installation of software on a client device 102. An application distribution platform may include a repository of applications on a server 106 or a cloud 108, which the clients 102a-102n may access over a network 104. An application distribution platform may include application developed and provided by various developers. A user of a client device 102 may select, purchase and/or download an application via the application distribution platform.

Furthermore, the computing device 100 may include a network interface 118 to interface to the network 104 through a variety of connections including, but not limited to, standard telephone lines LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, cellular connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMax and direct asynchronous connections). In one embodiment, the computing device 100 communicates with other computing devices 100' via any type and/or form of gateway or tunneling protocol e.g. Secure Socket Layer (SSL) or Transport Layer Security (TLS), or the Citrix Gateway Protocol manufactured by Citrix Systems, Inc. of Ft. Lauderdale, Fla. The network interface 118 may comprise a built-in network adapter, network interface card, PCMCIA network card, EXPRESSCARD network card, card bus network adapter, wireless network adapter, USB network adapter, modem or any other device suitable for interfacing the computing device 100 to any type of network capable of communication and performing the operations described herein.

A computing device 100 of the sort depicted in FIGS. 1B and 1C may operate under the control of an operating system, which controls scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 2000, WINDOWS Server 2012, WINDOWS CE, WINDOWS Phone, WINDOWS XP, WINDOWS VISTA, and WINDOWS 7, WINDOWS RT, and WINDOWS 8 all of which are manufactured by Microsoft Corporation of Redmond, Wash.; MAC OS and iOS, manufactured by Apple, Inc. of Cupertino, Calif.; and Linux, a freely-available operating system, e.g. Linux Mint distribution ("distro") or Ubuntu, distributed by Canonical Ltd. of London, United Kingdom; or Unix or other Unix-like derivative operating systems; and Android, designed by Google, of Mountain View, Calif., among others. Some operating systems, including, e.g., the CHROME OS by Google, may be used on zero clients or thin clients, including, e.g., CHROMEBOOKS.

The computer system 100 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. The computer system 100 has sufficient processor power and memory capacity to perform the operations described herein. In some embodiments, the computing device 100 may have different processors, operating systems, and input devices consistent with the device. The Samsung GALAXY smartphones, e.g., operate under the control of Android operating system developed by Google, Inc. GALAXY smartphones receive input via a touch interface.

In some embodiments, the computing device 100 is a gaming system. For example, the computer system 100 may comprise a PLAYSTATION 3, or PERSONAL PLAYSTATION PORTABLE (PSP), or a PLAYSTATION VITA device manufactured by the Sony Corporation of Tokyo, Japan, a NINTENDO DS, NINTENDO 3DS, NINTENDO WII, or a NINTENDO WII U device manufactured by Nintendo Co., Ltd., of Kyoto, Japan, an XBOX 360 device manufactured by the Microsoft Corporation of Redmond, Wash.

In some embodiments, the computing device 100 is a digital audio player such as the Apple IPOD, IPOD Touch, and IPOD NANO lines of devices, manufactured by Apple Computer of Cupertino, Calif. Some digital audio players may have other functionality, including, e.g., a gaming system or any functionality made available by an application from a digital application distribution platform. For example, the IPOD Touch may access the Apple App Store. In some embodiments, the computing device 100 is a portable media player or digital audio player supporting file formats including, but not limited to, MP3, WAV, M4A/AAC, WMA Protected AAC, RIFF, Audible audiobook, Apple Lossless audio file formats and .mov, .m4v, and .mp4MPEG-4 (H.264/MPEG-4 AVC) video file formats.

In some embodiments, the computing device 100 is a tablet e.g. the IPAD line of devices by Apple; GALAXY TAB family of devices by Samsung; or KINDLE FIRE, by Amazon.com, Inc. of Seattle, Wash. In other embodiments, the computing device 100 is a eBook reader, e.g. the KINDLE family of devices by Amazon.com, or NOOK family of devices by Barnes & Noble, Inc. of New York City, N.Y.

In some embodiments, the communications device 102 includes a combination of devices, e.g. a smartphone combined with a digital audio player or portable media player. For example, one of these embodiments is a smartphone, e.g. the IPHONE family of smartphones manufactured by Apple, Inc.; a Samsung GALAXY family of smartphones manufactured by Samsung, Inc; or a Motorola DROID family of smartphones. In yet another embodiment, the communications device 102 is a laptop or desktop computer equipped with a web browser and a microphone and speaker system, e.g. a telephony headset. In these embodiments, the communications devices 102 are web-enabled and can receive and initiate phone calls. In some embodiments, a laptop or desktop computer is also equipped with a webcam or other video capture device that enables video chat and video call.

In some embodiments, the status of one or more machines 102, 106 in the network 104 is monitored, generally as part of network management. In one of these embodiments, the status of a machine may include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, this information may be identified by a plurality of metrics, and the plurality of metrics can be applied at least in part towards decisions in load distribution, network traffic management, and network failure recovery as well as any aspects of operations of the present solution described herein. Aspects of the operating environments and components described above will become apparent in the context of the systems and methods disclosed herein.

Referring now to FIG. 1D, illustrated is a block diagram of an embodiment of a token match game 120. A token match game 120 may comprise an application, applet, routine, game engine, or other executable logic for providing an interactive matching game to a player or user, and may be variously referred to as a match game, token match game, game engine, game, game application, application, or by any other such term. In many embodiments, a token match game 120 may be purchased, downloaded, and installed via an online application store such as the Apple App Store or Google Play. In other embodiments, a token match game 120 may be presented as a web application in Flash, Java, HTML5, or any other such programming language. In some embodiments, a token match game 120 may be programmed in a cross-platform language, such as Unity by Unity Technologies of San Francisco, Calif., and may be available in several formats.

In brief overview, a token match game, sometimes referred to as a match game or a slot-match game, may comprise a game field or playing field 150, which may comprise two arrays, discussed in more detail below. The match game 120 may also comprise a token generator 152 for generating or selecting tokens to fill the two arrays. In some embodiments, the match game 120 may comprise a spin counter 154 for counting a number of spins or rounds available to a player, and/or a bonus counter 156 for storing a score multiplier value. In some embodiments, the match game 120 may comprise a rules engine 158 for identifying adjacent matching tokens, wild card progressions, or board clearances. In some embodiments, the match game 120 may include a score counter 160 for keeping track of a player's score, as well as a score database 162 for retaining previous high scores. The match game 120 may include a network agent 164 for communicating with social networking services or email for communicating a player's score or challenging other players; for receiving regional or global high scores; or for receiving game updates. In some embodiments, the match game may include a challenge generator 166 for dynamically generating a periodic challenge, such as a daily challenge, and/or may receive challenge information via network agent 164. In other embodiments, the match game may have one or more predetermined levels, which may be selected by a player. Levels may vary in difficulty, based on different sizes or shapes of boards; different numbers of spins or rounds of play allowed; different score goals; different numbers of token types; the presence or absence of tokens having special features or properties; or any other such feature.

Still referring to FIG. 1D and in more detail, in some embodiments, a match game 120 may comprise a game field 150. Game field 150 may comprise an array, data table, database, or other data format for identifying tokens in one or more arrays of a game. Referring to FIGS. 2A-2D, illustrated are diagrams illustrating successive steps of token selection, replacement, and scoring in an embodiment of a token match game 120. As shown, the game field 150 may comprise two arrays, 202, 204. The first array 202 may be referred to as a playing field, in-play field, or by similar terms, and may have a dimension of l×m In some embodiments, as shown, l and m may be identical values and the array may be square, while in other embodiments, the array may be rectangular. In some embodiments, the match game 120 may have different modes including "small boards" and "large boards" with correspondingly different values of l and m, such as 6×7 for a "small" board and 7×8 for a "large" board. Other values and sizes may be used, as well as other relative descriptors, including "tiny", "normal", "big", "huge", or any other value. In some embodiments, a user or player may be able to specify a size of one or both of l and m.

The second array 204 may be referred to as a "hand" or by a similar term, and may have a dimension of l×n. Each cell in array 204 may correspond to a column or row of cells in first array 202 (depending on orientation of the second array 204 to the first array 202). For example, in implementations using the orientation shown, each cell in array 204 may correspond to a column of cells in first array 202, such that a player may swap any token in the column of first array 202 with the token in the corresponding cell of second array 204.

As shown, each cell may include a token, which may be in various shapes and/or colors 206a-206e, referred to generally as token(s) 206. In some embodiments, tokens 206 may be referred to as "gems", "coins", "cards", "icons", "sprites", "items", or any other such identifier. Although shown as polyhedrons, tokens 206 may also comprise playing cards of different values such as jacks, queens, kings, and aces; alphanumeric icons; Greek letters or symbols; blocks of different colors and/or patterns; icons of different types of candy, foods, or animals; or any other type of distinct shapes, letters, colors, symbols, portraits, devices, or icons.

Figure 2A:
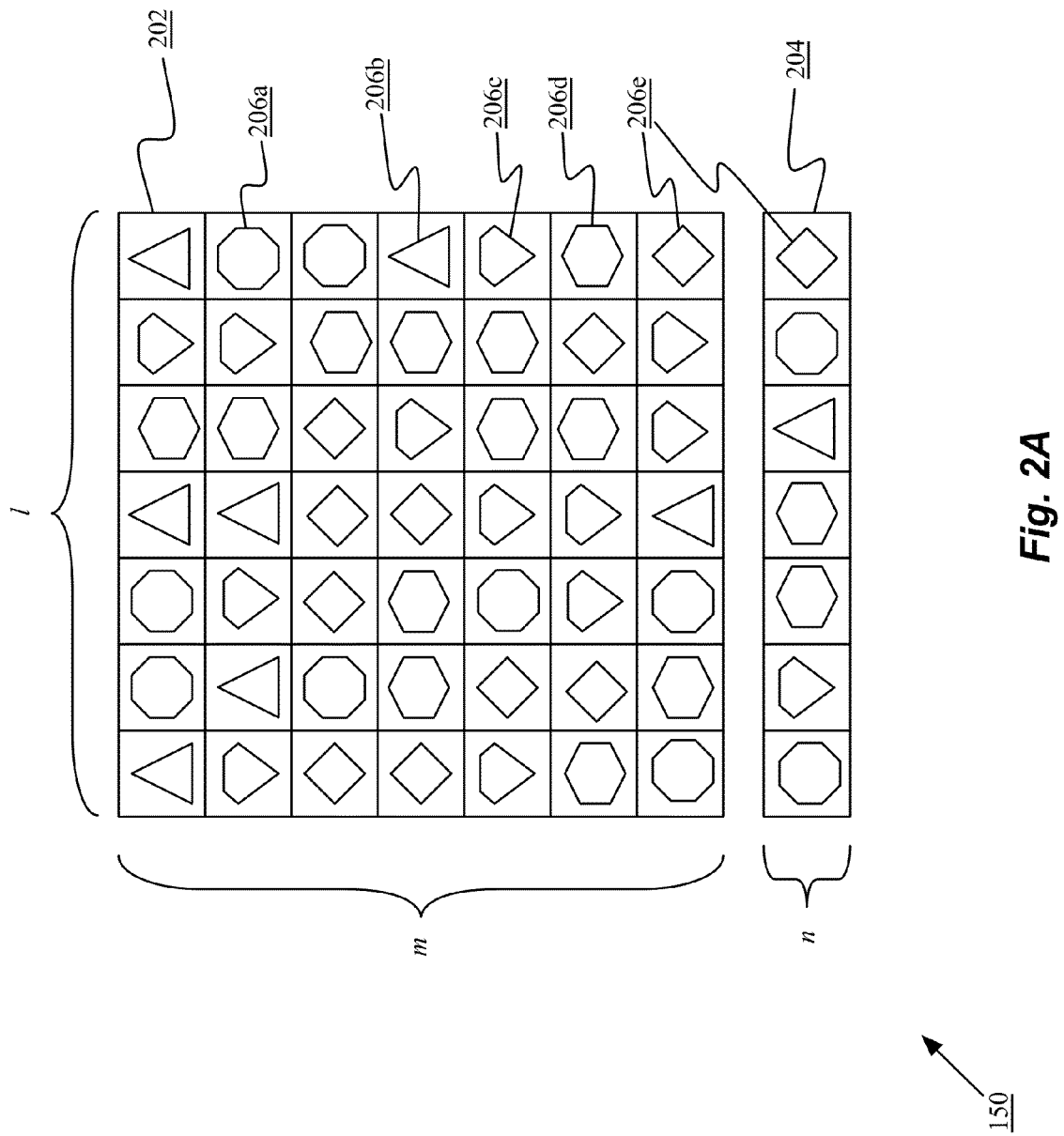
FIGS. 2A-2D are diagrams illustrating successive steps of token selection, replacement, and scoring in an embodiment of a token match game.
Figure 2B:
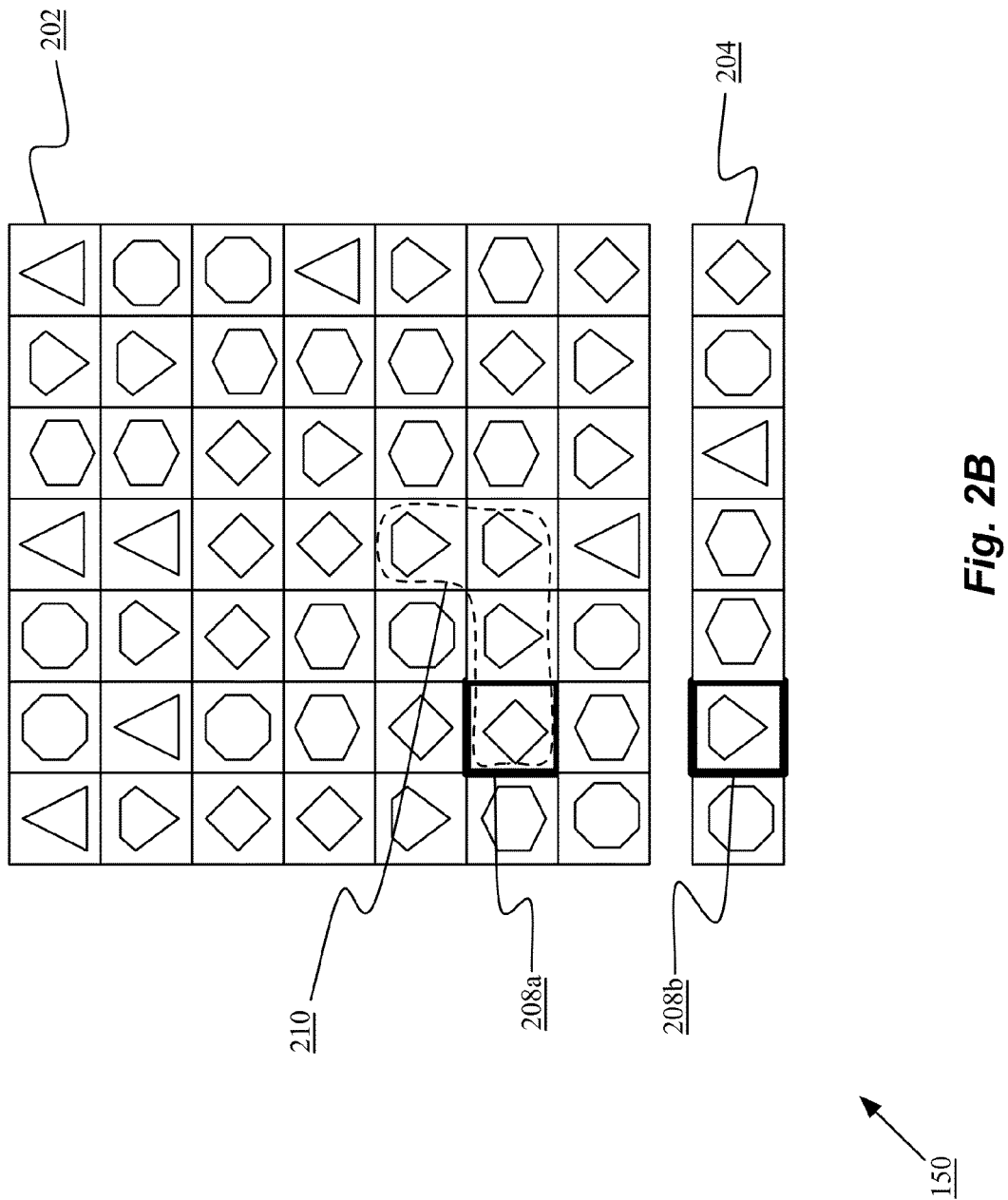
Figure 2C:
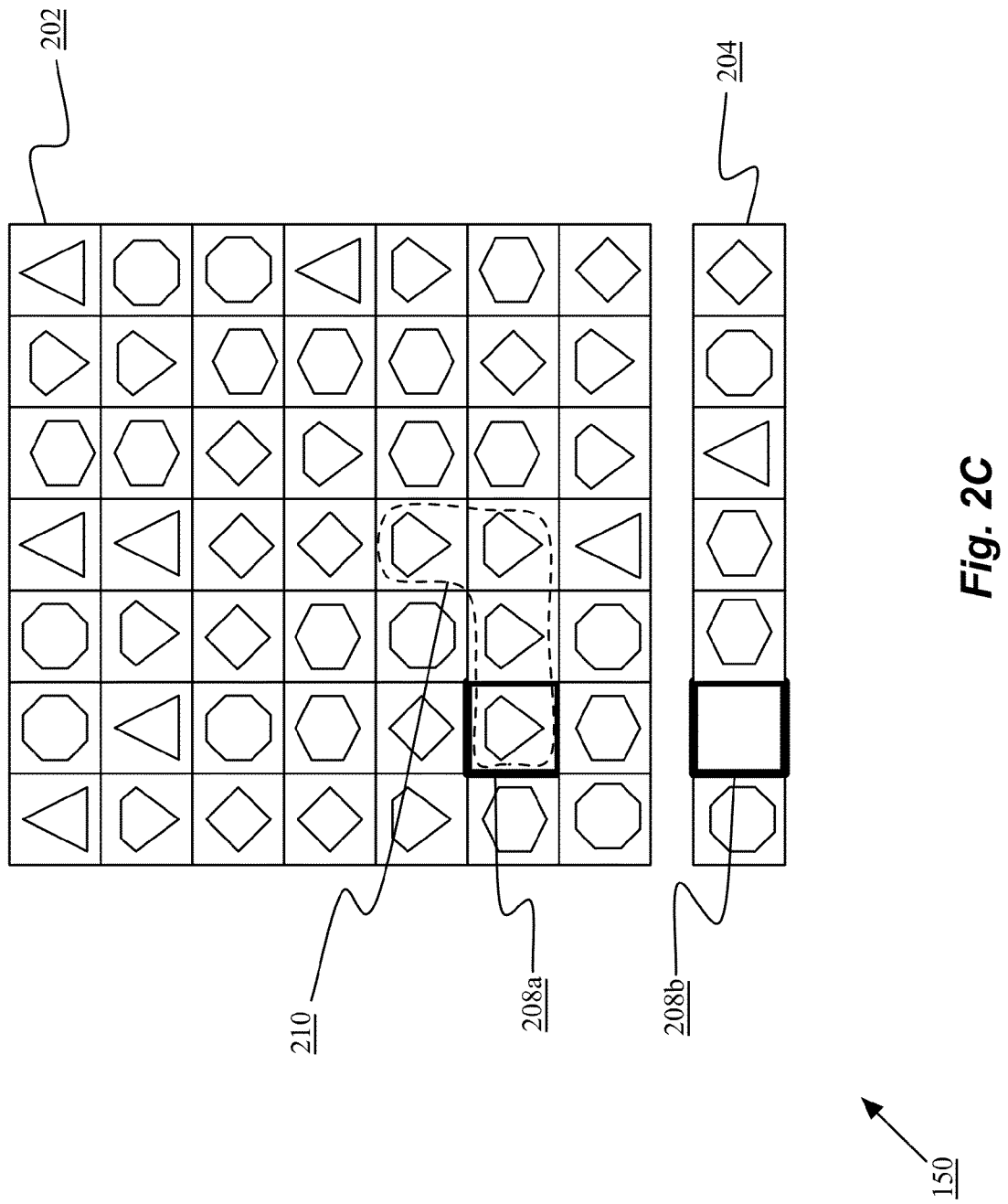

Referring now to FIG. 2B, in play, a player may select a cell 208a of first array 202 (illustrated in bold line) to replace the token 206 within said cell 208a with a token in a corresponding cell 208b of second array 204 (illustrated in bold line). As discussed above, cell 208b may correspond to any cell in the corresponding column (or row, depending on orientation) of first array 202. By replacing the token 206 in cell 208a with the token 206 in cell 208b, the player may create a region 210 of adjacent identical tokens 206 (illustrated in dashed line) as shown in FIG. 2C. In some implementations, the player may freely replace any token in a cell 208a, while in other implementations, the player may only replace a token in a cell 208a if it results in creation of a region 210 of adjacent identical tokens. In many implementations, the region 210 may have a minimum size, such as three adjacent tokens, and the player may not replace the token in cell 208a if it results in creation of a region 210 of less than the minimum size.

Although shown as a non-linear region 210, in some embodiments or game play modes, the region 210 may be constrained to a single line. For example, in one such embodiment, a player may select a cell to replace with a token from a corresponding cell in the second array 204 and create a line of three adjacent or more tokens. These tokens may then be removed. Lines may be vertical, horizontal, or, in some embodiments, diagonal.

Figure 2D:
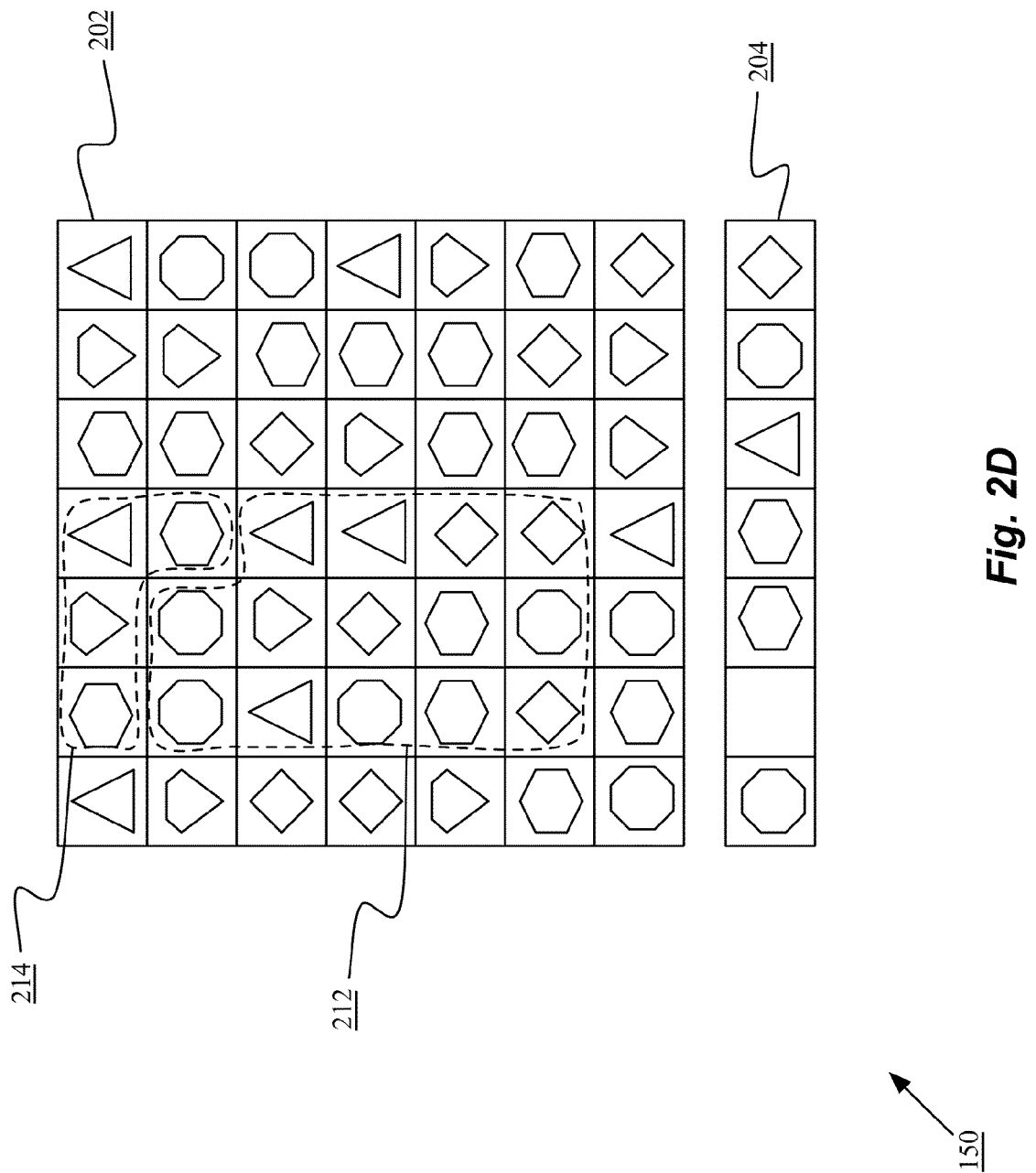

Once a region of adjacent identical tokens 210 has been created, the tokens within the region 210 may be removed and the player may receive a score. In some embodiments, the player may receive a score of a predetermined value multiplied by the number of tokens within the region. For example, given a value of 100 points, generating a region of five tokens may result in a score of 500 points, while generating a region of eight tokens may result in a score of 800 points. In other embodiments, the player may receive a score of a predetermined value raised to a power of the number of tokens within the region, such as $2^n$ points. Other scoring values may be used, such as bonuses for generating a region of seven tokens. Once the tokens in region 210 are removed, resulting empty cells in array 202 may be filled in. In some embodiments, as shown in FIG. 2D, tokens in cells of positions above the region 210 in the array 202 may be lowered to fill the empty spaces (shown in dotted line as region 212). The resulting empty spaces may thus be raised to the top of the array (region 214 in dotted line), and new tokens 206 may be selected randomly to fill said empty spaces. This allows the player to apply some strategy through removal of tokens in lower spaces in the array to shift tokens in higher spaces into new adjacent regions. In many embodiments, tokens in the array may only be shifted in a single direction, e.g. downwards, as shown in FIG. 2D. In other embodiments, described in more detail below, tokens in the array may be shifted in two directions, e.g. downwards and sideways. As shown, in many embodiments, cell 208b in second array 204 may not be filled in with a new token. In such embodiments, the player may be required to utilize all tokens in their "hand" or array 204 before drawing a new "hand".

In some embodiments, the region 210 may be removed once per player selection. In other embodiments, after removal and shifting of other tokens to fill empty spaces, if the resulting configuration includes other regions of adjacent tokens, these other regions may be removed. This may sometimes be referred to as a "combo" or combination move. Such embodiments may thus allow for a series of successive region-removal steps, which may be accompanied by higher score multipliers or score values. For example, as discussed above, in one embodiment or game play mode, regions 210 may be constrained to vertical, horizontal, and/or diagonal lines. In one such embodiment, after a player selects a cell and creates a line of three or more adjacent identical tokens, the line may be removed, other tokens may be shifted to fill the empty cells, and new tokens may be randomly selected to fill cells at the edge of the first array. If the first array subsequently contains one or more lines of at least three adjacent identical tokens, these lines may also be removed and the player's score incremented. This removal of lines or regions, shift of tokens, and scanning of the array may be repeated iteratively until no more lines or regions of at least three adjacent identical tokens exist in the first array, at which point regular play may continue.

Returning now to FIG. 1D, the match game 120 may include a token generator 152. As discussed above, tokens 206 may be randomly selected to fill in spaces in array 202, 204. Accordingly, token generator 152 may comprise a random number generator or pseudo-random number generator, and/or may calculate a modulus i of a generated random number with i equal to the number of different tokens to select one or more tokens to add to array 202 or 204 to fill empty spaces. In some embodiments, the token generator 152 may select tokens from a subset of the different tokens available. For example, in one such embodiment, the token generator 152 may select tokens from a first subset for filling in array 202 (such as a base set of tokens), and may select tokens from a second subset for filling in array 204 (such as the base set of tokens, plus wildcards or wild gems, keys, or other special tokens, discussed in more detail below). Accordingly, "randomly selected" may refer to a selection of tokens via a random or pseudo-random number generator, and/or may refer to a selection of a first set of one or more tokens randomly and a second set of one more tokens non-randomly. For example, the token generator may select five tokens for an array 204 randomly and select a special or wild token, discussed in more detail below, to be used as a sixth token in array 204. In some embodiments, the token generator may select all tokens for an array non-randomly, such as responsive to a player- or rules engine-triggered event (e.g. a boost or power, discussed in more detail below).

In some embodiments, the match game 120 may include a spin counter 154. Spin counter 154 may comprise a counter that is decremented (or incremented to eventually reach a predetermined final value) with each "round" of play in which the player draws a new "hand" to refill array 204. In some embodiments, counter 154 may be referred to as a spin counter because the mechanism for requesting or drawing a new hand may comprise pulling a simulated lever of a slot machine to "spin" the cells of array 204 to new values. In other embodiments, counter 154 may be referred to as a "round" counter, "life" counter, or any other such term. Spin counter 154 may be set to an initial value that may be varied responsive to difficulty of the game, time to play, or other such features, and may be set automatically or by the player (or, conversely, spin counter 154 may be set to an initial value of 0 or 1 and incremented to a final value set responsive to difficult, time to play, or other such features).

In some embodiments, the match game 120 may include a bonus counter or multiplier counter 156. In one such embodiment, the bonus counter or multiplier counter may be incremented each time the player successfully uses every token in their "hand" or array 204 to generate adjacent regions 210 in array 202. The counter 156 may be incremented, and array 204 may be refilled with randomly selected tokens, and the value of counter 156 may be applied as a multiplier to the score for each token removed. For example, if tokens are normally worth 100 points such that matching a region of four adjacent tokens is 400 points, if the player successfully plays every token in array 204, the counter 156 may be incremented to "2" and a new hand drawn. If the player subsequently matches a region of four adjacent tokens, the player may receive a score of 800 points.

In many embodiments, the value of counter 156 may be reset if the player cannot match any tokens in array 204 and draws a new hand. In a further embodiment, the base value of counter 156 may be permanently increased (for the duration of a game) by matching special tokens or completing a level, discussed in more detail below. If the player subsequently draws a new hand, the counter 156 may be reset to the permanently increased base value. For example, in one such embodiment, the player may use all tokens in array 204 and increase the counter 156 to "2". The player may then complete the level or match a special token and increase the counter to "3" and permanently increment the base value to "2". The player may then use all of the tokens in array 204 again, and increase counter 156 to "4". If the player then draws a new hand, the counter may be reset to the increased value of "2". Although discussed in terms of a counter and base value, in many embodiments, counter 156 may comprise two counters, with a first counter incremented for each hand or level completed; the second counter incremented for each level completed; and the first counter reset to the value of the second counter upon drawing a new hand.

In another embodiment or game play mode, referred to as a "blitz" mode, the match game 120 may comprise a play timer (not illustrated) of a predetermined number of seconds, such as 30, 60, 120 seconds or any other value. Upon expiration of the play timer, the game may end and/or proceed to a bonus spin, discussed in more detail below. This may provide for short, intense or exciting game play. In one embodiment, the play timer may be incremented by a number of seconds if the player successfully uses every token in array 204 as discussed above. For example, in one such embodiment, if the player utilizes every token in their hand, the play timer may be incremented by 10 seconds.

In some embodiments, a match game 120 may comprise a rules engine 158 for identifying matching adjacent tokens in a region 210 of array 202 and/or determining if a token should be removed or replaced. In some embodiments of a match game 120, if a player creates a region 210 of adjacent matching tokens of less than a predetermined size by replacing a selected token in array 202 with a second token from array 204, the second token (along with other tokens in region 210) may be removed from array 202 and the empty spaces filled in as discussed above. In a further embodiment, if the player creates a region 210 of adjacent matching tokens of equal to or greater than the predetermined size, the match game 120 may replace the second token with a special token, which may have a distinctive appearance, such as a diamond gem, flashing pattern, or other identifier. Other tokens in region 210 may be removed, and spaces in array 202 filled in as discussed above, leaving the special token in place. Play may then continue. If, subsequently, the player creates a region 210 of adjacent matching special tokens, in some embodiments, the selected token may be replaced by a second special token, which may have another distinctive appearance, such as a key or other identifier. Play may then continue again. If, subsequently, the player creates a region 210 of adjacent matching second special tokens, in some embodiments, the level may be completed. Completing the level may result in removal of all tokens in array 202 (frequently with the player receiving a score for each token, which may be increased with a multiplier as discussed above with bonus counter 156), and a new set of tokens selected to fill array 202. In some embodiments, the game engine may increment the spin counter upon completing the level, resulting in an 'extra life' or extra round for the player.

For example, in one embodiment, a player may match 7 "regular" token in a first region 210 and receive a diamond gem in place of the selected token. The player may match another 7 regular tokens in a second region 210' (conveniently next to or nearby region 210 in this example) and receive a second diamond gem (correspondingly next to or near the first diamond gem). The player may then create a third region 210" with the diamond gems (either via a diamond gem in array 204 or a wildcard token which may be used to match any other tokens, discussed in more detail below), and receive a golden key in place of the selected token. Upon creating a region of adjacent matching golden keys (again, via a key in array 204 or wildcard token), the game may clear and refill array 202 with the player receiving points for each cleared token. In many embodiments, the score value for each diamond gem, key, or other special token may be higher than the score value for each regular or base token.

Match game 120 may include a score counter 160. Score counter 160 may be a counter or string incremented to keep track of a player score during play. In many embodiments, the resulting score may be saved to a score database 162, which may comprise a list of previous scores or a predetermined number of the highest scores (i.e. a high score list). In some embodiments, score database 162 may store a plurality of lists, including lists of high scores in specific game configurations (e.g. "large board" or "normal board"), global or regional high score lists received from a server, daily or weekly high score lists, or other such lists.

In some embodiments, a player's score may be shared with other players or friends via social networking services such as Facebook or Twitter, emailed to other players or friends, or communicated to a server for inclusion in global or regional high score lists via a network agent 164. Network agent 164 may comprise an application, service, daemon, routine, API, or other executable logic for communicating with a server via a network, and may be provided by the operating system of the device. Network agent 164 may transmit and receive information including scores, game configurations, player identifiers, challenges, or other such information.

In some embodiments, a match game 120 may include a challenge generator 166, and/or may receive challenges via a network agent 164 from a server or from other computing devices. A challenge may comprise a game configuration, including a board size, predetermined region size to generate a special token, number of rounds or spins, and a target score for the player to meet or exceed. Challenges may be generated daily, hourly, weekly, or at any other such interval. Challenge generator 166 may comprise an application, service, daemon, routine, or other executable logic, and may be executed by the player's computing device, by a server, or by another player's device. In the latter two implementations, challenges may be transmitted and received via network agent 164, allowing a player to participate in a global or regional challenge, or allowing a player to challenge friends. In some embodiments, a player may manually create a challenge by specifying the game configuration, while in other embodiments, the challenge generator 166 may dynamically generate the game configuration according to one or more rules. In one such embodiment, each configuration variable may have an associated score and/or difficulty value, and the target score may be calculated responsive to each configuration variable. For example, the challenge generator 166 may randomly select a board size or size for array 204 and/or 202 from a predetermined plurality of board sizes, each having an associated value (e.g. 7×6 array=1, 8×7 array=1.2, etc.); may randomly select a number of base tokens, with a corresponding value (e.g. 5 tokens=1, 6 tokens=0.8, 7 tokens=0.6, etc.); may randomly select a predetermined region size to generate a special token (e.g. region size 6=1, region size 7=0.5, region size 8=0.2, etc.); and may randomly select a number of spins with an associated value (e.g. 10 spins=1, 15 spins=2, 20 spins=3, etc.). The challenge generator 166 may then calculate a target score as a base score multiplied by each value associated with a variable. For example, and using the exemplary values above and a base score of 100,000, given a challenge of an 8×7 array with 6 tokens, region size 7, and 15 spins, the target score may be 120,000. The associated values for each variable may be set responsive to the corresponding difficulty associated with each variable: more spins may be easier, resulting in a higher target score; a greater variety of tokens may be more difficult to match, resulting in a lower target score. Accordingly, although the challenges may differ wildly in board size, number of spins, types of tokens, game play parameters, and target score, each challenge may be roughly equal in difficulty for the player. One of skill in the art may readily appreciate that the exemplary values above are presented for descriptive purposes only, and as such, are selected to make the exemplary mathematics easy. In practice, the values associated with each variable may be much different, and may be set by the developer responsive to play testing for consistent difficulty through successive challenges. In a similar embodiment, rather than using multipliers, specific score values may be used (e.g. utilizing 5 tokens adds 300,000 to the base score, while utilizing 6 tokens adds 200,000 to the base score, etc.). In other embodiments, the match game may include a series of predetermined levels with different features, such as board size, number of spins, types of tokens, target scores, game play parameters, etc. In some such embodiments, the player may be required to complete one or more levels (through one or more attempts) before allowing to progress to a successive level or series of levels.

Figure 3:
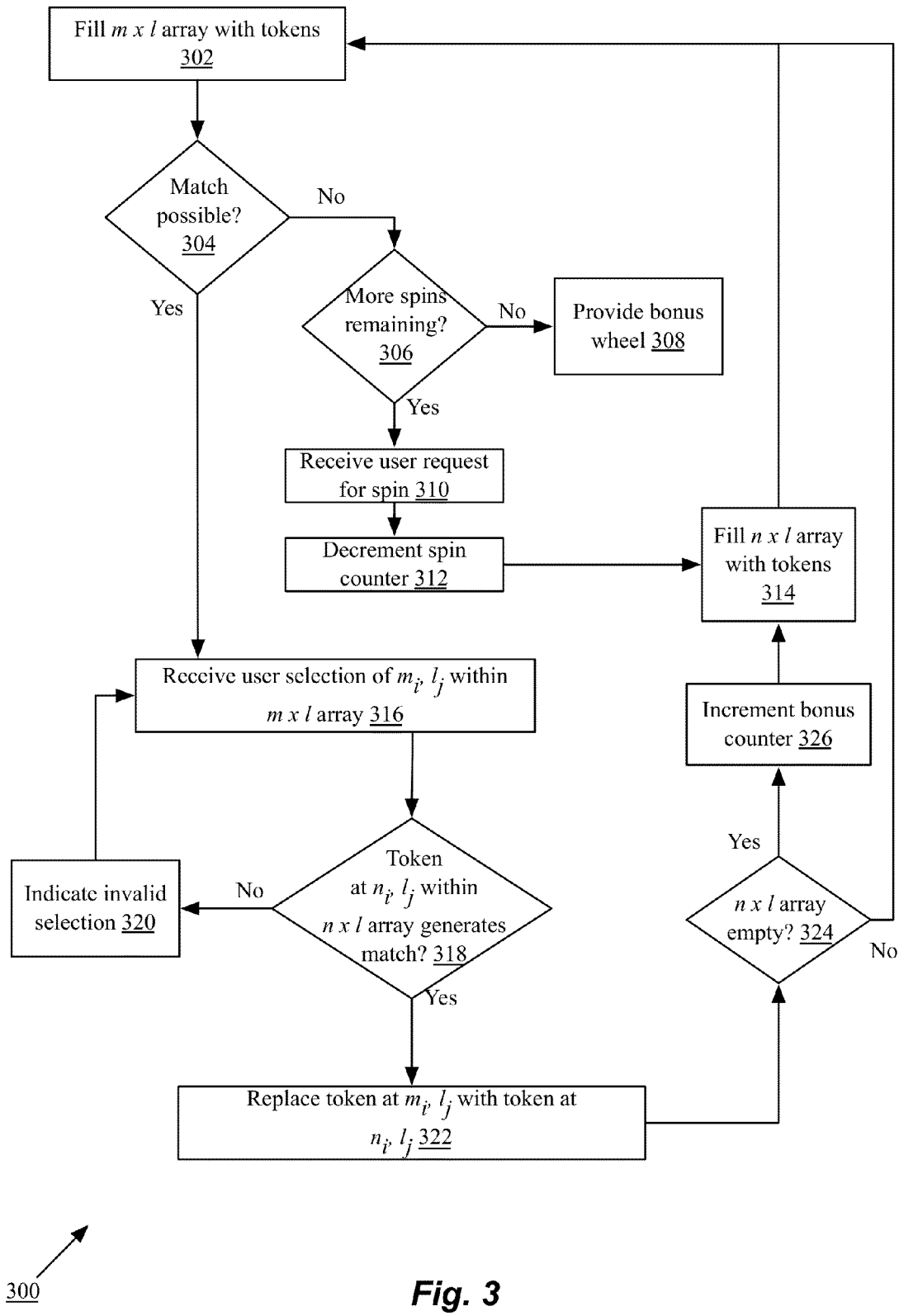
FIG. 3 is a flow chart of an embodiment of a method for executing a token match game.

Referring now to FIG. 3, illustrated is a flow chart of an embodiment of a method 300 for executing a token match game. At step 302, the game engine may generate and fill an m×l array or playing field with randomly selected tokens. The values of m and l may be set automatically to a default, may be set by the player when configuring a custom game, may be selected by the player from a plurality of predetermined defaults or game types, or may be set by a challenge engine as discussed above. Similarly, the tokens may be randomly selected from a list of possible tokens, or may be randomly selected from a subset of this list, such as a subset including base tokens and not including wildcard tokens or special tokens. In an initial iteration of method 300, the m×l array may be empty and may be completely filled by selecting random tokens. In later iterations during game play, the game engine may fill empty cells in the array at step 302 with randomly selected tokens. Filling empty cells may, in many embodiments, comprise shifting tokens in cells adjacent to empty cells into the empty cells, and repeating this shifting until the empty cells are at an edge of the array, at which point they may be filled with randomly selected tokens. Although discussed as starting at step 302, in some embodiments, method 300 may begin at another point, such as step 310, step 312, or step 314, discussed below.

At step 304, in some embodiments, the game engine may determine if any matches are possible with tokens in a second n×l array or hand. Determining if a match is possible may comprise scanning each row or column of the m×l array iteratively to identify whether a region of identical adjacent tokens of a predetermined size may be created if a token in a cell in the row or column is replaced with a token in a corresponding cell of the n×l array. As discussed above, a row or column may be scanned responsive to orientation of the n×l array to the m×l array. The predetermined size of the region may be a default value or may be set according to difficulty, a custom setting, a challenge, or any other such method as discussed above. In an initial iteration of method 300, the n×l array may be empty, so accordingly no match is possible. Thus, in some implementations, step 304 may be skipped during an initial iteration and the method may proceed directly to step 310, step 312, or step 314 discussed below. In later iterations, step 304 may be used to determine if the player has any moves available.

If no match is possible at step 304, then at step 306, the game engine determines whether the player has any more spins or rounds of play remaining. As discussed above, the game engine may maintain a spin counter which may be decremented (or conversely, incremented towards a final value) with each spin or round and fill of the n×l array. In an initial play of the game, step 306 may be skipped, as the player will have at least one spin or round remaining.

If the player has no more spins or rounds remaining, then at step 308 in some implementations, the game engine may provide a bonus wheel. A bonus wheel may comprise a wheel, spinner, or other random selection element for providing a player with a random bonus or, in some embodiments, a random penalty. Although referred to as a wheel, in many implementations, other interfaces may be presented, including face down cards with random bonuses and/or penalties to be selected by the player, slot machine-type windows, icons, or any other such interface. In some embodiments, the player may be presented with an option to spin the wheel or other interface to attempt to receive a random bonus or penalty, or may opt out and end the game. This may be used in instances where the player may wish to avoid a potential penalty. Bonuses may include score increases by a value and/or percentage, fortunes, and/or one or more additional spins or rounds of play. Penalties may include score decreases by a value and/or a percentage, curses, or other penalties. If the player receives additional spins or rounds, then the method may resume with step 310.

At step 310, if the player has more spins or rounds remaining, then in some embodiments, the game engine may present a spin button or lever. In one implementation, the spin lever may be presented as a slot machine-style or "one-armed bandit" lever. In other implementations, the game engine may present a button, switch, slide, or any other interface element. In one embodiment during an initial iteration of method 300, step 310 may be skipped and the first hand may be automatically drawn for the player.

At step 312, responsive to the player activating the spin lever or otherwise requesting a new hand (or automatically in implementations in which step 310 is skipped), the spin counter may be decremented (or incremented in embodiments in which the counter counts up to a terminal value). At step 314, the game engine may fill the n×l array with tokens. In one embodiment, the tokens may be randomly selected from the entire list of tokens, including wildcards and/or special tokens, while in another embodiment, the token may be randomly selected from a subset of the tokens. In some embodiments, the subset of the tokens may comprise tokens currently in play in the m×l array, and may further include a wildcard token. For example, in one such embodiment, if the m×l array includes only base tokens and no special tokens, the subset may include only the base tokens and wildcard tokens. If the m×l array includes a special token, such as a diamond gem, the special token may be added to the subset. This enables a player to create regions of adjacent special tokens, but avoids including the special tokens if others are not currently in play, to avoid frustrating the player with unplayable tokens. After step 314, in some embodiments of method 300, the game engine may repeat step 302. In a first iteration of method 300, this may be unnecessary, as the game engine may have already filled the m×l array, and accordingly, in some embodiments, step 302 may be skipped. In other embodiments of method 300, method 300 may begin at another point, such as step 310, step 312, or step 314, and step 302 may be performed.

Step 304 may be repeated as shown to determine if a region of adjacent identical tokens may be generated in the m×l array by replacing a token with a corresponding token of the n×l array. If not, then steps 306-314 may be repeated. If so, then at step 316, the game engine may wait for and receive a player selection of a cell within the m×l array, referred to as cell $m_i$, $l_j$. Player selection of the cell may be via a touchscreen, such as touching the cell, or may be via a cursor or mouse click, text entry, gesture, or other input method.

At step 318, the game engine may determine if replacing the token in cell at $m_i$, $l_j$ with a token in the corresponding cell $n_i$, $l_j$ of the n×l array may result in a region of adjacent identical tokens of at least a predetermined size. In many embodiments, the size of n may be 1, such that the value i may be ignored. In other embodiments, the size of n may be equal to m with a token in the n×l array corresponding to every token in the m×l array. In still other embodiments, n may be a factor of m such that each token in the n×l array may correspond to some, but not all tokens in the corresponding row or column of the m×l array. For example, m may be 6 and n may be 2, with $n_i$ corresponding to $m_{1-3}$ and $n_2$ corresponding to $m_{4-6}$. As such, one may readily appreciate that the corresponding cell $n_i$, $l_j$ may have a different value of i in some embodiments. The game engine may use any method to identify and determine the size of potential regions of identical tokens, including flood-fill algorithms, filling a second m×l array with the $n_i$, $l_j$ token and calculating a conjunction of the arrays, performing a breadth-first or depth-first search for identical tokens around the selected cell $m_i$, $l_j$, or any other method. In some embodiments in which the token in cell $n_i$, $l_j$ is a wildcard token, the game engine may use a variable in the search methods or otherwise allow the wildcard token to match any other token in array m×l.

If the game engine does not determine that a match or region will be generated, then at step 320, the game may indicate that the selection is invalid. This may include flashing an interface element, outputting a sound, showing a pop-up message, or any other indicator. In some embodiments, if cell $n_i$, $l_j$ is empty (such as if the token in that cell has already been used), then the game engine may skip step 318 and go directly to step 320.

In some embodiments, if the player has not made a valid selection within a predetermined time period, the game engine may display a hint or indicate a potentially valid selection within the m×l array, such as arrows or a flashing border around a cell or any other such indication.

If the game engine determines that a region will be generated if the token in cell $n_i$, $l_j$ is placed in the selected cell, then at step 322, the replacement may be performed. The game engine may identify the created region of adjacent identical tokens and may remove the tokens and increment the player's score accordingly, as discussed above. In some embodiments, if the region is greater than a predetermined size, the game engine may place a special token, such as a diamond gem, in the cell $m_i$, $l_j$ after removing the tokens. In another embodiment, if the matched tokens are the special token, the game engine may place a second special token, such as a wildcard token, in the cell $m_i$, $l_j$ after removing the tokens. In a further embodiment, if the player subsequently selects and generates a region of adjacent identical tokens of a first type (e.g. a base token) that includes or is adjacent to the second special token, the game engine may remove all of the tokens of the first type in the m×l array, regardless of position, and increment the player's score accordingly. The game engine may then place a third special token, such as a golden key, in the cell $m_i$, $l_j$ after removing the tokens. In another embodiment, if the player subsequently selects and generates a region of adjacent identical tokens of the third special token type, the game engine may clear the m×l array, incrementing the player's score for each token removed, and skip to step 326, discussed below. This may be referred to as finishing the level or gaining a level, and a bonus counter (and/or permanent bonus counter or base level for the counter) may be incremented, as discussed above.

At step 324, the game engine may determine if the n×l array or player's hand is empty. If not, then method 300 may continue with step 302, filling in any empty spaces in the m×l array resulting from the removal of tokens at step 322 as discussed above. If so, at step 326, then the game engine may increment a bonus counter as discussed above and may repeat step 314 before continuing with step 302. This may be referred to as finishing a hand.

As shown, method 300 may be iteratively repeated with the player playing tokens from his or her hand in the playing field to generate matches and special tokens, and/or failing to match tokens and requesting a spin or new hand, until the player runs out of spins or rounds, optionally spinning the bonus wheel at step 308.

As discussed above, in some game play modes or embodiments, sometimes referred to as "blitz" mode, the game engine may execute a play timer of a predetermined duration. If the play timer expires, play may end and the game engine may proceed to step 308. In some embodiments, if the player utilizes every token in the n×l array, then at step 326, the play timer may be incremented by a predetermined amount of time, such as 5 seconds, 10 seconds, 15 seconds, or any other value, to provide an extended period for play. In other embodiments, the game may end upon completion of a predetermined goal, such as a number of tokens matched, a score reached, or any other such feature. In one such embodiment, upon completion of a level, a bonus score may be awarded to the player. In a further such embodiment, the game engine may fill the n×l array with one or more "wild" tokens which may be used to match any other tokens at step 318. In a still further such embodiment, the game engine may automatically play through iterations of method 300 with the wild tokens until the n×l array is empty, skipping from step 324 to step 308 and/or a game end screen. Such embodiments may be referred to as having a jackpot or bonus round.

Figure 4A:
FIGS. 4A-4J are screenshots of menu, help, and configuration screens of an embodiment of a token match game.
Figure 4B:
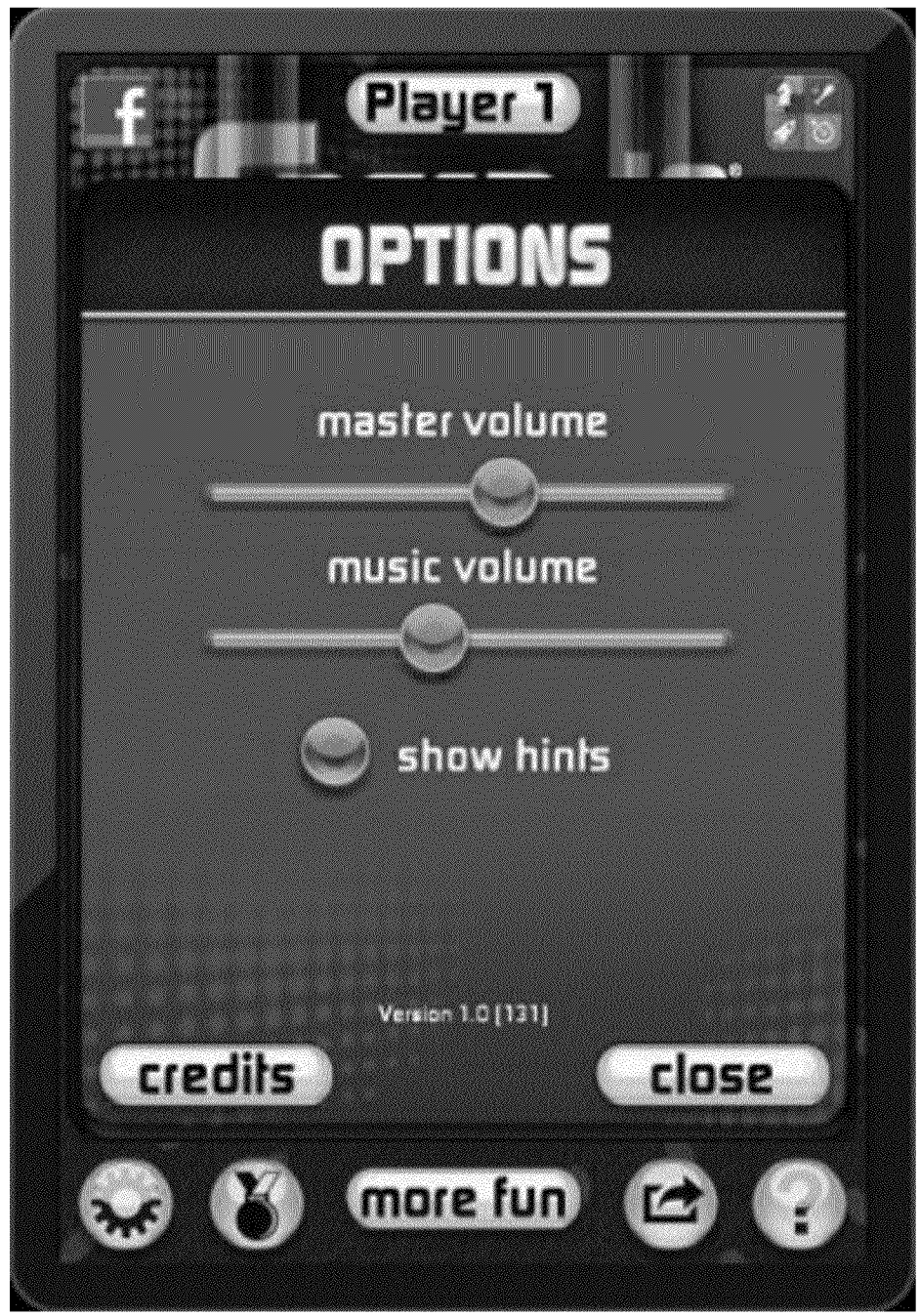
Figure 4C:
Figure 4D:
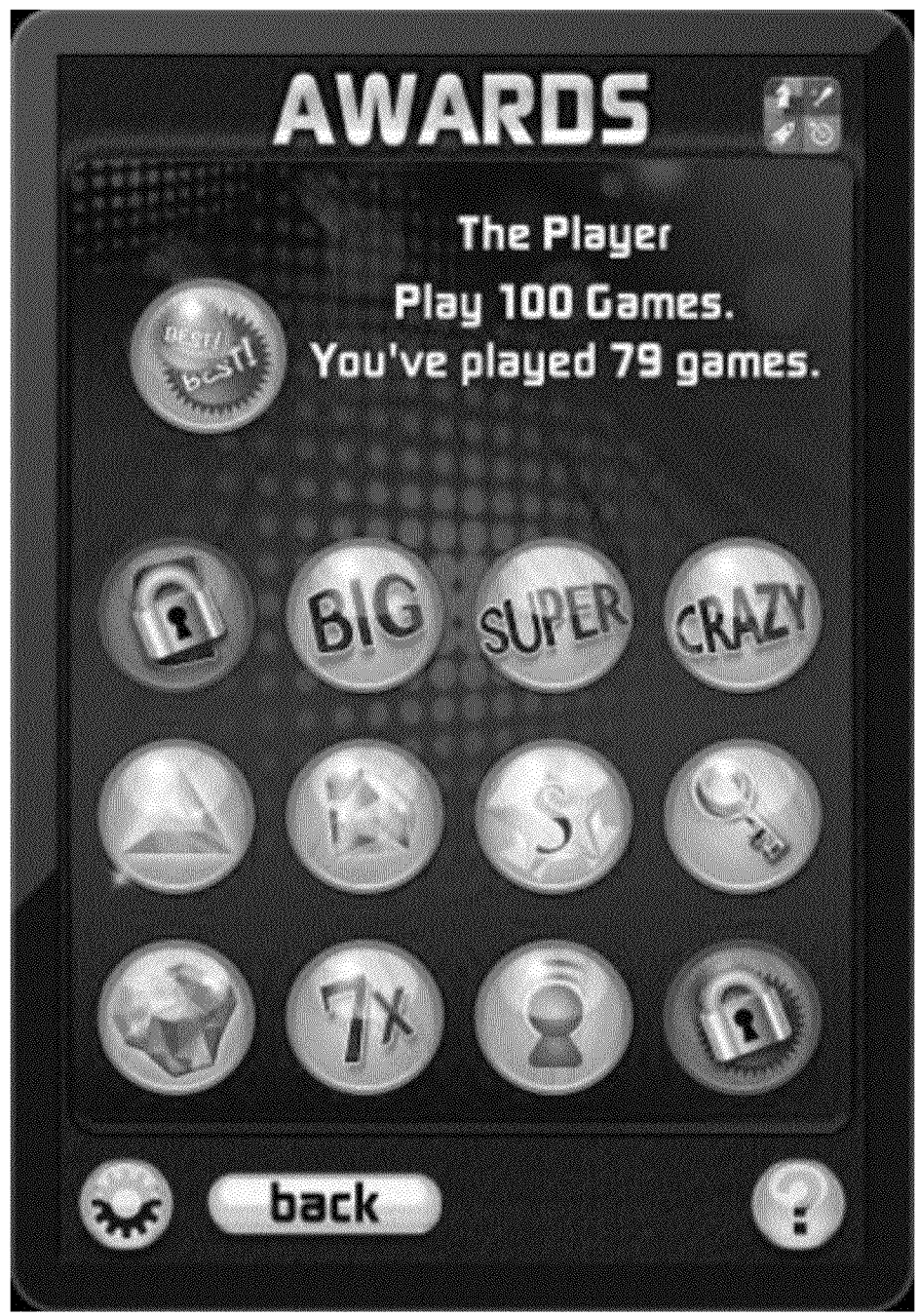
Figure 4E:
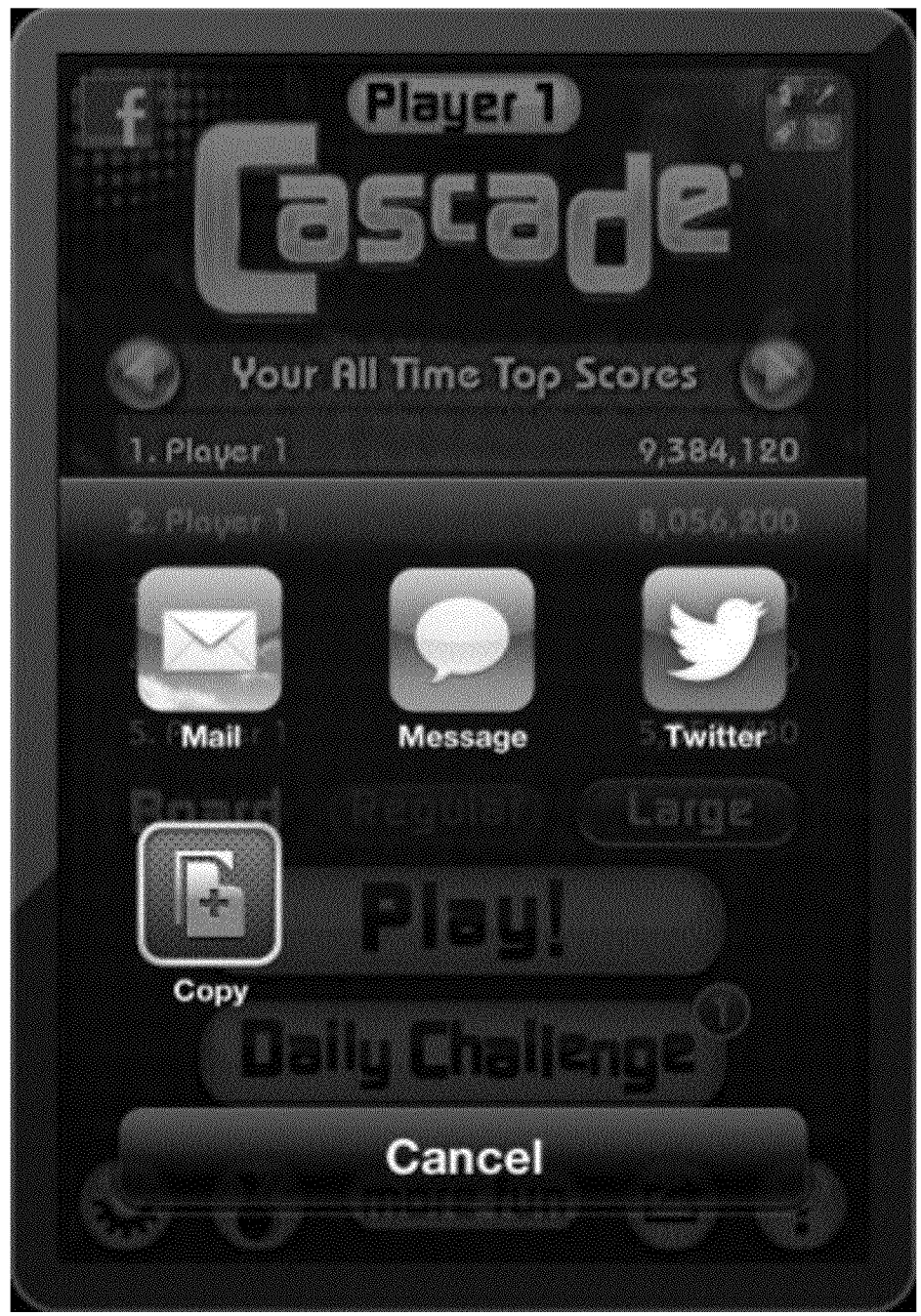

Referring now to FIGS. 4A-9C, illustrated are screenshots of one example embodiment of a token match game. The screenshots are intended for explanatory purposes only, and are not intended to be limiting. Referring first to FIGS. 4A-4J, illustrated are screenshots of menu, help, and configuration screens of an embodiment of a token match game. As shown in FIG. 4A, a menu screen may include a high score board and buttons for starting a game, configuring settings, viewing medals, interacting with a social network, viewing a help screen, or logging in or registering as a player. As shown in FIG. 4B, various options may be set by the player, including whether hints are displayed after a predetermined time period of no player selection of a valid cell, and volume settings. As shown in FIGS. 4C and 4D, various awards may be awarded to the player for fulfilling one or more conditions, such as scoring a predetermined number of points in a game or playing a number of games. In one embodiment, unachieved awards may be shown with a lock symbol or other indicator. As shown in FIG. 4E, the player may share scores and/or challenge others via one or more social networks or messaging methods, or may copy the last game's final score to paste into another application.

Figure 4F:
Figure 4G:
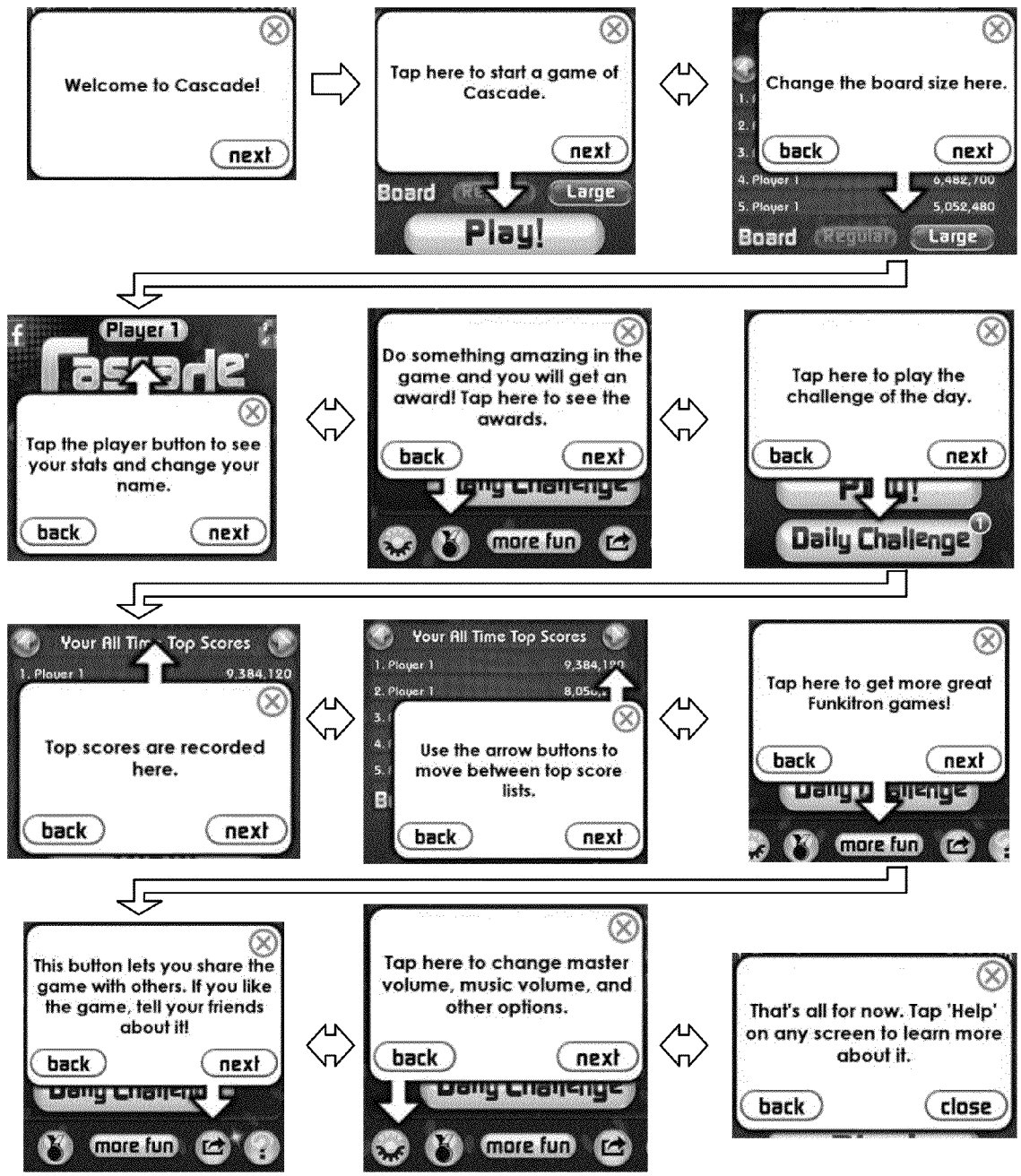

FIGS. 4F and 4G illustrate screens of an exemplary help display. As shown in FIG. 4F, the help display may be shown as a bubble or overlay on the menu or another screen. FIG. 4G illustrates a sequence of exemplary help screens.

Figure 4H:
Figure 4I:

In some embodiments, the player may select a button to view player statistics and/or change the player's identified name or reset the statistics, as shown in FIG. 4H and in the sign-in dialog of FIG. 4I.

Figure 4J:
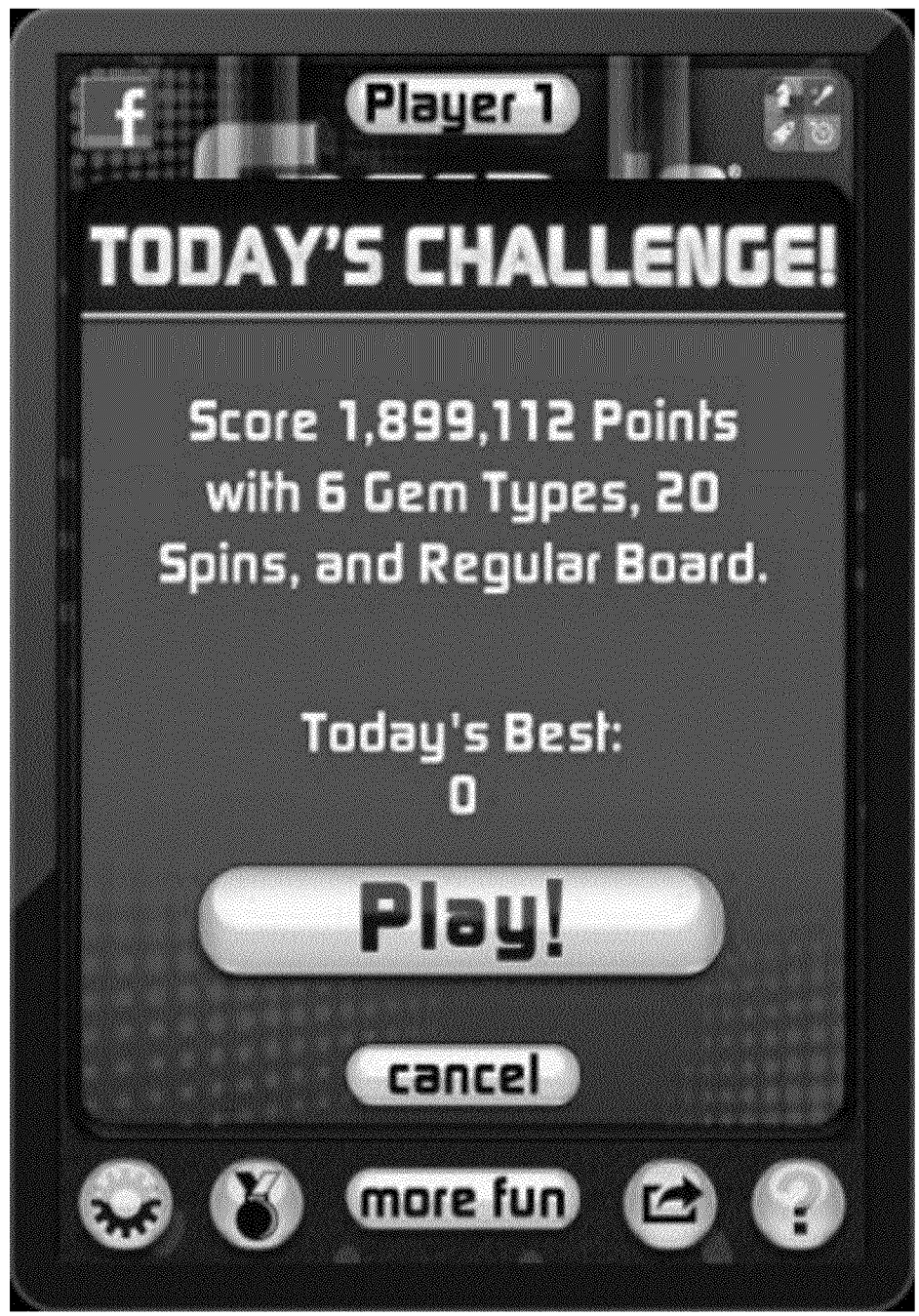

As shown in FIG. 4J, the player may be presented with a challenge that may be dynamically generated by a challenge engine of the game, may be received as a challenge from a friend or another player, or may be received from a server. The challenge may identify a target score and one or more parameters, as shown.

Figure 5A:
FIGS. 5A-5C are screenshots illustrating successive steps of token selection, replacement, and scoring in an embodiment of a token match game.
Figure 5B:
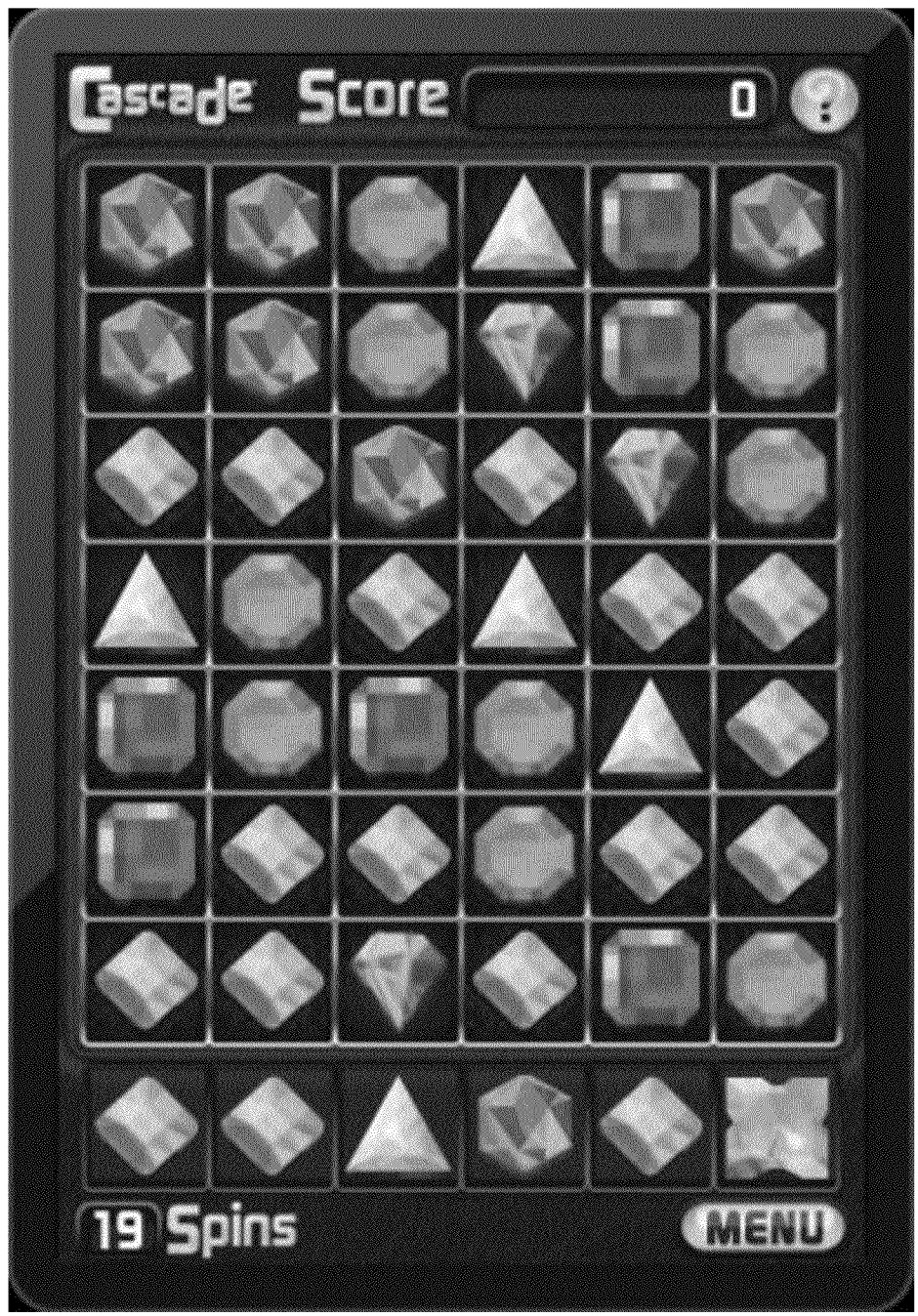
Figure 5C:
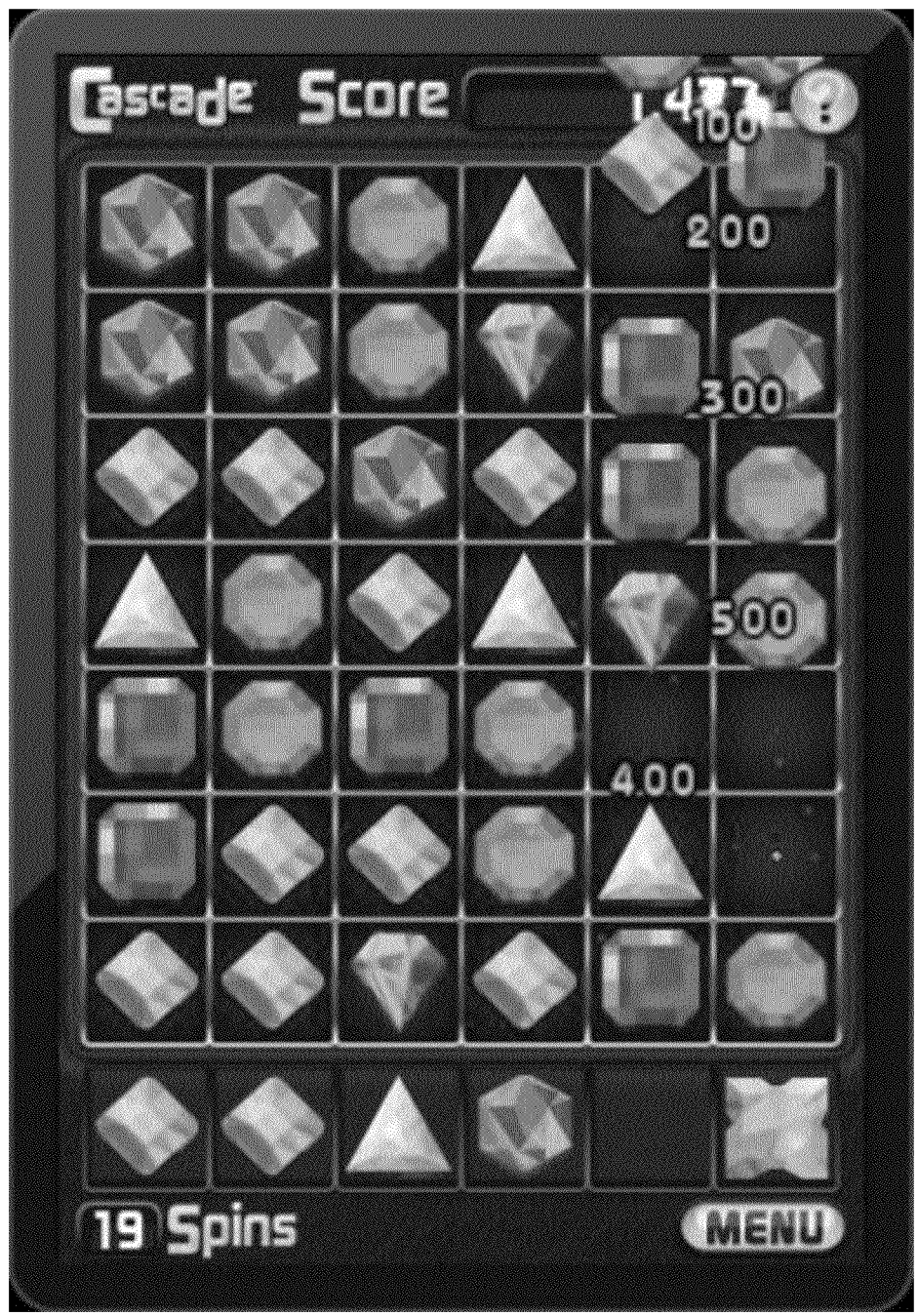

FIGS. 5A-5C are screenshots of a sequence of an example embodiment of successive steps of token selection, replacement, and scoring in an embodiment of a token match game. As shown in FIG. 5A, a spin lever may be presented to the player, and the player may pull or trigger the lever to fill the cells of the n×l array (i.e. the row of six empty cells in FIG. 5A) with randomly selected tokens as shown in FIG. 5B. The tokens may be selected from a subset of tokens including the tokens in the m×l array, and may include a wildcard token as shown in the rightmost cell of the n×l array.

Figure 6A:
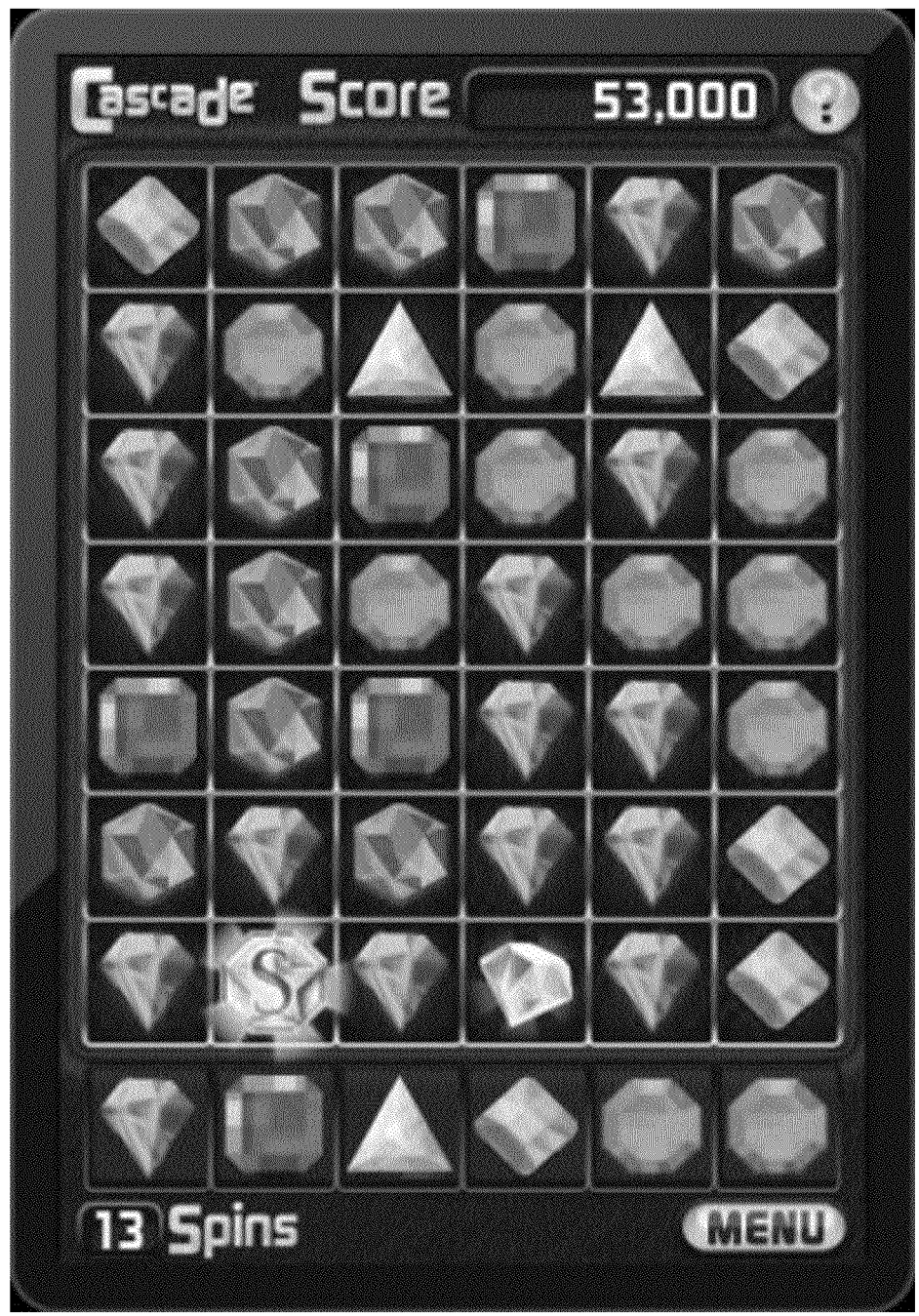
FIGS. 6A-6C are screenshots illustrating successive steps of utilization of a wildcard within a created region of identical tokens in an embodiment of a token match game.

If the player selects the triangular token in the 5th column in the m×l array, the game engine may replace the token with the diamond-shaped token (not to be confused with a special token, an example of which is shown in FIG. 6A in the 4th column of the m×l array) in the corresponding column of the n×l array to generate a region of six adjacent matching diamond-shaped tokens. As shown in the screenshot of FIG. 5C, these tokens may be removed and the player's score incremented and the m×l array may be filled by moving down tokens from higher rows in the array and selecting new random tokens to fill the resulting empty cells.

Figure 6B:
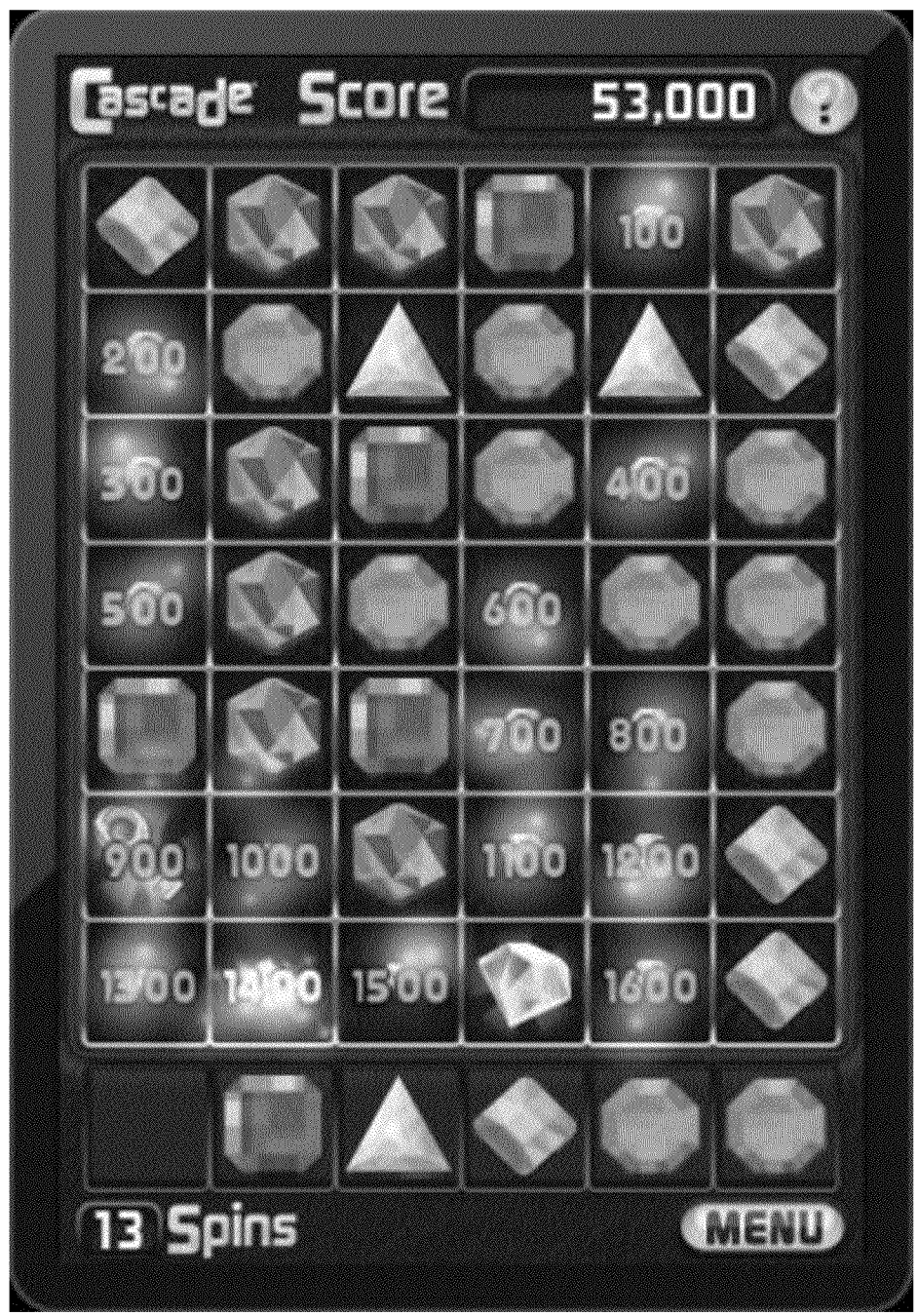
Figure 6C:
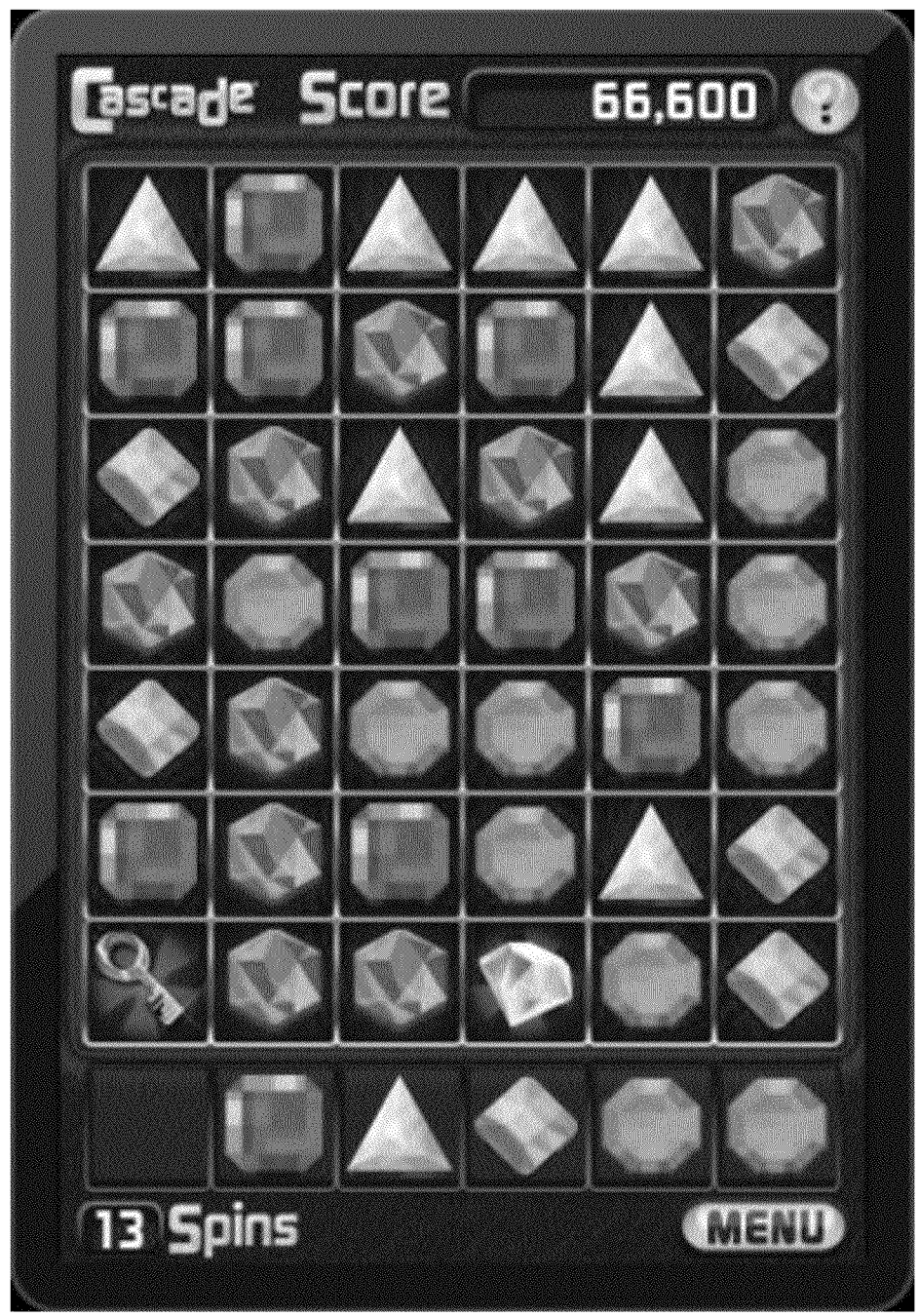

FIGS. 6A-6C are screenshots illustrating successive steps of utilization of a wildcard within a created region of identical tokens in an embodiment of a token match game. As shown, in some embodiments, the m×l array may include special tokens, such as the diamond in the 4th column, or the "Special" or wildcard token in the 2nd column (marked with an "S"). If the player selects the first column, second row hexagonal token in the m×l array, a region may be created of the pentagonal tokens that includes the "Special" token. As shown in FIG. 6B, the game engine may remove all of the pentagonal tokens and replace the first column, second row token with a third special token or golden key. The m×l array may then be filled, as shown in FIG. 6C. In some implementations, the wildcard token may be referred to as a "splash" or wild token, and may have various types of effects. For example, in one implementation, creating or matching a region that includes the wild token may result in removal of all of the gems matching the tokens in the region, regardless of their position in the m×l array, as discussed above. In another implementation, creating or matching a region that includes the wild token may result in removal of all tokens in the m×l array in a horizontal or vertical line with the wild token. Such wild tokens may be referred to as "horizontal splash" and "vertical splash" tokens, respectively. In yet another implementation, creating or matching a region that includes the wild token may result in removal of all tokens in the m×l array adjacent to the wild token (i.e. any tokens above, below, to the side of, or diagonally adjacent to, the wild token). Such wild tokens may be referred to as "area splash" tokens.

In some implementations, wild tokens and/or splash tokens may be selected by the token generator and/or rules engine responsive to the player matching a region of predetermined size. For example, in one implementation, if the player replaces a token in the m×l array to create a region of identical tokens including seven tokens, after removing the tokens in the region, the rules engine may place a wild token at the cell selected by the user. This may encourage the player to strategically plan and create larger regions during game play. In other implementations, wild tokens and/or splash tokens may be selected by the token generator during filling of the m×l array.

Figure 7A:
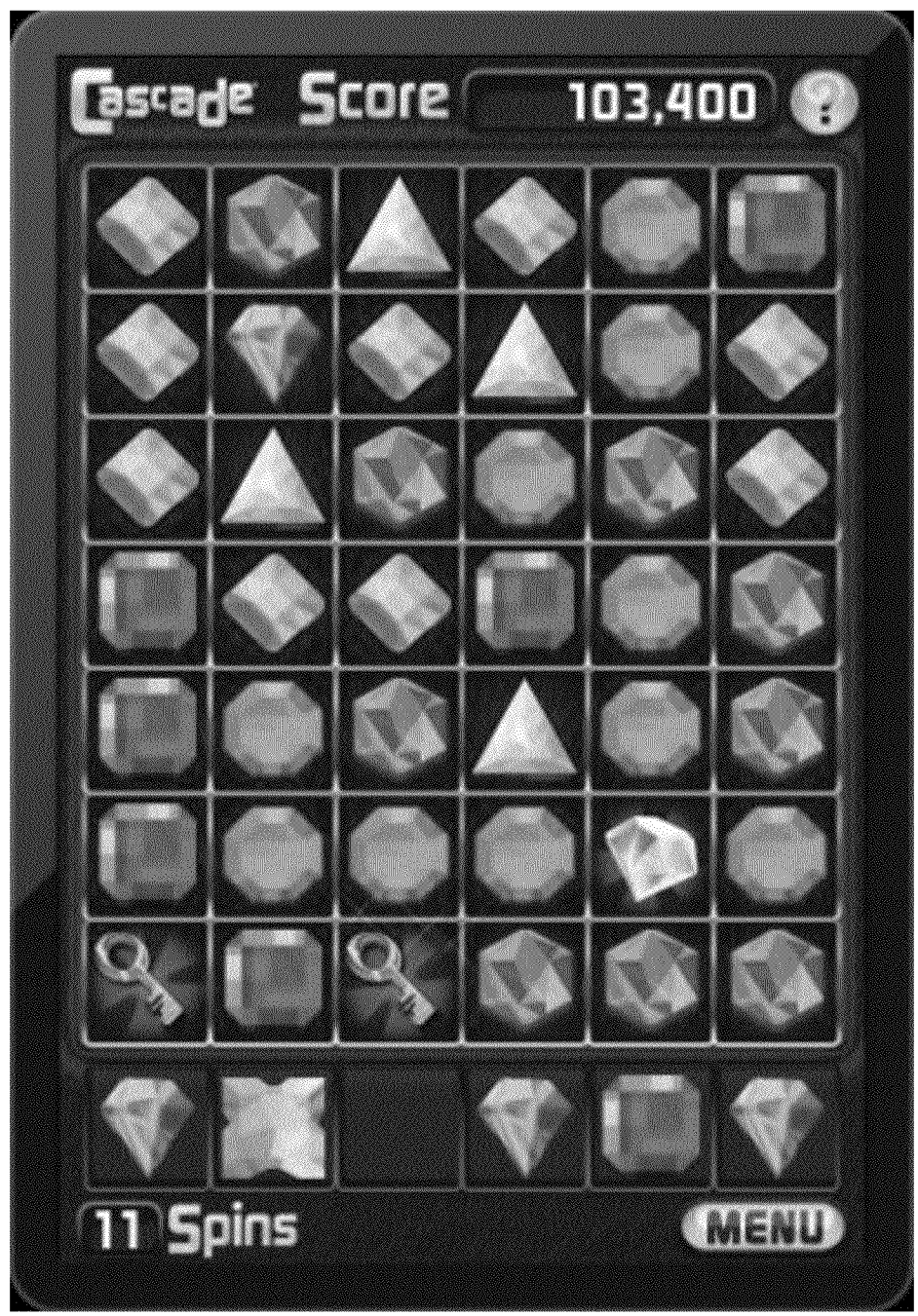
FIGS. 7A-7C are screenshots illustrating successive steps of matching tokens to clear a board in an embodiment of a token match game.
Figure 7B:
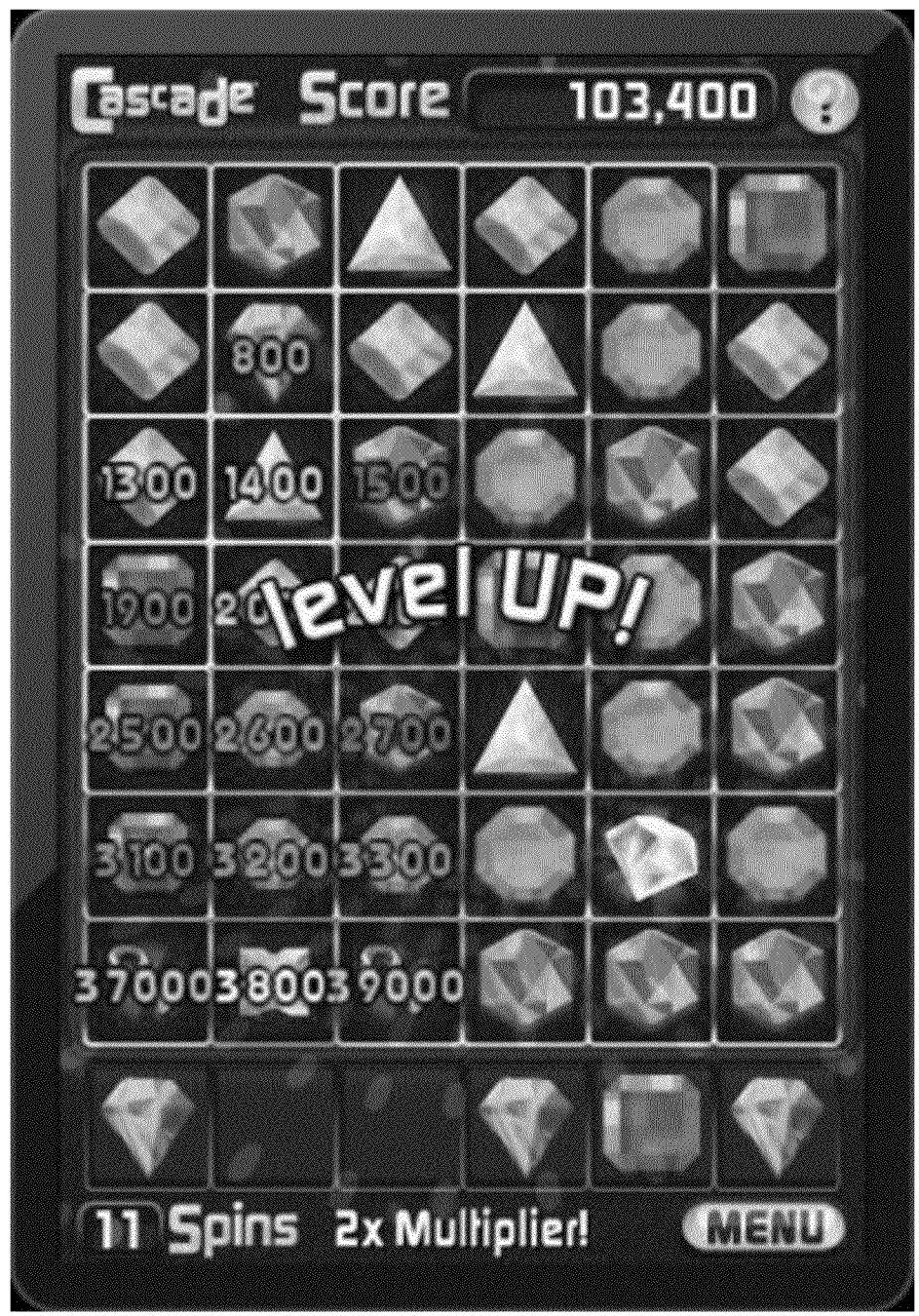
Figure 7C:
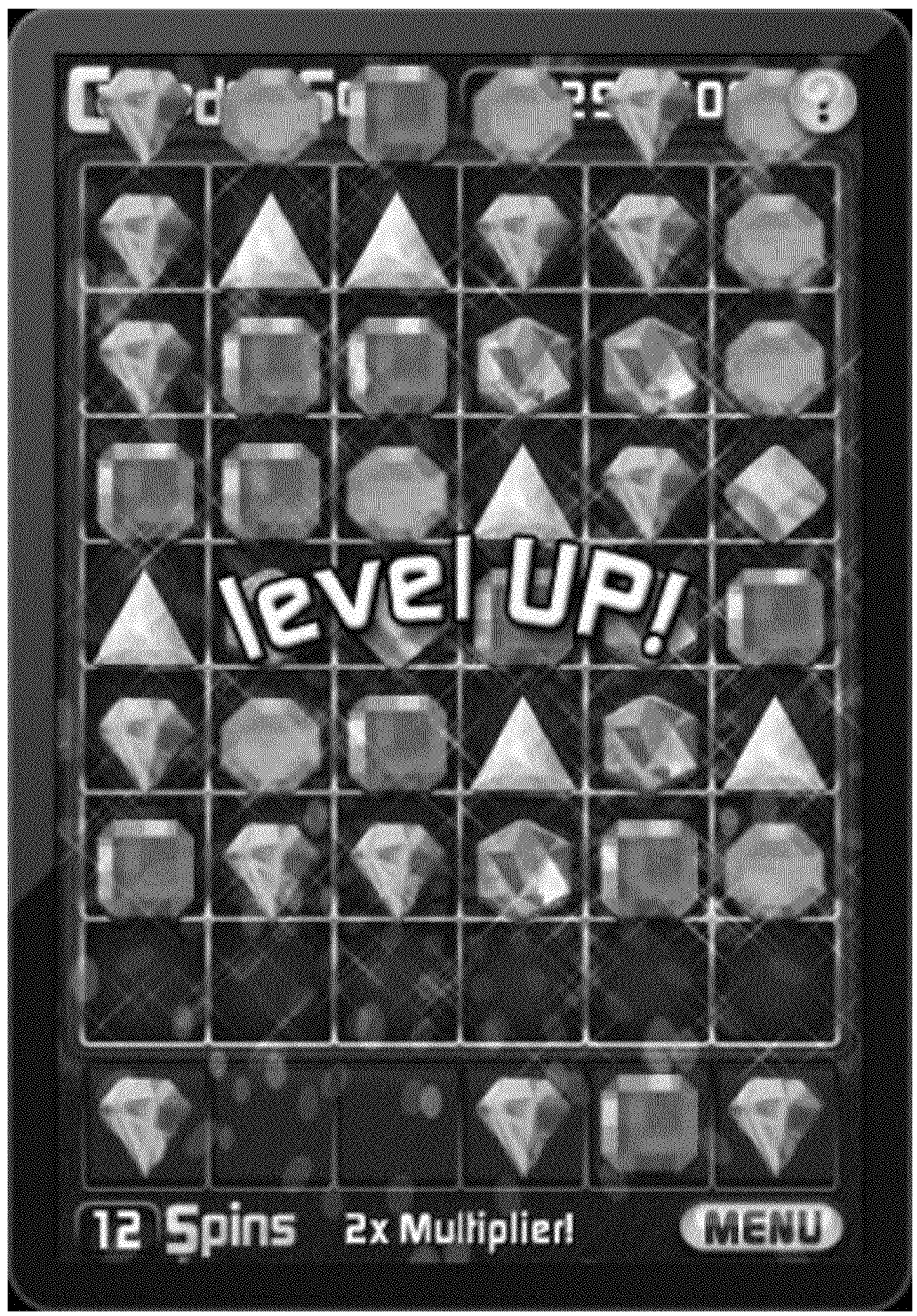
Figure 8A:
FIGS. 8A-8K are screenshots of help screens of an embodiment of a token match game.
Figure 8B:
Figure 8C:
Figure 8D:
Figure 8E:
Figure 8F:
Figure 8G:
Figure 8H:
Figure 8I:
Figure 8J:
Figure 8K:

FIGS. 7A-7C are screenshots illustrating successive steps of matching tokens to clear a board in an embodiment of a token match game. As shown, the m×l array may include two or more of the third special token or golden key. The player may play a wildcard token (second column in the n×l array) in the cell between the two special tokens in the m×l array as shown in FIG. 7B. The game engine may remove all of the tokens in the m×l array and increment the player's score. The screenshot captures an intermediate step in the animation of this process, with only some of the scores displayed filling in from left to right. In other embodiments, the scores may be displayed all at once, or fill in from a different direction. As shown, in many embodiments, the player may receive a higher score for clearing a special token than for clearing a regular or "base" token. As shown in FIG. 7C, the m×l array may then be filled in with new randomly selected tokens.

Figure 9A:
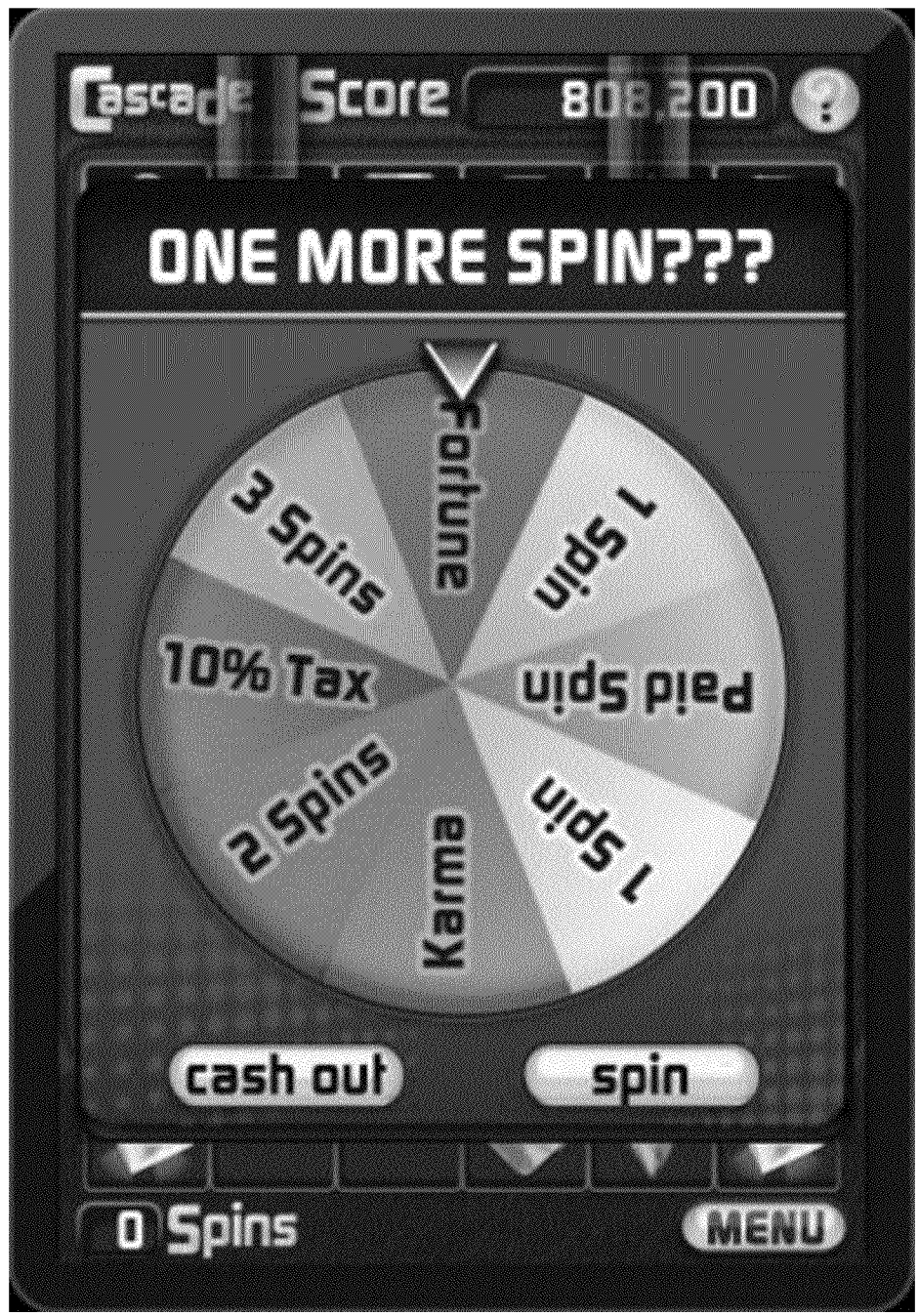
FIGS. 9A-9C are successive screenshots of a bonus wheel of an embodiment of a token match game.
Figure 9B:
Figure 9C:

FIGS. 8A-8K are screenshots of help screens of an embodiment of a token match game. As shown, the help screens may be displayed as a bubble or pop-up over the playing field. As discussed above, in some embodiments, after the player runs out of spins, rounds, or lives, a bonus wheel or similar interface may be presented to the user with bonuses and/or penalties. FIGS. 9A-9C are successive screenshots of a bonus wheel of an embodiment of a token match game. As shown, the player may choose to spin the wheel and receive a random bonus or penalty, which may include additional spins or rounds of play, returning to gameplay (in this instance, a "spin" refers not to the bonus wheel, but to receiving new tokens for the n×l array).

Figure 10A:
FIGS. 10A and 10B are screenshots of embodiments of screens presented upon completion of a token match game.
Figure 10B:
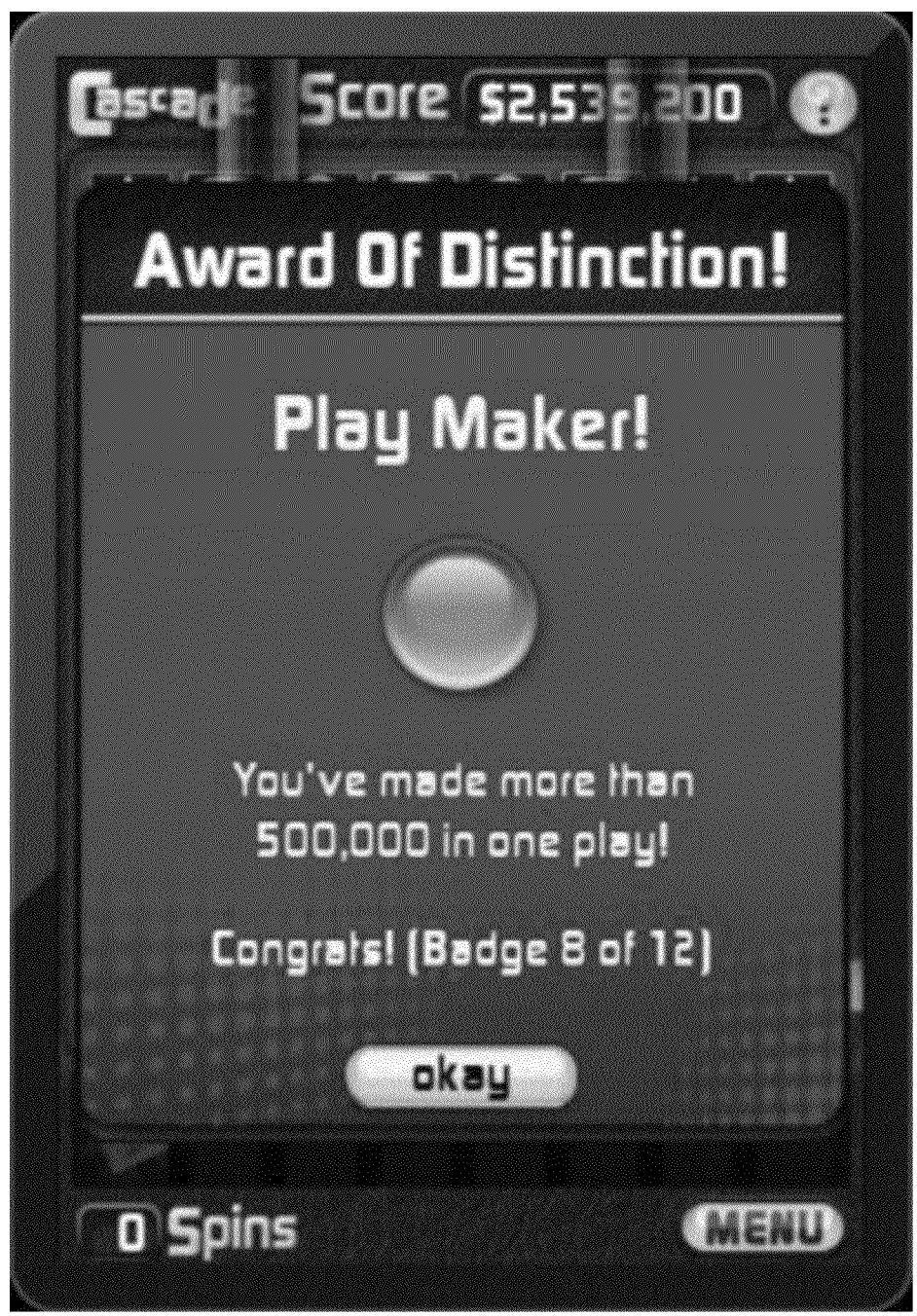

FIGS. 10A and 10B are screenshots of embodiments of screens presented upon completion of a token match game. As shown in FIG. 10A, the player's score may be shown and the player may be given an option to play again, share the score, challenge a friend, or return to the menu. Additionally as shown in FIG. 10A, if the player was participating in a challenge, a target score or goal may be displayed, along with an indication of whether the player achieved the goal. As shown in FIG. 10B, if the player met a condition for an award, the award may be displayed to the player.

Figure 11A:
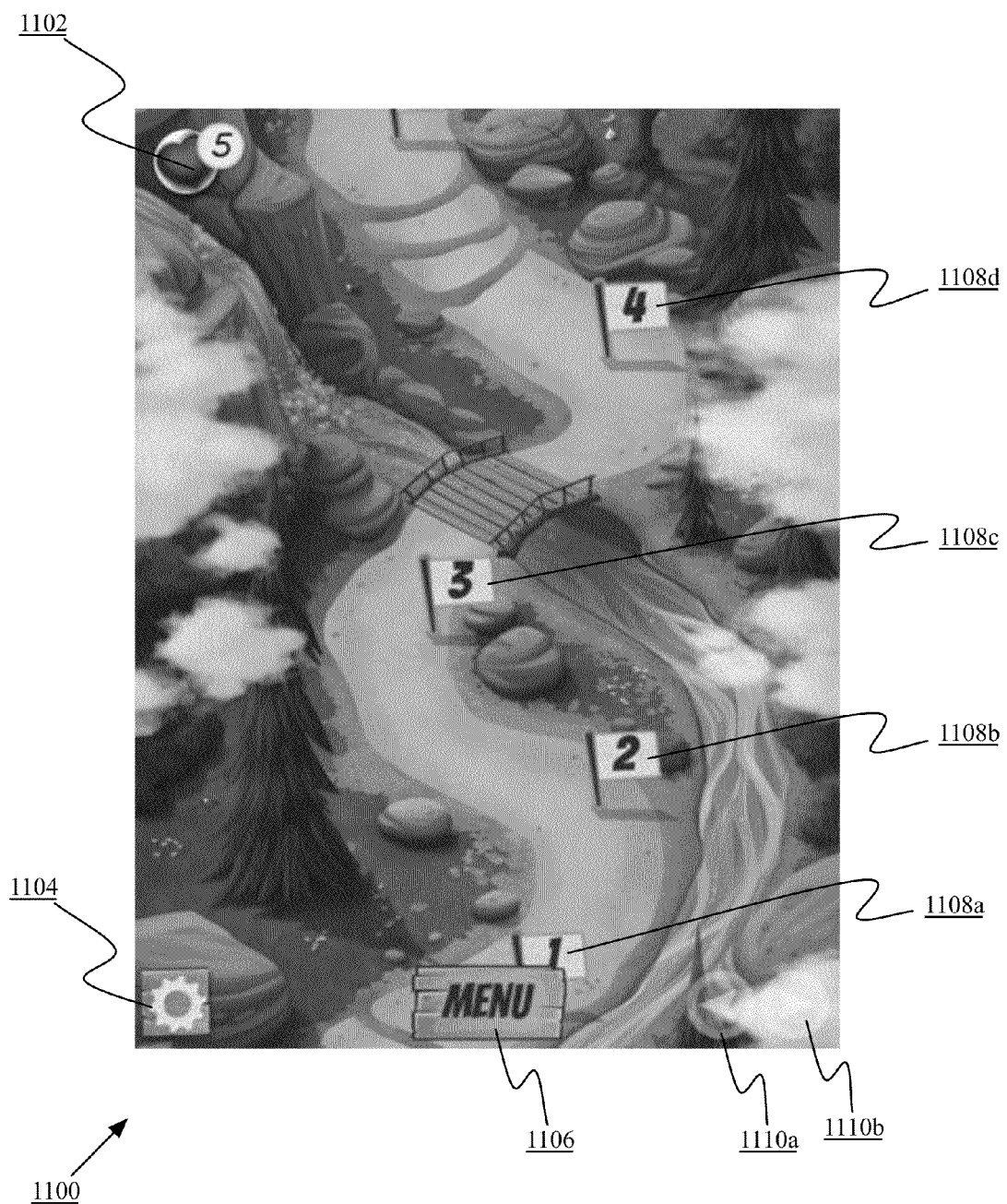
FIGS. 11A and 11B are screenshots of embodiments of a level selection screen for a token match game.
Figure 11B:
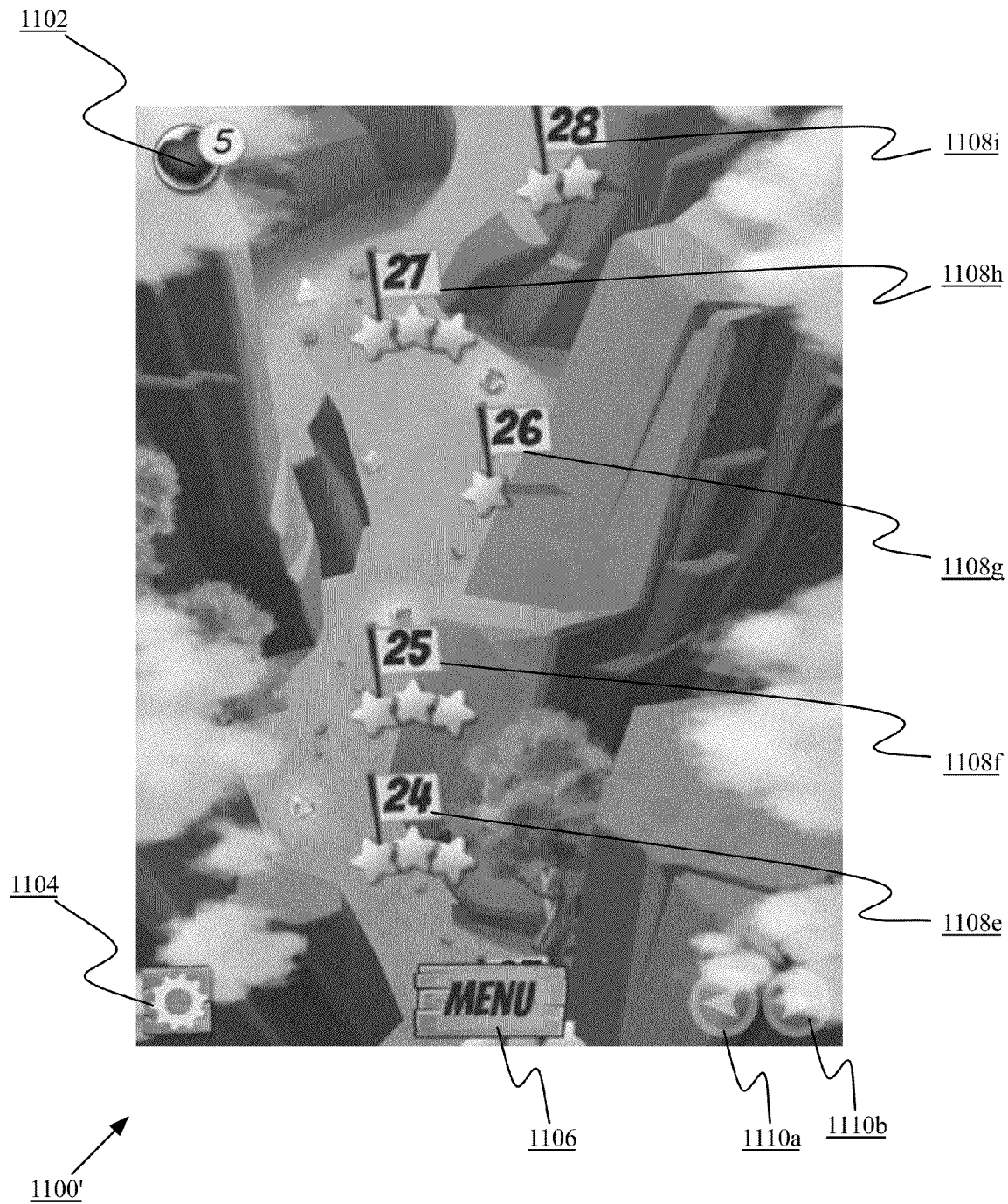

FIGS. 11A and 11B are screenshots of embodiments of a level selection screen for a token match game. As discussed above, in some embodiments, rather than utilizing a timer-based or challenge-based game, the game may comprise a series of levels to be completed by the player as a "quest". In some implementations, a level selection screen may be provided to the player, allowing the player to select a next uncompleted level or select any previously completed level to replay, for example, to attempt to increase a score over a previous attempt at said level. As shown in FIG. 11A, a level selection screen 1100 may comprise one or more identifiers 1108a-1108d of levels (referred to generally as level identifier(s) 1108). Although shown as icons on a trail, in many implementations, level identifiers 108 may be displayed in a scrollable list, a tree, a chain, or any other such structure. As shown in FIG. 11D, the level selection screen 1100' may include a greater number of level identifiers (e.g. 1108e-1108i), or a fewer number of level identifiers, depending on spacing of the identifiers or other such design considerations. In some implementations as shown in FIG. 11B, previously completed levels may be shown with a score or completion indicator, such as a number of stars as shown. For example, in one such implementation, a level may have a series of goals, such as scoring 100,000 points, scoring 300,000 points, and scoring 500,000 points. The player may be awarded with a star for each goal attained, which may then be displayed in the level selection screen 1100' as shown.

Level selection screen 1100 may include one or more scroll buttons 1110a-1110b, scroll bars (not illustrated), or other user interface elements to allow the user to view and select level identifiers 1108, including those not immediately visible on a level selection screen. In other embodiments, the user may be able to scroll the level selection screen via a keyboard, mouse, or gesture on a touch-based input device.

A level selection screen 1100 may include a life or attempt meter 1102, which, in many embodiments, may display a counter of remaining attempts. In some embodiments, a player may be provided with a limited number of attempts to complete levels or challenges. Each time the player fails to complete the challenge or level, the attempt meter may be decremented. Upon the attempt meter reaching 0, in some embodiments, the player may be prevented from playing a round of the game, until either a predetermined time period has passed, additional attempts are purchased, additional attempts are gifted by another player (e.g. via a social networking interface), or any other such limitations or other tasks are performed. For example, in one implementation, a new attempt or set of attempts may be granted every 15 minutes. If the player has utilized all of the allotted attempts prior to the expiration of the time period, the player may be provided an opportunity to purchase one or more attempts via an in-application purchase system or purchase system via a web page or other interface. Players may also purchase and gift attempts to others, and/or beg or request others for attempts to be gifted.

A level selection screen 1100 may include a settings icon 1104. Settings icon 1104 may be selected by a player to access a settings screen, which may provide volume controls for sound effects or music, brightness controls, access to or editing of a social network profile, or any other such features. In some embodiments, a level selection screen 1100 may include a menu button 1106 for return to an initial screen. The initial screen may allow access to different game types, such as a quest, blitz, or challenge mode, as discussed above, or other features.

Figure 12A:
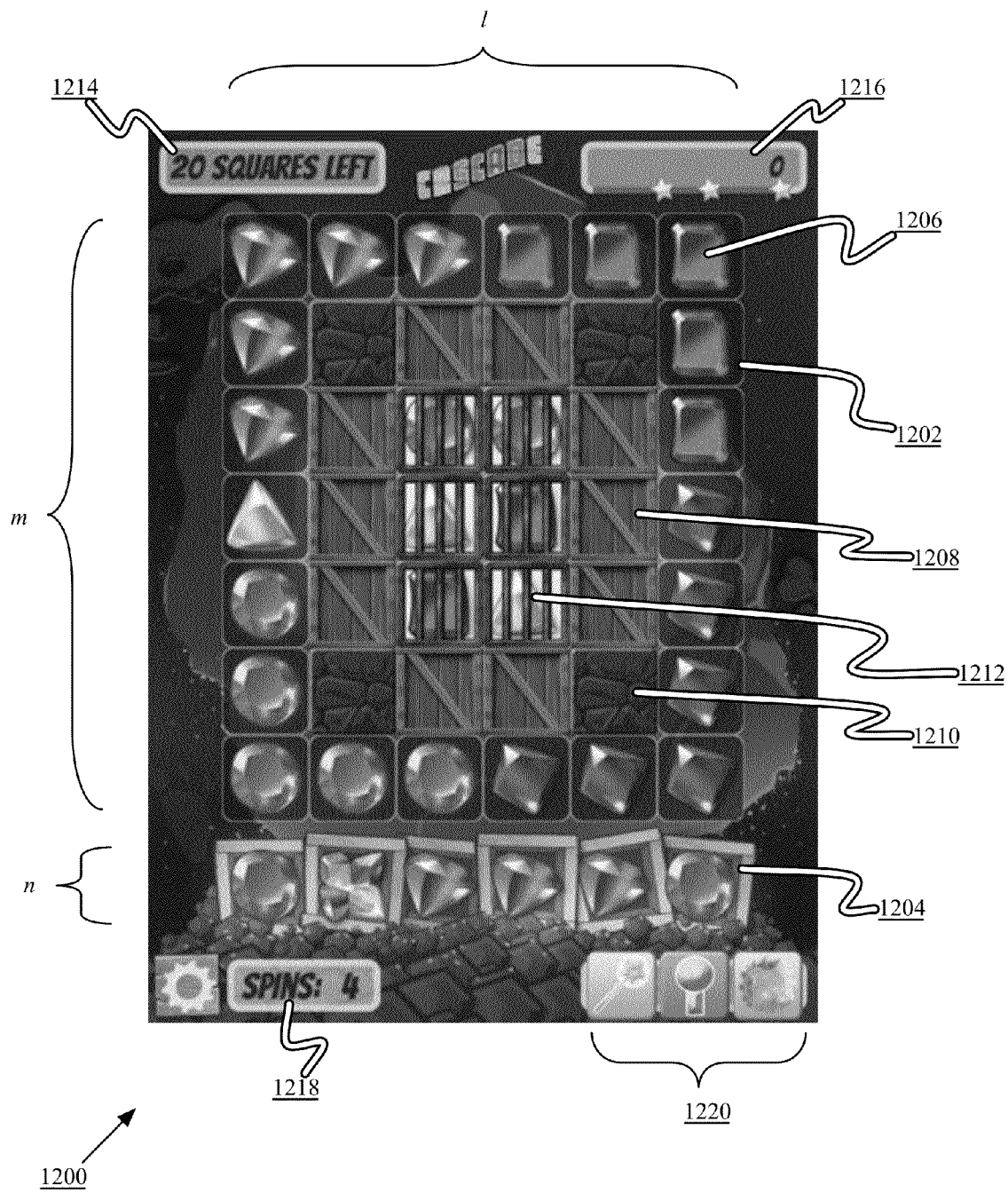
FIGS. 12A-12E are screenshots of embodiments of levels of a token match game.

FIG. 12A is a screenshot 1200 of an embodiment of a level in a token match game incorporating tokens of different types or classes in an m×l array 1202 and n×l array 1204. As shown, tokens may include a standard token 1206, such as a jewel or other geometric shape, icon or picture such as a type of candy or animal, or any other such token. Tokens may also include one or more "breakable" token types, such as a crate or wooden token 1208, a cage or jail token 1210, and/or a stone token 1212. In some implementations, a "breakable" token may not be matched by a token in the n×l array 1204; instead, the token may be "broken" (e.g. removed or otherwise adjusted) responsive to matching and removal of a region adjacent to the token. For example, in one such implementation, if a series of tokens adjacent to a wooden token 1208 are removed, the wooden token 1208 may also be removed. The cell previously containing the wooden token 1208 may be filled normally, as discussed above. In a similar implementation, a series of regions adjacent to a breakable token may need to be matched and removed before the breakable token is removed. For example, while a wooden token 1208 may be removed after matching of a single adjacent region, a stone token 1210 may require matching of two or more adjacent regions in succession. In some implementations, after each intermediate match before removal, the token 1210 may be displayed in an altered form, such as with cracks or shading to indicate that the token 1210 has been partially matched or will be removed on a subsequent match.

In another similar implementation, if a series of tokens adjacent to a jail token 1212 are matched and removed, the jail token 1210 may be replaced with a standard token 1206 corresponding to the token displayed within the jail token 1212. In other implementations, the standard token displayed within the jail token 1210 may be considered part of the region for purposes of matching. For example, if the game rules require matching at least three tokens in a region, the token displayed within the jail token 1212 may be considered to count as one of the three tokens; however, upon matching and removal of the tokens in said region, the jail token 1212 may be replaced with the standard token corresponding to the token displayed within the jail token 1212. In another embodiment not illustrated, tokens similar to jail token 1212 may be implemented. For example, an ice token may display a standard token 1206 behind a layer of ice which must be broken, e.g. by matching an adjacent region one or more times. In another embodiment, a vine token may display a standard token 1206 behind a layer of vines or other growth. In a further embodiment, the vine token may "spread" over time: upon expiration of a predetermined amount of time or after one or more matches or selections by a player, one or more tokens adjacent to a vine token may be replaced with a vine token including the corresponding standard token. The player may be encouraged to play quickly to remove all of the vine tokens in the m×l array 1202 to prevent their further spread.

As shown in FIG. 12A, in some implementations, a token match game may display a goal 1214 to be met to complete a level. For example, the goal may include a predetermined score to reach, a number of tokens to match, or any other such goal. In one implementation, the goal may display a number of squares in which tokens must be matched and/or removed. In many embodiments, the goal 1214 may be decremented or reduced as the player partially achieves the goal. In such embodiments, the goal 1214 may be referred to as a remaining goal, or by a similar term.

In many embodiments, the token match game may also display a score 1216 and/or number of spins or rounds remaining 1218. In some embodiments, as discussed above in which a level has a series of goals to be attained, the intermediate goals may be displayed under the score 1216. For example, the goals may comprise different scores for the player to reach, and be displayed as a series of stars on a progress bar.

In some implementations, the token match game may include one or more powers 1220 that may be selected for use by the player. Powers 1220, discussed in more detail below, may provide the player with additional spins or rounds 1218, wild tokens to match any token in the m×l array 1202, the ability to move tokens within n×l array 1204, or any other such functionality.

Figure 12B:
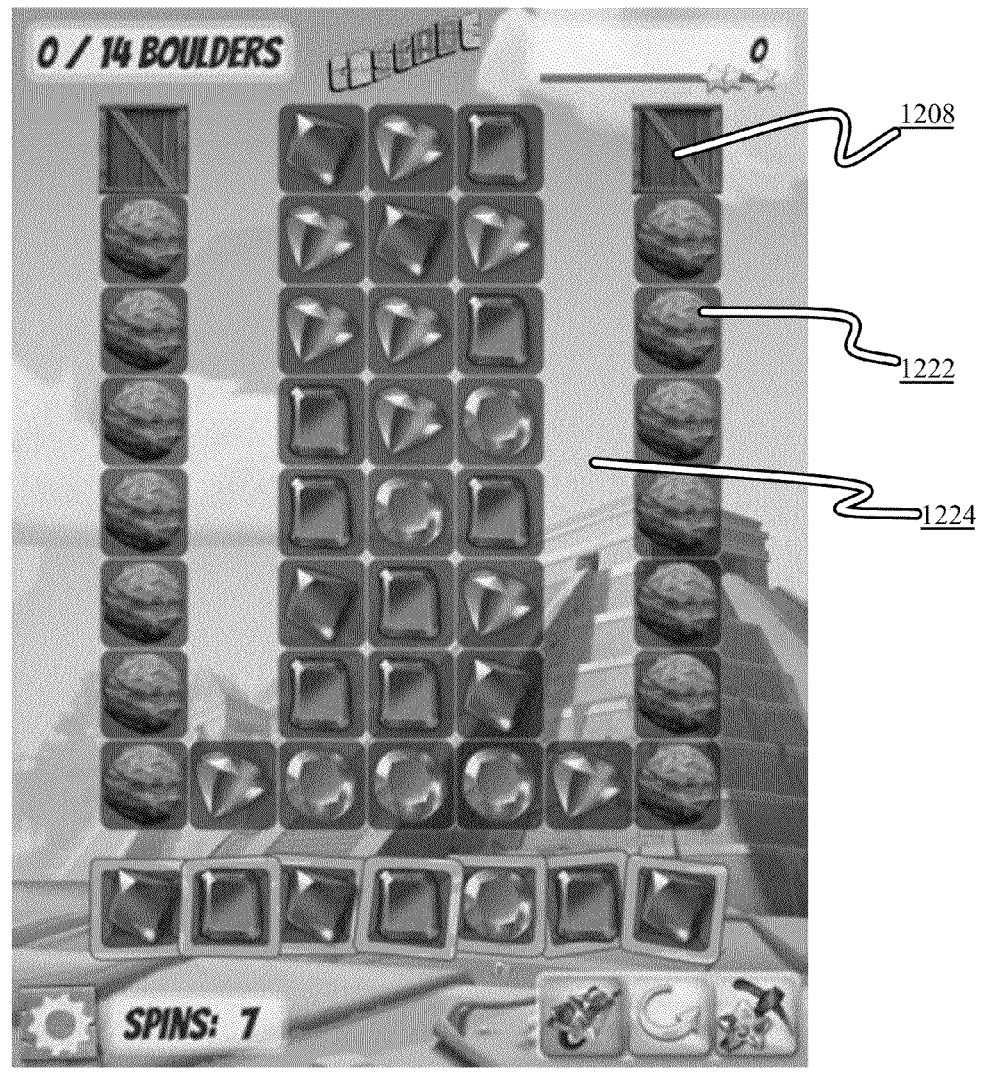

FIG. 12B illustrates another screenshot 1200' of an embodiment of a level of a token match game. In addition to standard tokens, and wooden tokens 1208, in some embodiments, a match game may include other types of breakable tokens 1222 such as a boulder token. In some embodiments, a boulder token 1222 may be similar to a wooden token 1208, being removed on matching of tokens in an adjacent region within the array. In one such embodiment, a wooden token 1208 may be fixed at a position within the array, such that upon removal and filling of tokens below the wooden token 1208 in the m×l array (e.g. during step 314 of method 300), the wooden token 1208 does not move or is not shifted downwards. In a further such embodiment, a boulder token 1222 may be moved or shifted upon removal of tokens below the boulder token 1222. For example, in the example shown in FIG. 12B, upon removal of one of the boulder tokens 1222 (e.g. upon matching a region adjacent to the tokens at the base of the m×l array), the other boulder tokens 1222 may be moved or shifted downward, while the wooden tokens 1208 may remain in position. In the example level displayed, the goal includes removal of all of the boulder tokens 1222: because the wooden tokens 1208 block the upper border of the m×l array, during filling of the array, new tokens may not be filled in above the boulder tokens 1222 after removal. This may prevent matching from above the boulders, requiring specific game play strategies. In a similar embodiment not illustrated, a player may be required to lower a token, such as a treasure chest token or similar token, to the bottom of the m×l array by matching and/or removing any tokens below the chest token. Upon reaching the bottom of the array, the rules engine may remove the chest token, increment the player's score, decrement a goal counter, or perform other such functions.

As shown in FIG. 12B, in many embodiments, the m×l array may not have tokens in every cell, or may be considered to have one or more "blank" cells 1224. This may modify the shape of the playing area as shown, requiring different game play strategies. In one implementation, tokens may not move across the blank cells 1224 during filling of the array. In another implementation, such as where one or more standard cells are in the array above a blank cell 1224, a token from above a blank cell 1224 may be moved to fill a cell below the blank cell 1224, jumping the gap, during filling of the array.

Figure 12C:
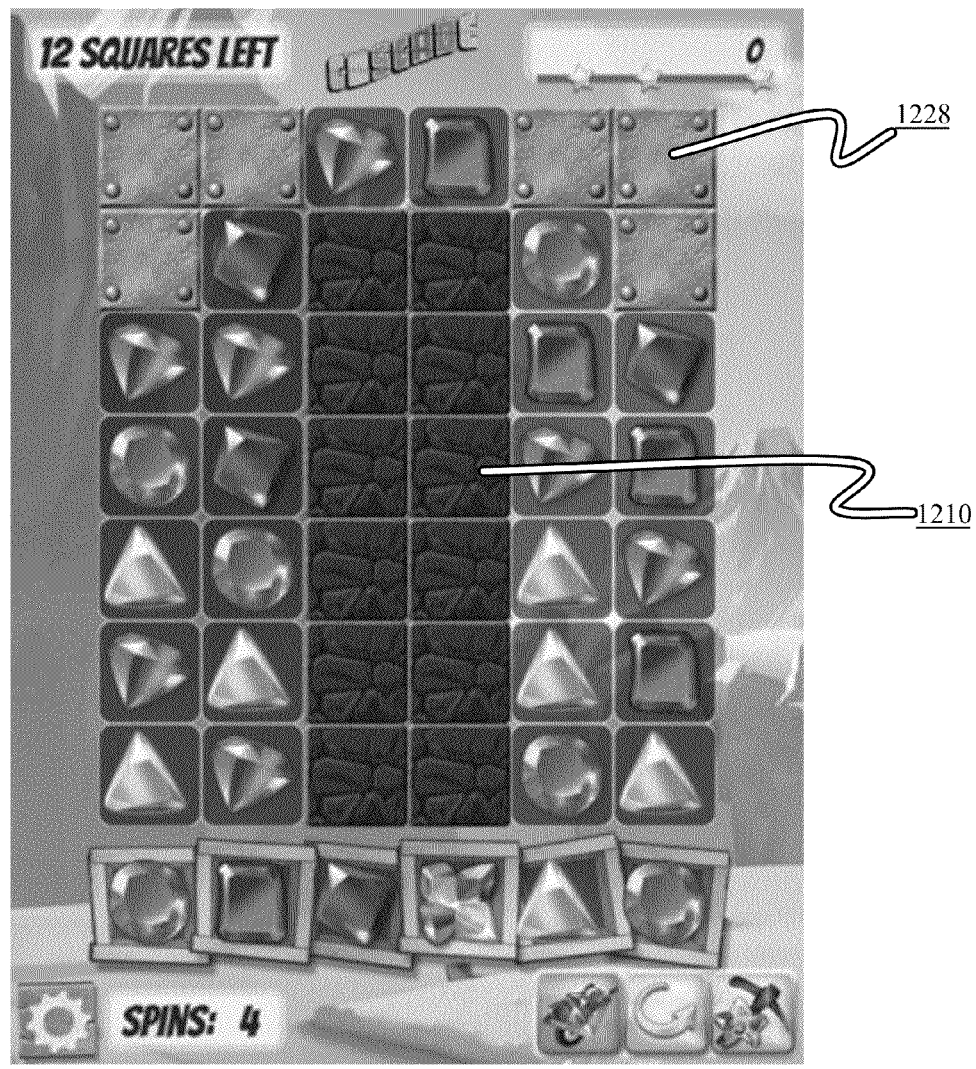

FIG. 12C is another screenshot 1200" of an embodiment of a level of a token match game. As shown and as discussed above, one or more stone tokens 1210 may be placed within the m×l array and require removal as part of game play. In some embodiments, one or more non-breakable tokens 1228, such as steel tokens, may be placed within the array and may not be removed or broken upon matching of tokens in adjacent regions. In some such embodiments, discussed in more detail below in connection with FIGS. 13A-13B, to fill spaces in the m×l array after removal of tokens, tokens may be shifted in sideways or diagonal directions, such that the non-breakable tokens 1228 remain fixed.

Figure 12D:
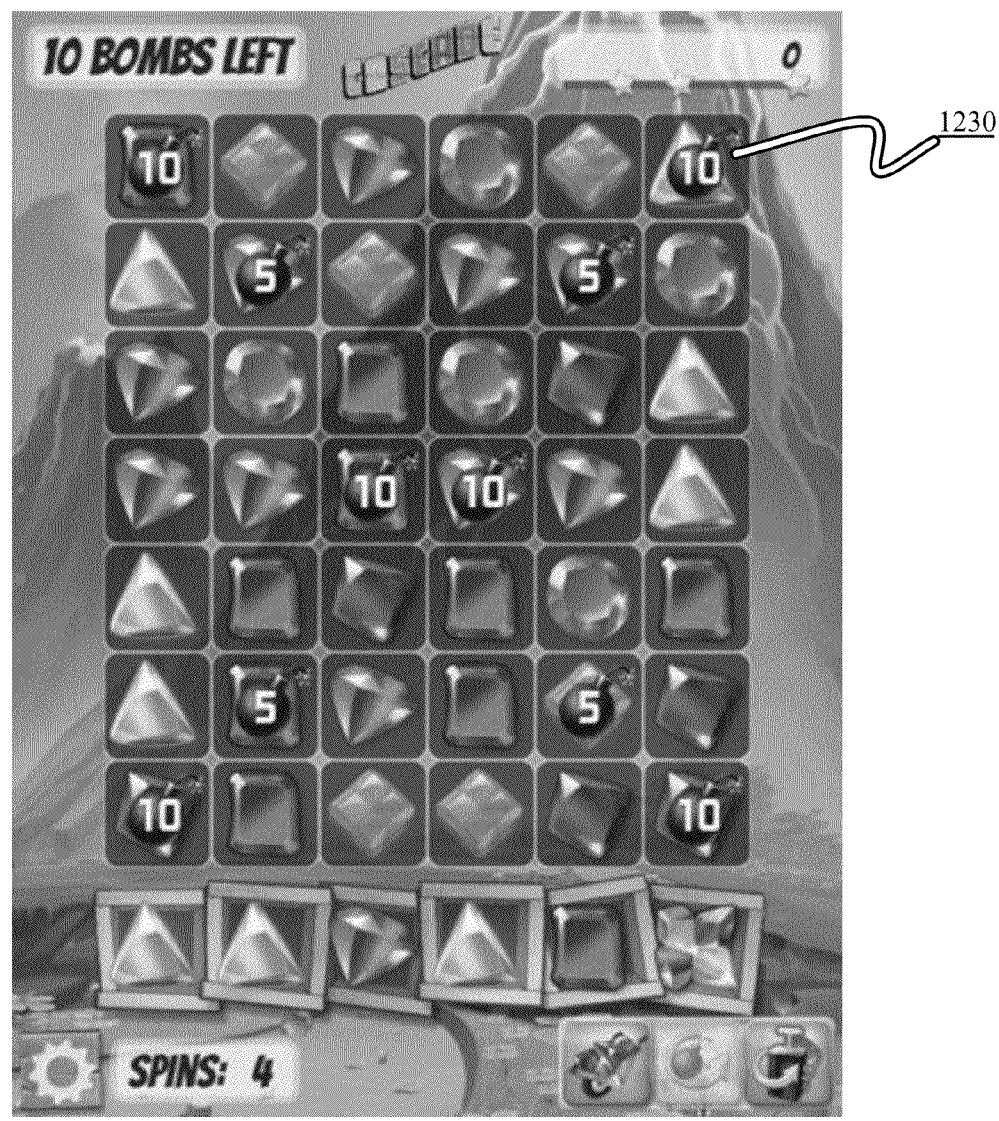

FIG. 12D is another screenshot 1200' of an embodiment of a level of a token match game. In some embodiments, bomb or counter tokens 1230 may be placed within the m×l array. The bomb tokens 1230 may include a counter, set to predetermined and/or varying starting numbers. The counters may decrement, either periodically or upon one or more selections by a player during game play. In one such embodiment, upon any counter reaching zero, the game may end, or another penalty may be applied, such as loss of a spin or round, a score penalty, or other such result. In some embodiments as shown, each bomb token 1230 may display a standard token beneath the counter. The player may match the standard token as part of a matching region to remove the bomb token 1230, allowing continuation of play.

Figure 12E:
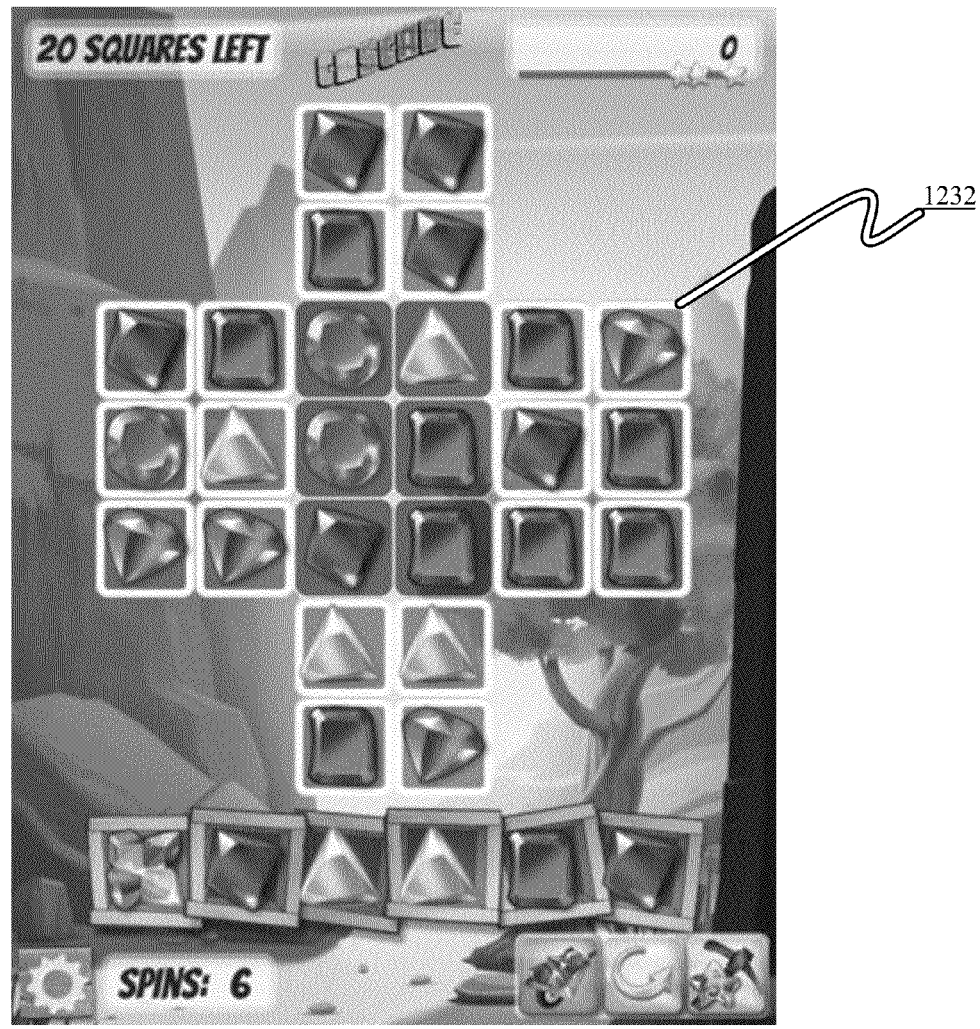

FIG. 12E is another screenshot 1200'''' of an embodiment of a level of a token match game. As shown and as discussed above in connection with FIG. 12B, blank cells may be used within the m×l array to change the shape of the playing field. In some embodiments, cells within the array may be marked, shaded, surrounded with a border, or otherwise designated as special cells 1232. The player may be required to match tokens within the special cells 1232 one or more times to remove the marking or designation, and may be required to remove all of the special cell designations to complete the level. For example, as shown in the example embodiment of FIG. 12E, the player may be required to remove all twenty marked or special squares 1232 to complete the level.

Figure 13A:
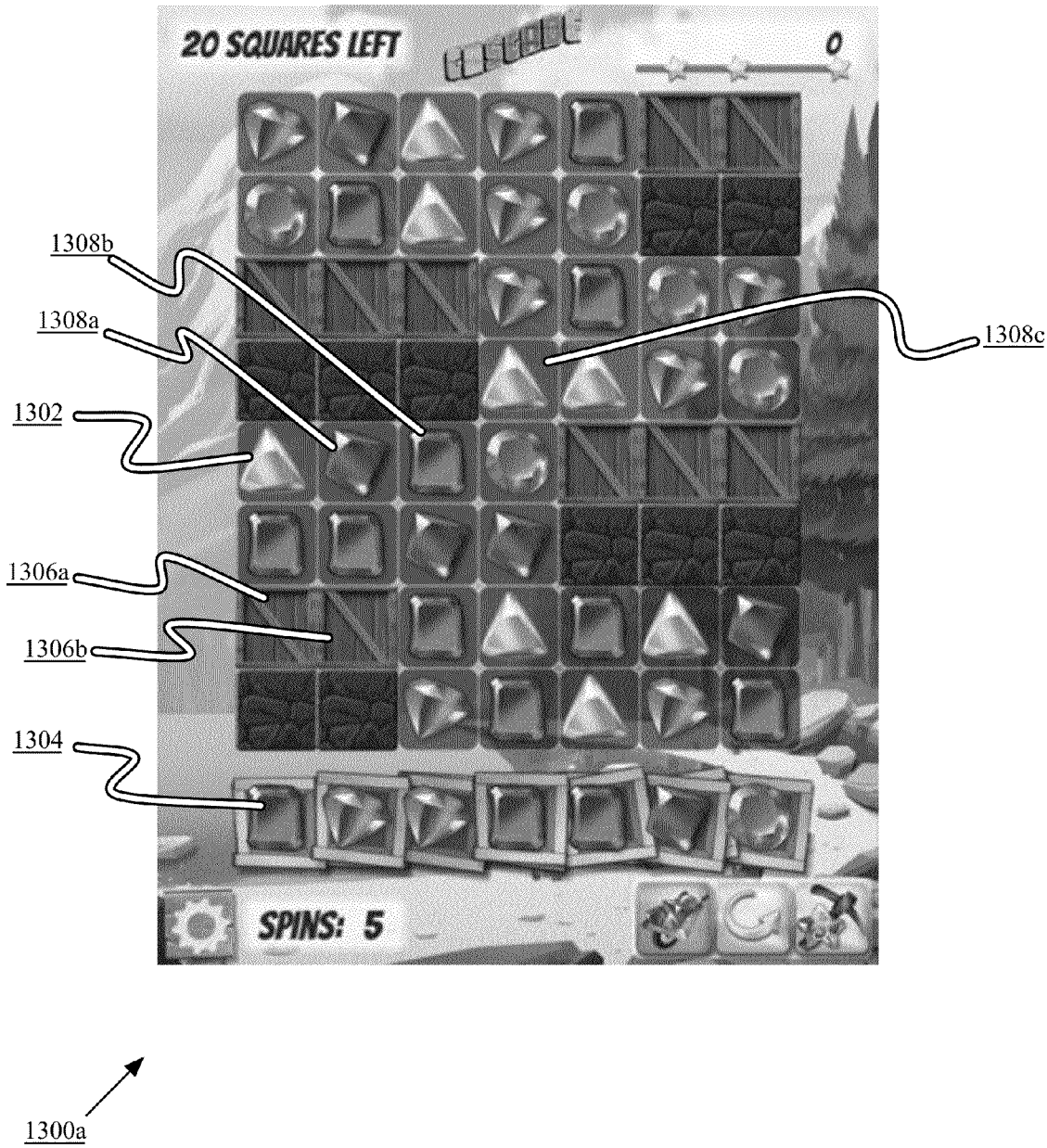
FIGS. 13A-13B are successive screenshots depicting an embodiment of a token match game with a falling token mechanism.
Figure 13B:
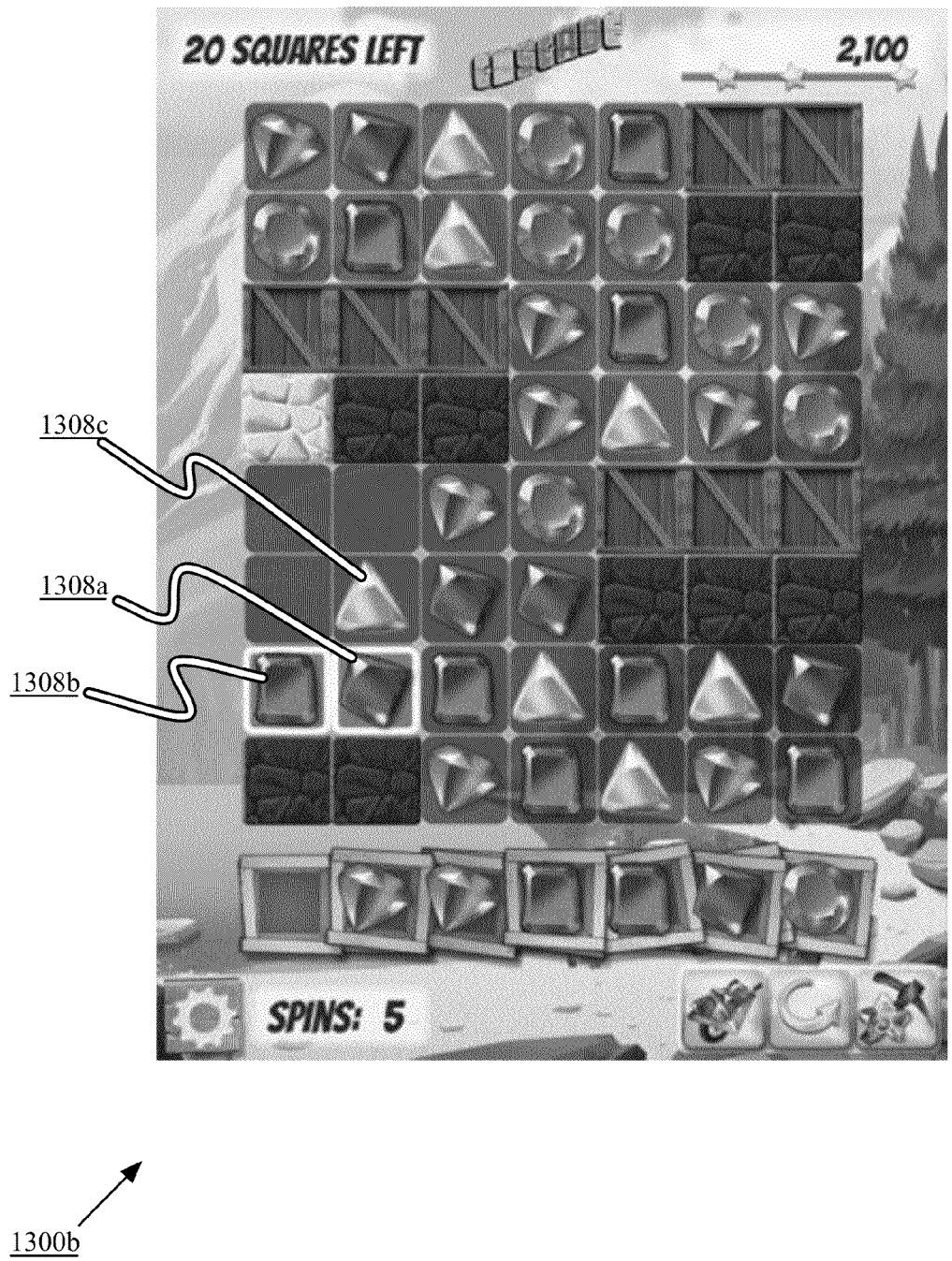

FIGS. 13A-13B are successive screenshots 1300a-1300b depicting an embodiment of a token match game with a falling token mechanism, as discussed above. In a first example move, a player may select token 1302 in the m×l array to replace the token 1302 with token 1304 from the n×l array, matching and removing the two adjacent green square tokens. Wooden tokens 1306a-1306b may be "broken" or removed as a result of being adjacent to the matched region. During filling of the array, because of the stone and wooden tokens above token 1302, tokens may not be shifted directly downwards. Rather, as shown in FIG. 13B, token 1308a may be shifted directly downwards to fill the empty cell left by wooden token 1306b. Token 1308b may be shifted diagonally to the left twice, to fill the empty cell left by wooden token 1306a. Token 1308c may be shifted diagonally to the left twice to stop on top of token 1308a. Other tokens above and to the right of 1308c may be filled in from the top of the m×l array as shown. This may result in one or more unfilled cells, as shown in FIG. 13B, creating potential gameplay obstacles.

Figure 14A:
FIGS. 14A-14B illustrates embodiments of icons for powers and game play boosts for a token match game.
Figure 14A:
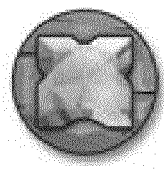
Figure 14A:
Figure 14A:
Figure 14A:
Figure 14B:
Figure 14B:
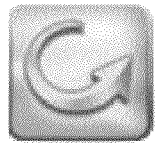
Figure 14B:

FIGS. 14A-14B are embodiments of icons for powers, boosts, bonuses for a token match game. In some embodiments, powers, boosts, and/or bonuses may purchased during and/or before game play to provide additional game play features. These features may, in many embodiments, be triggered by the player, such as via selection of a power icon 1220 in FIG. 12A. In other embodiments, the features may be triggered automatically by the rules engine and/or game engine. For example, referring first to FIG. 14A, illustrated are icons 1400-1408 representing boosts that may be selected prior to game play and triggered by the rules engine and/or game engine. For example, icon 1400, labeled "spin fairy", represents a boost that may be selected by a player prior to game play and instructs the rules engine to, in instances where a last token is in the n×l array that cannot be matched to any corresponding cell in the m×l array to form a matching region, remove the last token from the n×l array. This results in an empty n×l array, triggering incrementing of a bonus counter and refilling of the n×l array, as discussed above in connection with steps 324, 326, and 314 of FIG. 3. In some embodiments, the spin fairy boost may instruct the rules engine to remove the last token in the n×l array one time, two times, three times, or any other number of times.

Similarly, icon 402 may, in some embodiments, represent a "wild" boost that may instruct the token generator to increase the rate at which wild tokens, able to match any standard token, are selected for the n×l array. Icon 404 may, in some embodiments, represent a "multiplier" boost that may instruct the rules engine to increment the bonus counter prior to beginning game play, as discussed above in connection with step 326 of FIG. 3. Icon 1406, labeled "splash", may represent a boost that may instruct the token generator to provide one or more splash tokens in the m×l array at the start of the game, such as horizontal, vertical, or area splash tokens discussed above in connection with FIG. 6C. Icon 1408, labeled "easy splash", may represent a boost that may instruct the token generator to select splash tokens responsive to matching a smaller region size than during a typical game. For example, as discussed above in connection with FIG. 6A, a wild token may be placed by the rules engine in the m×l array responsive to the player matching a region of a predetermined size, such as one containing seven tokens. Selection of the easy splash boost may instruct the rules engine to place wild tokens responsive to the player matching a region of a smaller size, such as one containing five or six tokens.

FIG. 14B illustrates embodiments of icons representing powers which may be triggered by a player during game play, such as icons 1220 of FIG. 12A discussed above. For example, selection of icon 1410, referred to as a "shifter" icon, may allow the player to move any token in the n×l array to another position in the n×l array, by dragging the token or by first selecting the token to move and then by selecting a destination for the token. In instances where the destination cell includes a token, in some embodiments, the tokens may be swapped, while in other embodiments, the token in the destination cell may be replaced by the selected token.

In some embodiments, selection of icon 1412, referred to as an "extra spin" icon, may instruct the rules engine to increment a spin or round counter by a predetermined number, such as one spin, two spins, three spins, or any other number. In some embodiments, selection of icon 1414, referred to as a "wild" icon, may allow the player to select any standard token in the m×l array and remove all other identical tokens from the m×l array, as if the player had created a region of said tokens including a wild token, as discussed above in connection with FIG. 6A.

In many implementations, one or more of boosts 1400-1408 and/or powers 1410-1414 may be unlocked upon the player completing and/or reaching a designated level. For example, in one such implementation, a player may not have access to any boosts or powers on a first level, and may unlock a first power upon reaching a predetermined level, such as level ten. In many implementations, the player may be required to purchase a boost and/or power prior to use. For example, responsive to a selection of a boost or power, the player may be presented with a purchase screen, discussed in more detail below, and must complete a purchase prior to being allowed to trigger the boost or power.

Figure 14C:
FIG. 14C illustrates embodiments of icons for displaying or performing various functions on a life meter for an embodiment of a token match game.
Figure 14C:
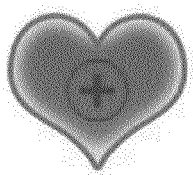
Figure 14C:
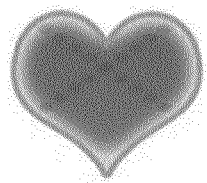
Figure 14C:
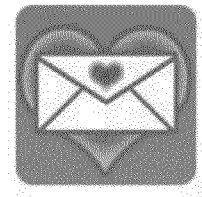
Figure 14C:

FIG. 14C illustrates embodiments of icons for displaying or performing various functions on a life meter for an embodiment of a token match game. As discussed above in connection with life or attempt meter 1102 of FIG. 11A, icon 1416 may be displayed with a counter representing a number of lives or attempts to complete a level allowed to the player. The player may be provided with an opportunity to purchase additional attempts or lives, such as when the player has run out of attempts. In some such implementations, icon 1416 may be replaced with icon 1418, or icon 1418 may be displayed in a purchase screen to indicate that the player may purchase additional lives or attempts. Similarly, upon running out of attempts or lives after failure to complete a level, icon 1416 may be replaced with icon 1420. For example, icon 1420 may be displayed in place of an attempt meter 1102 as in FIG. 11A. The user may select the icon to initiate a dialog to purchase additional lives. Icon 1422 may be used to identify a user selectable interface element to send or gift lives or attempts to another player of the game. In some embodiments, icon 1424 may be displayed in place of icon 1416, for example, as the attempt meter 1102 of FIG. 11A.

Figure 15A:
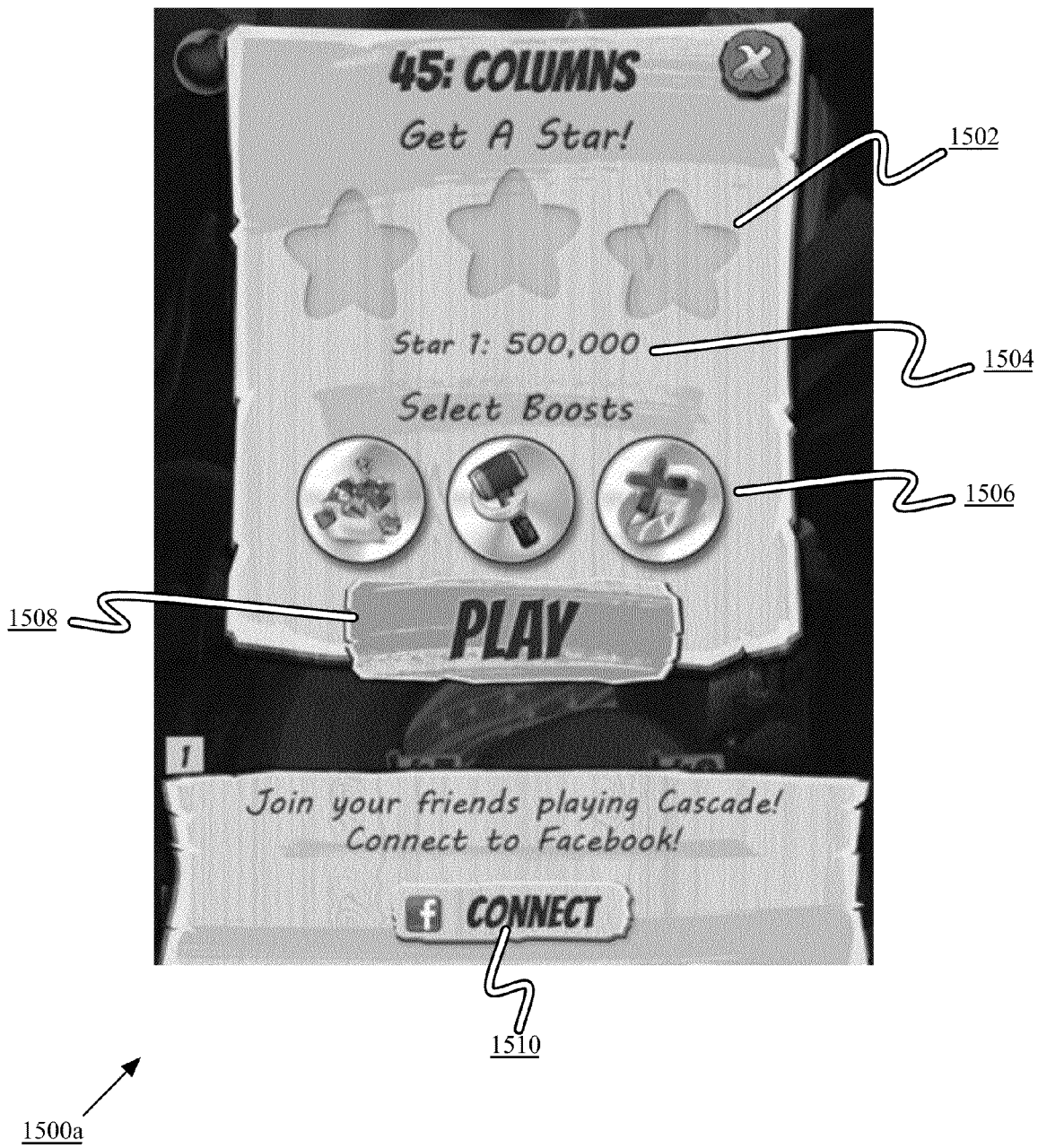
FIG. 15A is a screenshot of an embodiment of a level information screen for a token match game.

FIG. 15A is a screenshot of an embodiment of a level information screen 1500a for a token match game. In some embodiments, the level information screen 1500a may be displayed after a player has selected a level, and may include a name and identifier of the level, indicators 1502 of a previously completed goal of the level (or lack of a previously completed goal, as shown), and/or an identifier of a goal of the level 1504. In some embodiments, the level information screen 1500a may include one or more icons 1506 representing boosts that the player may purchase or select to be applied to game play, as discussed above. The level information screen 1500a may also include a user interface element 1508 to begin playing the level, and/or a element 1510 to connect to a social network. Connecting to a social network may allow the player to send/receive gifts from other players in the social network, such as lives or attempts, bonuses, powers, boosts, or other such items; compare scores or level goals with others; and/or provide or receive challenges from other players.

Figure 15B:
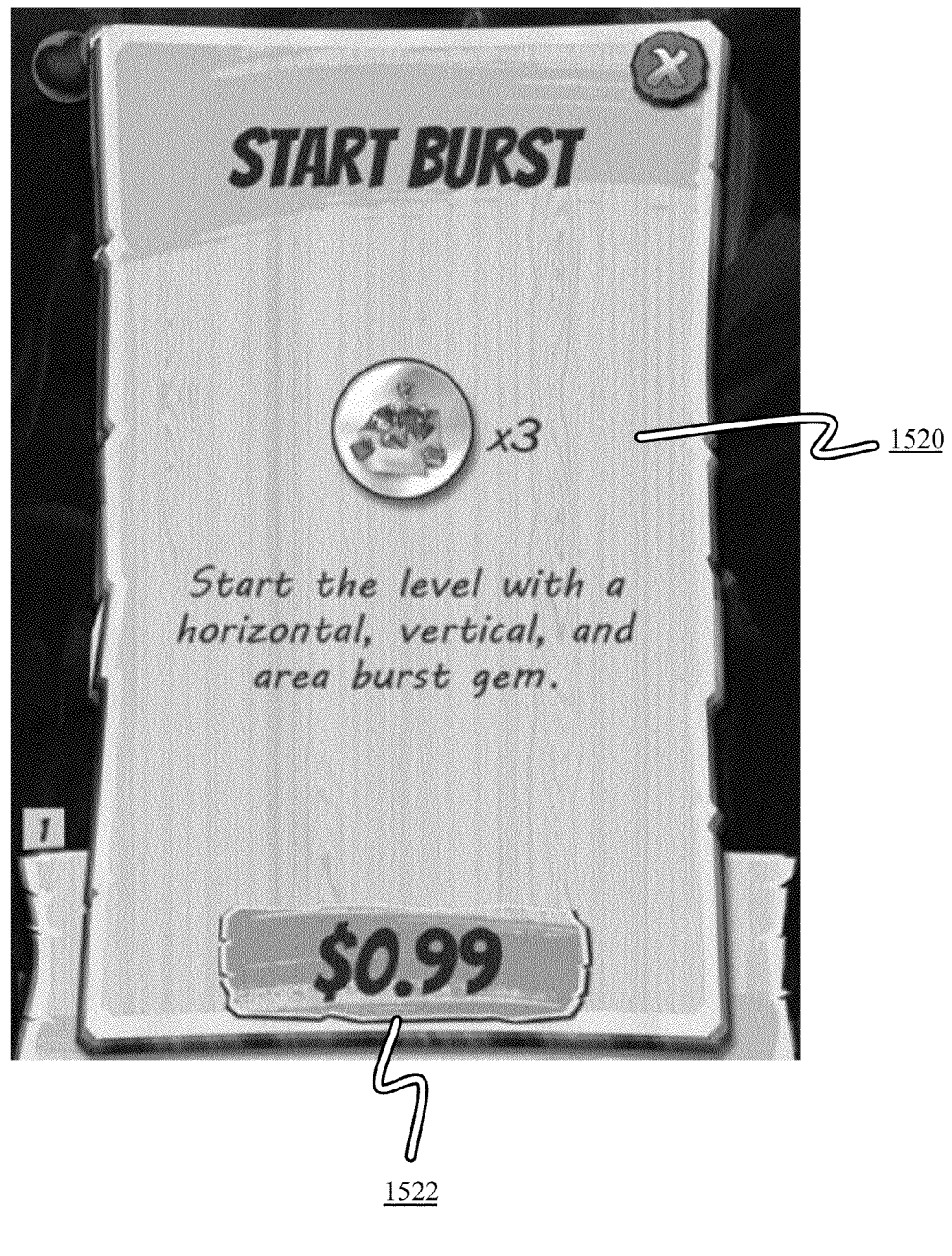
FIG. 15B is a screenshot of an embodiment of a boost purchase screen for a token match game.

In one embodiment, as discussed above, a player may purchase a boost to be applied to game play of a level by selecting an icon 1506 during display of a level information screen 1500*a*. FIG. 15B is a screenshot of an embodiment of a boost purchase screen 1500*b* for a token match game. As shown, the boost purchase screen 1500*b* may include an identifier or description 1520 of a boost, and may include a user interface element 1522, such as a button, to purchase the boost. Purchases may be performed as an in-application purchase, purchase via a separate web page or other application, or via any other such means.

Figure 15C:
FIG. 15C is a screenshot of an embodiment of a power purchase screen for a token match game.

Similarly, as discussed above, during game play, a user may select a power via an icon 1410-1414 as shown in FIG. 14B or one of icons 1220 as shown in FIG. 12A. FIG. 15C is a screenshot of an embodiment of a power purchase screen 1500*b*' for a token match game. As with purchase screen 1500*b*, the power purchase screen 1500*b* may include an identifier or description 1520' of a power, and may include a user interface element 1522', such as a button, to purchase the power. Once purchased, an icon 1410-1414 or 1220 may be highlighted or displayed with a border, glow, or counter to indicate that the player has purchased the power and may trigger the power during game play.

Although discussed in terms of purchases, in some implementations, other methods may be used to obtain powers and/or boosts. For example, powers or boosts may be obtained by successful completion of goals during a level (e.g. a boost or power may be enabled for a next level, responsive to a user attaining three stars during a previous level), or by performing one or more tasks, such as completing a challenge or challenging another player, reaching a high score, lowering a chest token to the bottom of an m×l array, etc.

Figure 16:
FIG. 16 is a screenshot of an embodiment of a level completion screen for a token match game.

FIG. 16 is a screenshot of an embodiment of a level completion screen 1600 for a token match game. The level completion screen 1600 may include an identifier and/or name of the level, an identifier of the goals of the level, and/or an indication of goals achieved 1602 and/or a score obtained 1604. In some embodiments, a level completion screen 1600 may include an identification of a top score 1606 and/or an indicator that the player attained the top score 1606. Level completion screen 1600 may also include one or more user interface elements, such as buttons 1608, for allowing the player to select to retry the level, select a next level or different level (e.g. from a level selection screen, as discussed above), and/or allowing the player to brag by sending an email, text or multimedia message, in-game message, and/or message on a social network to a friend or other player. Such messages may, in some implementations, include a challenge or link to allow the recipient to initiate play of the same level, a game with the same goal, or a challenge game based on the level with a goal equal to the sender's score. In some embodiments, the level completion screen 1600 may include an interface element 1610 for connecting to a social network, as discussed above.

While the invention is particularly shown and described with reference to specific embodiments, it should be understood by those skilled in the art that various changes in form and detail may be made therein without departing from the spirit and scope of the invention described in this disclosure.

What is claimed:

1. A method for a token match game, comprising:
generating, by a token generator executed by a processor of a computing device, an m×l array of randomly selected tokens, the m×l array stored in a first location in a memory device of the computing device;
generating, by the token generator, an n×l array of randomly selected tokens, the n×l array stored in a second location in the memory device;
subsequently receiving, by a rules engine executed by the processor, a selection by a user of the computing device via an input device coupled to the computing device, of a cell within the m×l array;
determining, responsive to receiving the selection of the cell within the m×l array, by the rules engine, that replacement of a first token in the selected cell within the m×l array with a second token from a corresponding cell of the n×l array results in a region of adjacent identical tokens within the m×l array via comparison of an identifier stored in the second location in the memory device to identifiers stored at positions adjacent to a corresponding position in the first location in the memory device; and
editing the m×l array stored in the first location of the memory device to remove, by the rules engine, the tokens of the region of adjacent identical tokens within the m×l array, responsive to the determination.

2. The method of claim 1, further comprising incrementing a score for a user, by the rules engine, responsive to removal of the tokens of the region of adjacent identical tokens within the m×l array.

3. The method of claim 1, further comprising generating, by the token generator, a number of additional tokens corresponding to the number of removed tokens of the region of adjacent identical tokens within the m×l array, the generated additional tokens stored in an empty portion of the first location of the memory device.

4. The method of claim 1, further comprising:
iteratively shifting a token in the m×l array into an adjacent cell not including a token until at least one cell at the edge of the m×l array does not include a token; and
generating, by the token generator, at least one new token for the corresponding at least one cell, the generated at least one new token stored in an empty portion of the first location of the memory device.

5. The method of claim 1, further comprising:
identifying, by the rules engine, that a token adjacent to the region of adjacent identical tokens within the m×l array is a wild token; and
editing the m×l array stored in the first location of the memory device to remove, by the rules engine, the wild token and at least one additional token from the m×l array identical to the first token, but not adjacent to the region of adjacent identical tokens.

6. The method of claim 1, further comprising:
identifying, by the rules engine, that no replacement of a third token in a cell within the m×l array with a fourth token from a corresponding cell of the n×l array results in a region of adjacent identical tokens within the m×l array; and
generating, by the token generator, a second n×l array of randomly selected tokens, responsive to the identification.

7. The method of claim 6, wherein providing the second n×l array of randomly selected tokens further comprises:
rendering an interface element for display to the user via an output device coupled to the computing device;

receiving a selection of the interface element by the user via the input device coupled to the computing device; and generating the second n×l array of randomly selected tokens, responsive to the selection of the interface element by the user.

8. The method of claim 7, wherein the interface element is a lever.

9. The method of claim 6, wherein generating the second n×l array of randomly selected tokens further comprises replacing a previous n×l array stored at the second location in the memory device.

10. The method of claim 6, wherein generating the second n×l array of randomly selected tokens further comprises decrementing a hand counter.

11. A system for a token match game, comprising:
a computing device comprising a memory device and a processor executing a token generator and a rules engine stored in the memory device, the computing device coupled to an input device;
wherein the token generator is configured for:
generating an m×l array of randomly selected tokens, the m×l array stored in a first location in the memory device, and
generating an n×l array of randomly selected tokens, the n×l array stored in a second location in the memory device; and
wherein the rules engine is configured for:
subsequently receiving a selection, by a user of the computing device via the input device, of a cell within the m×l array,
determining, responsive to receiving the selection of the cell within the m×l array, that replacement of a first token in the selected cell within the m×l array with a second token from a corresponding cell of the n×l array results in a region of adjacent identical tokens within the m×l array via comparison of an identifier stored in the second location in the memory device to identifiers stored at positions adjacent to a corresponding position in the first location in the memory device, and
editing the m×l array stored in the first location of the memory device to remove the tokens of the region of adjacent identical tokens within the m×l array, responsive to the determination.

12. The system of claim 11, wherein the rules engine is further configured for incrementing a score for a user, responsive to removal of the tokens of the region of adjacent identical tokens within the m×l array.

13. The system of claim 11, wherein the token generator is further configured for generating a number of additional tokens corresponding to the number of removed tokens of the region of adjacent identical tokens within the m×l array, the generated additional tokens stored in an empty portion of the first location of the memory device.

14. The system of claim 11, wherein the rules engine is further configured for iteratively shifting a token in the m×l array into an adjacent cell not including a token until at least one cell at the edge of the m×l array does not include a token; and
wherein the token generator is further configured for generating at least one new token for the corresponding at least one cell, the generated at least one new token stored in an empty portion of the first location of the memory device.

15. The system of claim 11, wherein the rules engine is further configured for:
identifying that a token adjacent to the region of adjacent identical tokens within the m×l array is a wild token; and
editing the m×l array stored in the first location of the memory device to remove the wild token and at least one additional token from the m×l array identical to the first token, but not adjacent to the region of adjacent identical tokens.

16. The system of claim 11, wherein the rules engine is further configured for identifying that no replacement of a third token in a cell within the m×l array with a fourth token from a corresponding cell of the n×l array results in a region of adjacent identical tokens within the m×l array; and
wherein the token generator is further configured for generating a second n×l array of randomly selected tokens, responsive to the identification.

17. The system of claim 16, wherein the computing device is further coupled to an output device, and wherein the rules engine is further configured for rendering an interface element for display to the user via the output device, and receiving a selection of the interface element by the user via the input device coupled to the computing device; and
wherein the token generator is further configured for generating the second n×l array of randomly selected tokens, responsive to the selection of the interface element by the user.

18. The system of claim 17, wherein the interface element is a lever.

19. The system of claim 16, wherein the token generator is further configured for generating the second n×l array of randomly selected tokens by replacing a previous n×l array stored at the second location in the memory device.

20. The system of claim 16, wherein the rules engine is further configured for decrementing a hand counter, responsive to the token generator generating the second n×l array of randomly selected tokens.

* * * * *